United States Patent [19]
Sawa et al.

[11] Patent Number: 6,024,671
[45] Date of Patent: Feb. 15, 2000

[54] APPARATUS FOR CONTROLLING AUTOMATIC TRANSMISSION

[75] Inventors: Kenji Sawa, Hiroshima; Shinya Kamada, Aki-gun, both of Japan

[73] Assignee: Mazda Motor Corporation, Hiroshima-ken, Japan

[21] Appl. No.: 09/281,718

[22] Filed: Mar. 30, 1999

[30] Foreign Application Priority Data

Mar. 30, 1998 [JP] Japan .................................. 10-103815

[51] Int. Cl.[7] ................................................ F16H 61/26
[52] U.S. Cl. ........................................ 477/131; 477/906
[58] Field of Search .................................. 477/130, 131, 477/163, 164, 906; 475/127

[56] References Cited

U.S. PATENT DOCUMENTS 5,311,795  5/1994  Yoshimura et al. .................... 477/131
5,505,674  4/1996  Furukawa et al. ..................... 477/130

FOREIGN PATENT DOCUMENTS 8-326888  12/1996  Japan .

*Primary Examiner*—Sherry L. Estremsky
*Attorney, Agent, or Firm*—Sidley & Austin; Hugh A. Abrams

[57] ABSTRACT

An apparatus for controlling an automatic transmission is disclosed. A 2nd speed is established in which hydraulic pressure is supplied only into an engaging chamber of a 2-4 brake by a first duty solenoid valve so that the brake is applied. A 3rd speed is established in which the hydraulic pressure is supplied into a releasing chamber of the brake and a hydraulic chamber of a 3-4 clutch by a second duty solenoid valve under the condition of the hydraulic pressure being supplied into the engaging chamber of the brake so that the brake is released and the 3-4 clutch is engaged. When the 2nd speed is changed to the 3rd speed, a controller increases the hydraulic pressure supplied into the releasing chamber of the brake and the hydraulic chamber of the 3-4 clutch in a case where a failure, in which the first solenoid valve is fixed under a condition that the first solenoid valve supplies the hydraulic pressure into the engaging chamber, is detected.

4 Claims, 34 Drawing Sheets

FIG. 4 1ST SPEED

2ND SPEED

3RD SPEED

3RD SPEED LOCKUP

4TH SPEED

4ST SPEED LOCKUP

11 SPEED

FIG. 11 REVERSE SPEED

APPARATUS FOR CONTROLLING AUTOMATIC TRANSMISSION

BACKGROUND OF THE INVENTION

1. Field of the Invention

The present invention relates an apparatus for controlling an automatic transmission. In particular, the present invention relates an apparatus for controlling an automatic transmission which detects failures in solenoid valves disposed in a hydraulic pressure control circuit and carries out a fail-safe control so as to reduce shocks which are generated by the failures.

2. Description of the Related Art

An automatic transmission of a motor vehicle is provided with a torque converter and speed change gears. The automatic transmission automatically provides a gear stage according to a driving condition such as an engine load and a vehicle speed by switching a power-transmitting path of the speed change gears. The switching of the power-transmitting path is carried out by selectively engaging a plurality of frictional elements such as clutches and brakes. The automatic transmission is further provided with a hydraulic pressure control circuit which controls a supply of an operating hydraulic pressure to the respective frictional elements so as to engage or disengage the frictional elements.

Namely, the hydraulic pressure control circuit controls the hydraulic pressure supplied to the respective frictional elements such that a control of gear stages or a speed-change control can be carried out. The hydraulic pressure control circuit is provided with various solenoid valves which generate, supply, discharge and control the operating hydraulic pressure. The solenoid valves controls the operating hydraulic pressure by electrical control signals.

When the solenoid valve fails, a corresponding frictional element is not engaged nor disengaged by a speed-change command output based on the engine load. As a result, a necessary gear stage can not be obtained or the speed change gears are fixed to a neutral condition.

Conventionally, electrical failures such as a braking of wire and a short circuit of respective solenoid valves have been detected in advance by outputting a failure-detecting signal to the respective solenoid valves when staring a motor vehicle. However, even when such electrical failures of the solenoid valves do not occur, the solenoid valves might not work normally by mechanical failures such as a seal failure which is generated by a sticking of plunger ranger or a catching of extraneous materials. In this case, although the electrical failure is not detected, a necessary gear stage can not be obtained or the speed change gears are fixed to a neutral condition.

In order to solve this problem, a fail-safe control has been proposed. Namely, an actual gear stage is detected based on a speed-change commend which is output according to a driving condition, and then a mechanical failure of the solenoid valve is determined based on the detection result and the fail-safe control is finally carried out.

An automatic transmission is generally provided with a frictional element which includes a single hydraulic pressure chamber. Such frictional element is engaged when operating hydraulic pressure is supplied into the chamber, and is disengaged when the operating hydraulic pressure is discharged from the chamber. Another type of the frictional element of an automatic transmission is, for example, disclosed in Japanese Patent Laid-Open Publication No. 8-326888. A 2-4 brake in the Patent Publication includes two hydraulic chambers composed of an engagement chamber and a disengagement chamber. The 2-4 brake is engaged only when operating hydraulic pressure is supplied into the engagement chamber and is disengaged on other conditions. Namely, the 2-4 brake is disengaged when the operating hydraulic pressure is not sullied both the engagement and disengagement chambers, the operating hydraulic pressure is supplied only into the disengagement chamber, or the operating hydraulic pressure is supplied into neither of the engagement chamber nor the disengagement chamber. Further, solenoid valves are respectively provided in a hydraulic pressure control circuit so as to control supply and discharge of the operating hydraulic to and from the engagement chamber and the disengagement chamber so that such frictional element with two hydraulic chamber is controlled.

There is a need to reduce total number of the solenoid valves, simplify a structure of a hydraulic pressure control circuit and simplify software for a control. Therefore, it has been proposed that the engagement chamber and the disengagement chamber of the frictional element are respectively communicated with a single chamber of another frictional element so as to use the solenoid valve in common.

For example, there is provided a first frictional element with two hydraulic pressure chambers composed of an engagement chamber and a disengagement chamber, and a second frictional element with a single hydraulic pressure chamber which is communicated with the disengagement chamber of the first frictional element. In this case, a first gear stage or a low-speed gear stage is established by the first frictional element being engaged and the second frictional element being disengaged. At this time, a first solenoid valve for the engagement chamber supplies operating hydraulic pressure into the engagement chamber of the first element, and a second solenoid valve for the disengagement chamber does not supply the operating hydraulic pressure into the disengagement chamber of the first element and the single chamber of the second element. On the other hand, a second gear stage or a high-speed gear stage is established by the first frictional element being disengaged and the second frictional element being engaged. At this time, the solenoid valve for the engagement chamber supplies the operating hydraulic pressure into the engagement chamber of the first element, and the solenoid valve for the disengagement chamber supplies the operating hydraulic pressure into the disengagement chamber of the first element and the single chamber of the second element.

When a shift-up operation is carried out from the first low-speed gear stage to the second high-speed gear stage, the solenoid valve for the disengagement chamber needs to supply the operating hydraulic pressure into both the disengagement chamber of the first frictional element and the hydraulic chamber of the second frictional element. However, in this operation, a problem might occur. Namely, because of the balance between a mechanical biasing force to the disengagement side of the first frictional element and that of the second frictional element, the first frictional element does not become disengaged although the second frictional element becomes engaged. In this case, the solenoid valve for the disengagement chamber supplies the operating hydraulic pressure into both the disengagement chamber of the first element and the single chamber of the second element. The solenoid valve for the engagement chamber once reduces the operating hydraulic pressure in the engagement chamber of the first element, and then increases the operating hydraulic pressure in the engagement chamber of the first element at a timing when the second element starts to be engaged by a pressure control of the operating hydraulic pressure supplied into the hydraulic chamber of the second element. At the same time, the solenoid valve for the engagement valve increases the operating hydraulic pressures both in the disengagement chamber of the first element and in the hydraulic chamber of the second element to their maximum values. Finally, the first frictional element is fully disengaged and the second frictional element is fully disengaged.

However, for example, suppose the case that a mechanical failure such as a sticking of the solenoid valve for the engagement chamber is detected when the operating hydraulic pressure has been supplied into the engagement chamber of the first element. In this case, the solenoid valve for the engagement chamber can not reduce the operating hydraulic pressure in the engagement chamber of the first element so as to avoid the problem. As explained above, the problem occurs in the shift-up operation from the first low-speed gear stage to the second high-speed gear stage. Thus, the problem still remains, and the first frictional element does not start being disengaged although the second frictional element has already started being engaged. As a result, the second frictional element has low durability and speed-change ability becomes low.

SUMMARY OF THE INVENTION

It is therefore an object of the present invention to provide an apparatus for controlling an automatic transmission which can resolve the above-mentioned problem which occurs based on a failure of a solenoid valve provided in a hydraulic control circuit.

It is another object of the present invention to provide an apparatus for controlling an automatic transmission which carry out a fail-safe control so as to avoid low durability of a frictional element and low speed-change ability.

The above object is achieved according to the present invention by providing an apparatus for controlling an automatic transmission, comprising a torque converter, speed change gears to which a power is input from an engine through the torque converter, a plurality of frictional elements for switching power transmitting paths provided in the speed change gears, a hydraulic pressure control circuit provided with a plurality of solenoid valves for controlling a hydraulic pressure supplied to the frictional elements, speed change control means for controlling the solenoid valves so as to establish a target gear stage based on a value related to an engine load and a value related to a vehicle speed, the frictional elements including a first frictional element and a second frictional element, the first frictional element having an engaging hydraulic pressure chamber and a disengaging hydraulic chamber and being engaged when the hydraulic pressure is supplied only into the engaging hydraulic chamber, the second frictional element having a single hydraulic chamber and being engaged when the hydraulic pressure is supplied into the hydraulic chamber, the hydraulic chamber of the second frictional element being communicated with the disengaging hydraulic chamber, the solenoid valves including a first solenoid valve for controlling the hydraulic pressure supplied into the engaging hydraulic chamber of the first frictional element and a second solenoid valve for controlling the hydraulic pressure supplied into both the disengaging hydraulic chamber of the first frictional element and the hydraulic chamber of the second frictional element, the hydraulic pressure control circuit establishing a first gear stage which is located in a low speed side and in which the hydraulic pressure is supplied into the engaging hydraulic chamber of the first frictional element by the first solenoid valve and the hydraulic pressure is not supplied into the disengaging hydraulic chamber of the first frictional element and the hydraulic chamber of the second frictional element by the second solenoid valve, the circuit further establishing a second gear stage which is located in a high speed side and in which the hydraulic pressure is supplied into the engaging hydraulic chamber of the first frictional element by the first solenoid valve and the hydraulic pressure is supplied into the disengaging hydraulic chamber of the first frictional element and the hydraulic chamber of the second frictional element by the second solenoid valve, failure detection means for detecting a failure of the first solenoid valve in which the first solenoid valves is fixed under a condition that the first solenoid valve supplies the hydraulic pressure into the engaging hydraulic chamber, and means for increasing more the hydraulic pressure supplied into both the disengaging hydraulic chamber of the first frictional element and the hydraulic chamber of the second frictional element by the second solenoid valve in a case where the failure detection means has detected the failure than in a case where the failure detection means has not detected the failure, when the first gear stage is changed into the second gear stage.

In a preferred embodiment of the present invention, the hydraulic pressure increasing means prohibits the second solenoid valve from controlling the hydraulic pressure so that a line pressure in the hydraulic pressure control circuit is directly supplied into both the disengaging hydraulic chamber of the first frictional element and the hydraulic chamber of the second frictional element, when the first gear stage is changed into the second gear stage.

The above and other objects and features of the present invention will be apparent from the following description by taking reference with accompanying drawings employed for preferred embodiments of the present invention.

DETAILED DESCRIPTION OF THE PREFERRED EMBODIMENTS

Hereinafter, the preferred embodiments of the present invention will be explained with reference to the drawings.

Figure 1:
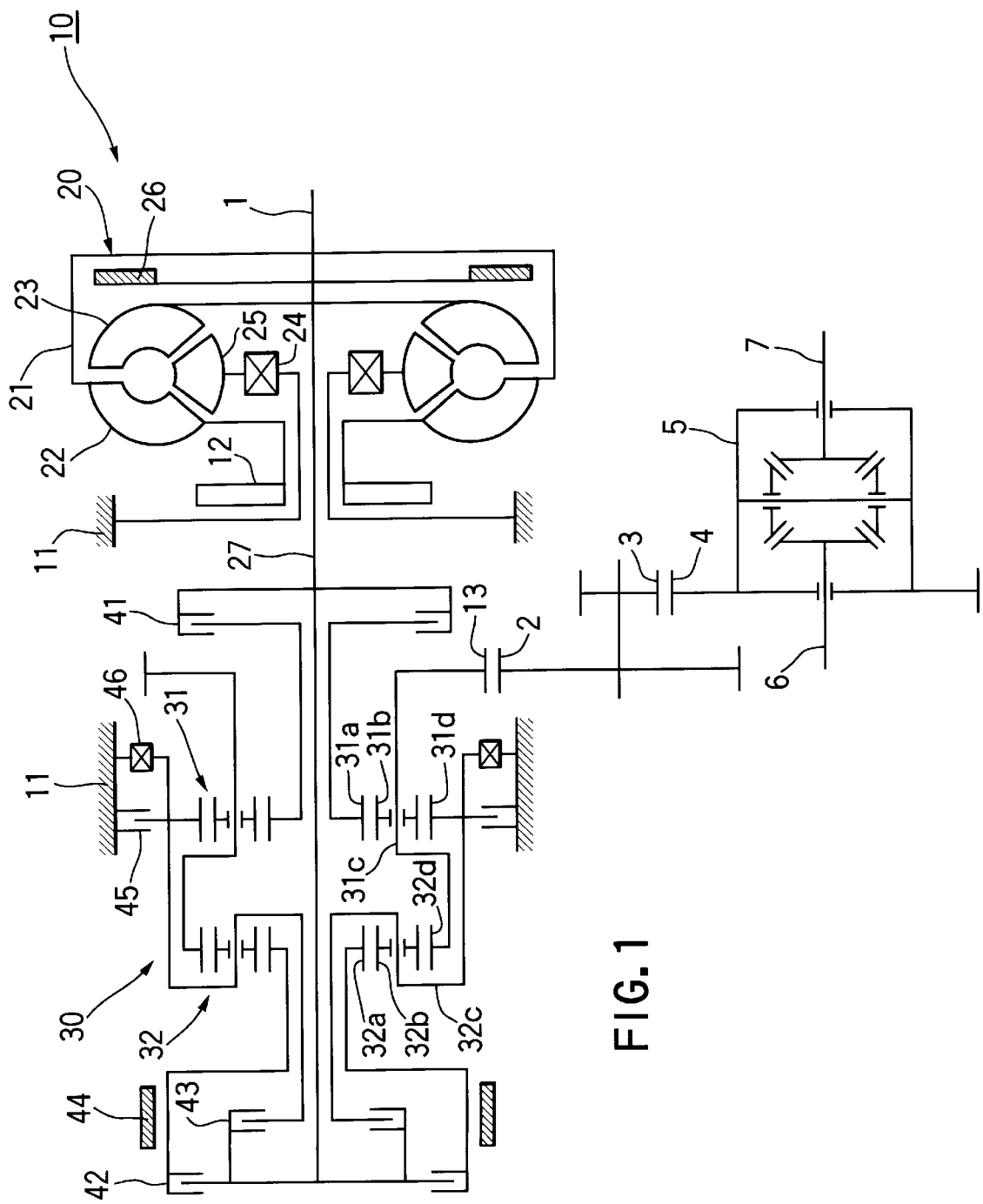
FIG. 1 is a skeleton view showing a mechanical structure of an automatic transmission according to an embodiment of the present invention.

FIG. 1 is a skeleton view showing a mechanical structure of an automatic transmission according to a preferred embodiment of the present invention.

Referring to FIG. 1, a reference numeral 10 designates an automatic transmission. The automatic transmission 10 is provided with a torque converter 20, speed-change gears 30 driven by an output of the toque converter 20, a plurality of frictional elements 41–45 such as a clutch and a brake which switch a power-transmitting path in the speed-change gears 30, and a one-way clutch 46. The automatic transmission 10 establishes a 1st speed to a 4th speed in forward ranges and a reverse speed in an R range.

The torque converter 20 is provided with a pump 22, a turbine 23, a stator 25 and a lockup-clutch 26. The pump 22 is fixed to a case 21 connected with an engine output shaft 1. The turbine 23 is disposed to face the pump 22 and is driven by the pump 22 through operating oil. The stator 25 is disposed between the pump 22 and the turbine 23 and is supported by a transmission case 11 through a one-way clutch 24. The stator 25 works to increase a torque. The lockup-clutch 26 is disposed between the case 21 and the turbine 23 and directly connects the engine output shaft 1 with the turbine 23 through the case 21. Further, the rotation of the turbine 23 is output to the speed-change gears 30 through a turbine shaft 27.

An oil pump 12 is disposed on the anti-engine side of the torque converter 20 and is driven by the engine output shaft 1 through the case 21 of the torque converter 20.

The speed-change gears 30 are provided with a first planetary gearset 31 and a second planetary gearset 32. The first and second planetary gearsets 31 and 32 are respectively provided with sun gears 31a and 32a, a plurality of pinion gears 31b and 32b meshed with the sun gears 31a and 32a, pinion carriers 31c and 32c supporting the pinion gears 31b and 32b, and internal gears 31d and 32d meshed with the pinion gears 31b and 32b.

A forward clutch 41 is disposed between the turbine shaft 27 and the sun gear 31a of the first planetary gearset 31. A reverse clutch 42 is disposed between the turbine shaft 27 and the sun gear 32a of the second planetary gearset 32. A 3-4 clutch 43 is disposed between the turbine shaft 27 and the pinion carrier 32c of the second planetary gearset 32. A 2-4 brake 44 is disposed so as to fix the sun gear 32a of the second planetary gearset 32.

The internal gear 31d of the first planetary gearset 31 is connected with the pinion carrier 32c of the second planetary gearset 32, and a low-reverse clutch 45 and a one-way clutch 46 are disposed in parallel between the gearsets 31 and 32 and the transmission case 11. The pinion carrier 31c of the first planetary gearset 31 is connected with the internal gear 32d of the second planetary gearset 32, and an output gear 13 is connected with the gearsets 31 and 32 and the transmission case 11. Further, the rotation of the output gear 13 is transmitted to a right vehicle axle 7 and a left vehicle axle 6 through transmission gears 2, 3 and 4 and a differential mechanism 5.

Table 1 shows a relationship between the operating conditions of the frictional elements 41–45 and the one-way clutch 46 and gear stages. In Table 1, (○) shows that the corresponding frictional element is engaged, (◎) shows that the low-reverse brake 45 is engaged only in a L range.

TABLE 1

|  | FORWARD CLUTCH (41) | 2-4 BRAKE (44) | 3-4 CLUTCH (43) | LOW REVERSE BRAKE (45) | REVERSE CLUTCH (42) | ONE-WAY CLUTCH (46) |
|---|---|---|---|---|---|---|
| 1ST SPEED | ○ |  |  | ◎ |  | ○ |
| 2ND SPEED | ○ | ○ |  |  |  |  |
| 3RD SPEED | ○ |  | ○ |  |  |  |
| 4TH SPEED |  | ○ | ○ |  |  |  |
| REVERSE SPEED |  |  |  |  | ○ | ○ |

A hydraulic pressure control circuit 100 will be explained hereinafter. The hydraulic pressure control circuit 100 supplies an operating hydraulic pressure to the hydraulic chambers provided in the frictional elements 41–45.

The 2-4 brake 44 is provided for the 2nd speed and 4th speed and is composed of a band brake. The 2-4 brake is provided with an apply chamber 44a and a release-chamber 44b both of which are hydraulic pressure chambers and to which an operating hydraulic pressure is supplied. The 2-4 brake 44 is applied when the operating hydraulic pressure is supplied only to the apply chamber 44a. The 2-4 brake 44 is released when the operating hydraulic pressure is supplied only to the release chamber 44b, the operating hydraulic pressure is not supplied to the both chambers 44a and 44b, or the operating hydraulic pressure is supplied to the both chambers 44a and 44b. Each of other frictional elements 41–43 and 45 is provided with a single hydraulic pressure chamber to which the operating hydraulic pressure is supplied so that the frictional element is engaged.

Figure 2:
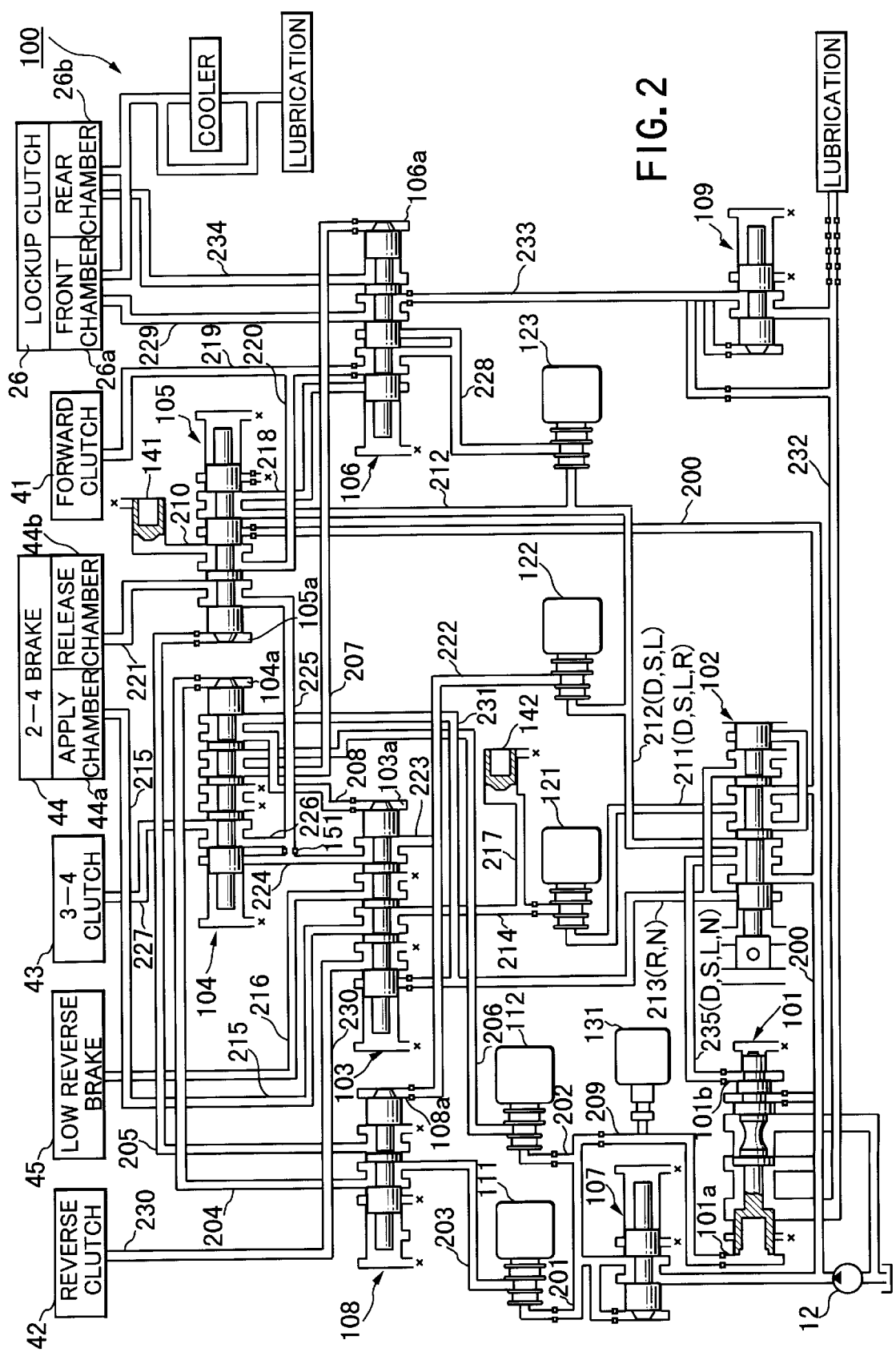
FIG. 2 is a hydraulic pressure control circuit of an automatic transmission according to an embodiment of the present invention.

Referring to FIG. 2, the hydraulic pressure control circuit 100 is provided with a regulator valve 101, a manual valve 102, a low reverse valve 103, a bypass valve 104, a 3-4 shift valve 105, a lockup shift valve 106, first and second on-off solenoid valves (hereinafter called "on-off SV") 111 and 112, a solenoid reducing valve 107, a solenoid relay valve 108, first, second and third duty solenoid valves (hereinafter called "duty SV") 121, 122 and 123 and the like. The regulator valve 101 generates a line pressure. The manual valve 102 is manually operated to switch the speed ranges. The low reverse valve 103 is operated in a speed chance operation to switch an oil path communicating with the respective frictional elements 41–45. The first and second on-off SVs 111 and 112 operates the valves 103–106. The reducing valve 107 generates a primary pressure which is supplied to the on-off SVs 111 and 112. The relay valve 108 switches the supply target to which the operating hydraulic pressure is supplied from the first on-off SV 111. The first, second and third duty SVs 121, 122 and 123 control (generate, adjust, supply and discharge) the operating hydraulic pressure supplied to the respective hydraulic pressure chambers of the frictional elements 41–45.

The on-off SVs 111 and 112 and the duty SVs 121–123 are all three-way valves. The three-way valve has two conditions one of which is that the upstream side of the oil path is communicated with the downstream side, the other of which is that the downstream side of the oil path is drained. In the latter condition, since the oil path in the upstream side is closed and the operating hydraulic pressure in the upstream side is therefore not discharged, the driving loss of the oil pump 12 is reduced.

When the on-off SVs 111 and 112 are ON, the upstream side of the oil path is communicated with the downstream side. A duty ratio of the on-off SVs 111 and 112 is defined as a ratio of a time period of ON during one ON-OFF cycle. When the on-off SVs 111 and 112 are OFF, the oil path is fully open with a duty ratio of 0%, and the oil path in the upstream side is closed and the operating hydraulic pressure in the downstream side is discharged with a duty ratio of 100%. Further, with an intermediate duty ratio, the hydraulic pressure in the downstream side has an adjusted pressure based on the duty ratio which is generated from the hydraulic pressure in the upstream side as a primary pressure.

The regulator valve 101 regulates a hydraulic pressure discharged from an oil pump 12 to be a predetermined line pressure. The line pressure is supplied through a main line 200 to the manual valve 102, the reducing valve 107 and the 3-4 shift valve 105.

The line pressure supplied to the reducing valve 107 is reduced to be a predetermined pressure and then supplied to the first and second on-off SVs 111 and 112 through lines 201 and 202.

When the first on-off SV 111 is ON, the above-mentioned predetermined pressure is supplied through a line 203 to the relay valve 108. When the spool of the relay valve 108 is positioned at a right side on FIG. 2, the predetermined pressure is further supplied as a pilot pressure through a line 204 to a control port 104a disposed at one end of the bypass valve 104 so that the spool of the bypass valve 104 is biased to the left side. On the other hand, when the spool of the relay valve 108 is positioned at a left side, the predetermined pressure is further supplied as a pilot pressure through a line 205 to a control port 105a disposed at one end of the 3-4 shift valve 105 so that the spool of the 3-4 shift valve 105 is biased to the right side.

When the second on-off SV 112 is ON, the above-mentioned predetermined pressure from the reducing valve 107 is supplied through a line 206 to the bypass valve 104. When the spool of the bypass 104 is positioned at a right side, the predetermined pressure is further supplied as a pilot pressure through a line 207 to a control port 106a disposed at one end of the lockup control valve 106 so that the spool of the control valve 106 is biased to the left side. On the other hand, when the spool of the bypass 104 is positioned at a left side, the predetermined pressure is further supplied as a pilot pressure through a line 208 to a control port 103a disposed at one end of the low reverse valve 103 so that the spool of the 3-4 shift valve 105 is biased to the left side.

Further, the above-mentioned predetermined pressure from the reducing valve 107 is also supplied through a line 209 to the regulating port 101a of the regulator valve 101. The predetermined pressure is regulated based on for example an engine load by a linear solenoid valve (hereinafter called "linear SV") 131 disposed on the line 209. Accordingly, the line pressure is regulated based on the engine load or the like by the regulator valve 101.

The main line 200 is communicated with the 3-4 shift valve 105 and is further communicated through a line 210 with a first accumulator 141 to introduce the line pressure into the accumulator 141, when the valve 105 is positioned at the right side.

The line pressure supplied to the manual valve 102 from the main line 200 is introduced into a first output line 211 and a second output line 212 in the respective forward ranges D, S and L. Further, the line pressure is introduced into the first output line 211 and a third output line 213 in the reverse range R, and is introduced into the third output line 213 in the neutral range N.

The first output line 211 is connected with the first duty SV 121 and supplies a line pressure to the first duty SV 121 as a primary control pressure. The downstream side of the first duty SV 121 is connected through a line 214 with the low reverse valve 103. The downstream side of the first duty SV 121 is further connected through a line 215 with the apply chamber 44a of the 2-4 brake 44 when the spool of the valve 103 is positioned at the right side, and is further connected through a line 216 with the hydraulic chamber of the low reverse-brake 45 when the spool of the low reverse valve 103 is positioned at the left side.

The second output line 212 is connected with the second duty SV 122 and the third duty SV 123, supplies a line pressure to the first and second duty SVs 122 and 124 as a primary control pressure, and is connected with the 3-4 shift valve 105. The line 212 connected with the 3-4 shift valve 105 is further connected through a line 218 with the lockup shift valve 106 when the spool of the valve 105 is positioned at the left side, and is further connected through a line 219 with the hydraulic chamber of the forward clutch 41 when the spool of the valve 106 is positioned at the left side.

The line 220, which branches from the line 219, is connected with the 3-4 shift valve 105. The line 220 is further connected through the line 210 with the first accumulator 141 when the spool of the valve 105 is positioned at left side and is further connected through a line 221 with the release chamber 44b of the 2-4 brake 44 when the spool of the valve 105 is positioned at the right side.

A primary control pressure is supplied from the second output line 212 to the second duty SV 122. The downstream side of the second duty SV 122 supplies a control pressure through a line 222 to a control port 108a disposed at an end of the relay valve 108 to bias the spool of the relay valve 108 to the left side. A line 223, which branches from the line 222, is connected with the low reverse valve 103, and is further connected with a line 224 when the spool of the valve 103 is positioned at the right side.

A line 225 branches through an orifice 151 from the line 224. The line 225 is connected with the 3-4 shift valve 105, and is further connected through a line 221 with the release chamber 44b of the 2-4 brake when the spool of the 3-4 shift valve 105 is positioned at the left side.

A line 226 branches from the line 225. The line 226 is connected with the bypass valve 104, and is further connected through a line 227 with the hydraulic chamber 44b of the 3-4 clutch 43 when the spool of the valve 104 is positioned at the right side.

The line 224 is directly connected with the bypass valve 104, and is further connected through the line 226 with the line 225 when the spool of the valve 104 is positioned at the left side. Namely, the line 224 is connected with the line 225 bypassing the orifice 151.

Primary control pressure is supplied from the second output line 212 to the third duty SV 123. The downstream side of the third duty SV 123 is connected through a line 228 with the lockup shift valve 106, and is further connected with the forward clutch line 219 when the spool of the valve 106 is positioned at the right side. The downstream side of the third duty SV 123 is connected through a line 229 with a front chamber 26a of the lockup clutch 26 when the spool of the valve 106 is positioned at the left side.

The third output line 213 connected with the manual valve 102 is connected with the low reverse valve 103 to supply line pressure to the valve 103. The line 213 is connected through a line 230 with a hydraulic chamber of the reverse clutch 42 when the spool of the valve 103 is positioned at the left side.

A line 231, which branches from the third output line 213, is connected with the bypass valve 104. When the spool of the valve 104 is positioned at the right side, the line 231 is connected through the line 208 with the control port 103a of the low reverse valve 103 to supply line pressure as a pilot pressure and to bias the spool of the valve 103 to the left side.

Further, the hydraulic pressure control circuit 100 is provided with a converter relief valve 109. The converter relief valve 109 regulates a hydraulic pressure supplied through a line 232 from the regulator valve 101 to a predetermined pressure, and supplies the regulated predetermined pressure to the lockup shift valve 106 through a line 233. The predetermined pressure is supplied through the line 229 to the front chamber 26a of the lockup clutch 26 when the spool of the lockup shift valve 106 is positioned at the right side, and the predetermined pressure is supplied through a line 234 to the rear chamber 26b of the lockup clutch 26 when the spool of the lockup shift valve 106 is positioned at the left side.

The lockup clutch 26 is disengaged when the predetermined pressure is supplied to the front chamber 26a, and is engaged when the predetermined pressure is supplied to the rear chamber 26b. When the lockup clutch 26 is engaged and the spool of the lockup shift valve 106 is positioned at the left side, operating hydraulic pressure generated by the third duty SV 123 is supplied into the front chamber 26a. As a result, the lockup clutch 26 obtains the engagement force based on the operating hydraulic pressure.

As explained above, the hydraulic pressure control circuit 100 controls the line pressure, which is regulated by the regulator valve 101 based on the engine load or the like, by the control pressure from the linear SV 131. The circuit 100 further controls the line pressure based on the speed ranges. Namely, a line 235 is connected with the manual valve 235, and is communicated with the main line 200 at D, S, L and N ranges. The line 235 is connected with a pressure reducing port 101b of the regulator valve 101 so that the line pressure at D, S, L and N ranges is regulated to be lower than that at R range.

Figure 3:
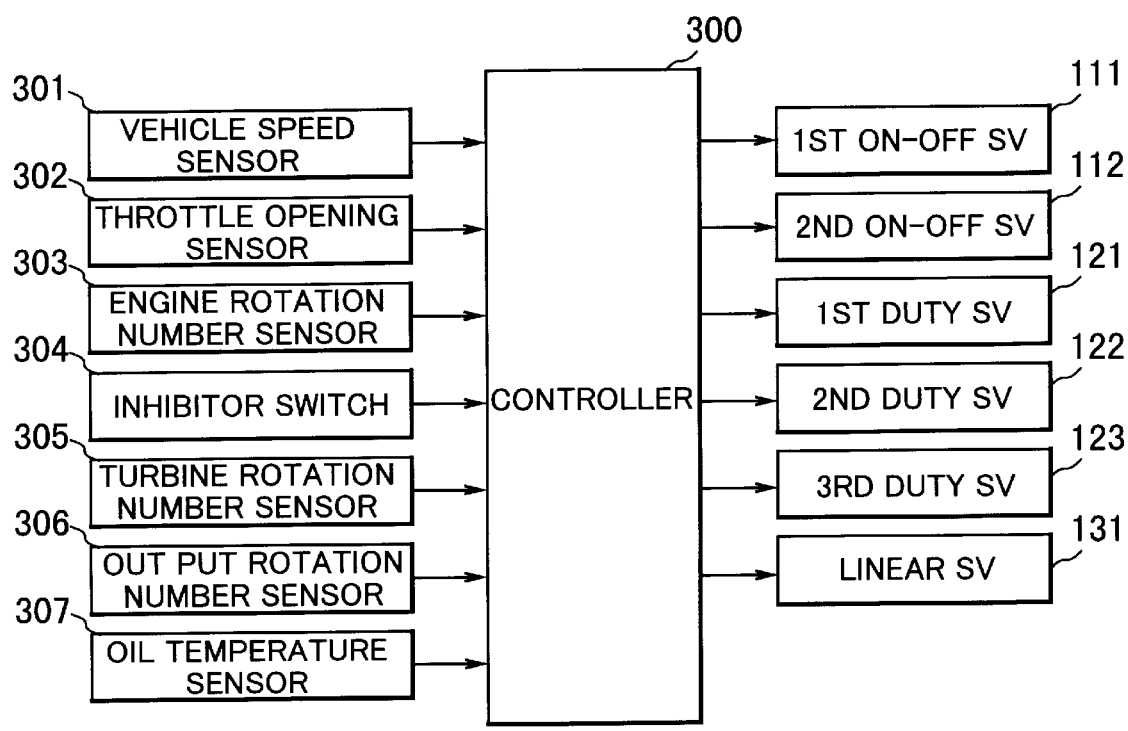
FIG. 3 is a control block diagram of the solenoid valves provided in the hydraulic pressure control circuit.

Referring to FIG. 3, there is provided a controller 300 which controls the first and second on-off SVs 111 and 112, the first, second and third duty SVs 121–123 and the linear SV 131 in the circuit 100.

There are provided a vehicle speed sensor 301 detecting a vehicle speed, a throttle opening sensor 302 detecting a throttle opening as a engine load, an engine rotation speed sensor 303 detecting an engine rotation speed, and an inhibitor switch 303 detecting the speed ranges selected by a driver. There are further provided a turbine rotation number sensor 305 detecting the rotation number of the turbine shaft 27 which is input to the speed change gears 30, an output rotation number sensor 306 detecting the output rotation number of the speed change gears 30, an oil temperature sensor 307 detecting the oil temperature and the like. The controller 300 obtains signals from the sensors 301–307 and the like. The controller 300 controls the on-off SVs 111 and 112, the duty SVs 121–123 and the linear SV 131 based on the vehicle conditions and/or engine conditions which are shown by the signals from the sensors and the switches 301–307.

Next, there will be explained the relationship at the respective speed ranges between the operating conditions of the first and second on-off SVs 111 and 112 and the first, second and third duty SVs 121–123 and the conditions of the hydraulic pressures supplied to and discharged from the hydraulic chambers of the frictional elements.

Table 2 shows a combination or a solenoid pattern in the respective speed ranges of the first and second on-off SVs 111 and 112 and the first, second and third duty SVs 121–123.

In Table 2, (o) respectively shows ON of the on-off SVs 111 and 112 and OFF of the first, second and third duty SVs 121–123, in both of which the upstream side of the oil path is communicated with the downstream side thereof. Further, (X) respectively shows OFF of the on-off SVs 111 and 112 and ON of the first, second and third duty SVs 121–123, in both of which the upstream side of the oil path is closed and the downstream side thereof is discharged. In (X(duty)) of the third duty SV 123, the downstream side of the oil path is discharged and an operating hydraulic pressure is generated in the downstream side by a duty control.

clutch pressure through the line 219 to the hydraulic chamber of the forward clutch 41 so that the forward clutch 41 is engaged.

Since the line 220 branching from the line 219 is communicated through the 3-4 shift valve and the line 210 with the accumulator 141, the forward clutch pressure is gradually supplied.

Figure 5:
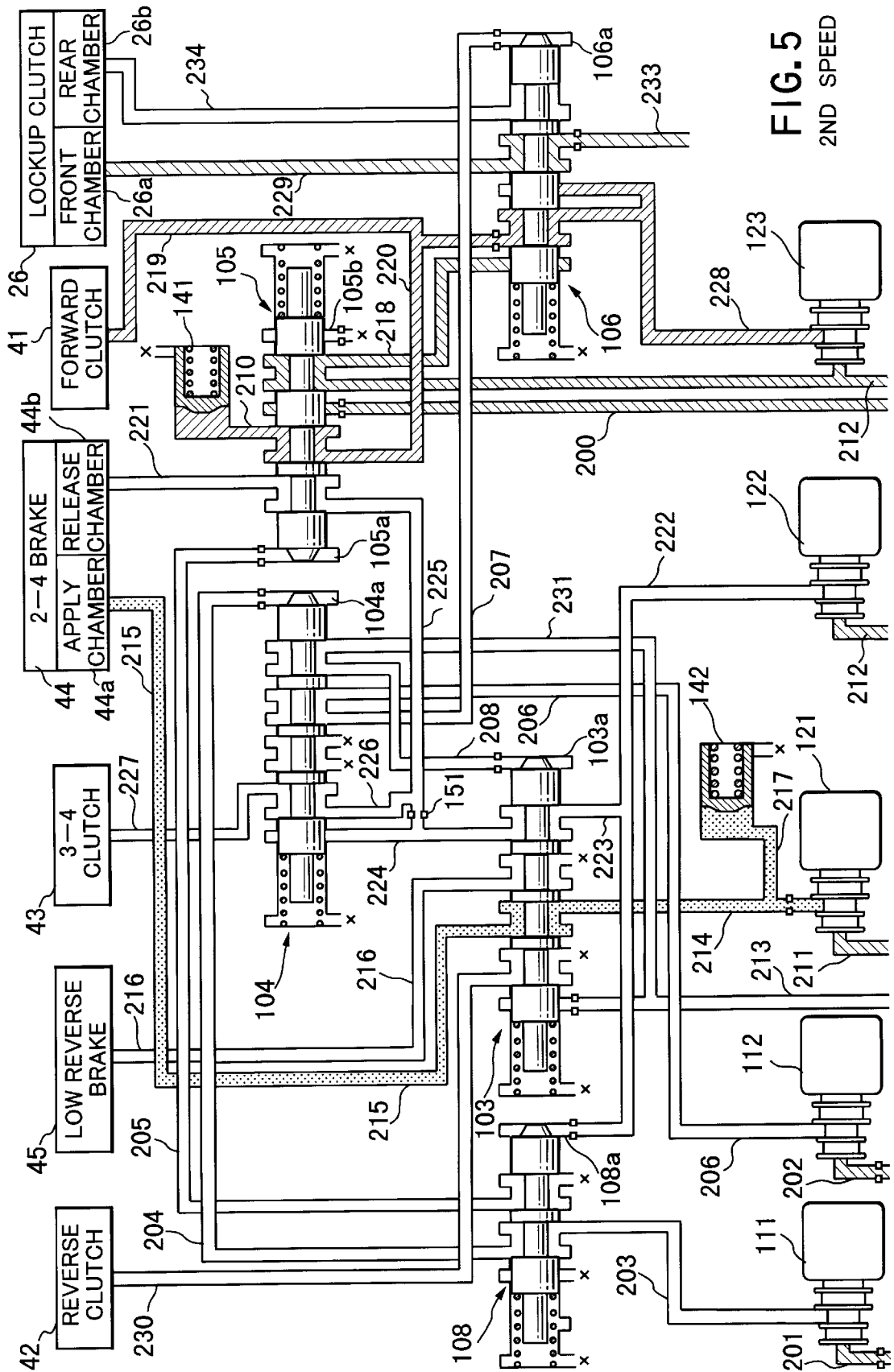
FIG. 5 is a partially enlarged view showing the hydraulic pressure control circuit of a 2nd speed.

Referring to Table 2 and FIG. 5, in the 2nd speed, the first duty SV 121 is also operated in addition to the condition of the above mentioned 1st speed. The first duty SV 121 generates an operating hydraulic pressure by using the line pressure from the first output line 211 as a primary pressure. The operating hydraulic pressure is supplied through the line 214 to the low reverse valve 103. The spool of the low reverse valve 103 is positioned at the right side in the 2nd speed, and the operating hydraulic pressure is supplied as a servo apply pressure through the line 215 to the apply chamber 44a of the 2-4 brake 44 so that the 2-4 brake 44 as well as the forward clutch 41 are applied or engaged.

Since the line 214 is communicated through the line 217 with the second accumulator 142, the servo apply pressure is gradually supplied and therefore the 2-4 brake 44 is gradually engaged. The hydraulic pressure accumulated in the accumulator 142 is pre-charged into the hydraulic chamber of the low reverse brake 45 when the low reverse valve 103 has moved to the left side during the speed change operation to the 1st speed at L range explained hereinafter.

Figure 6:
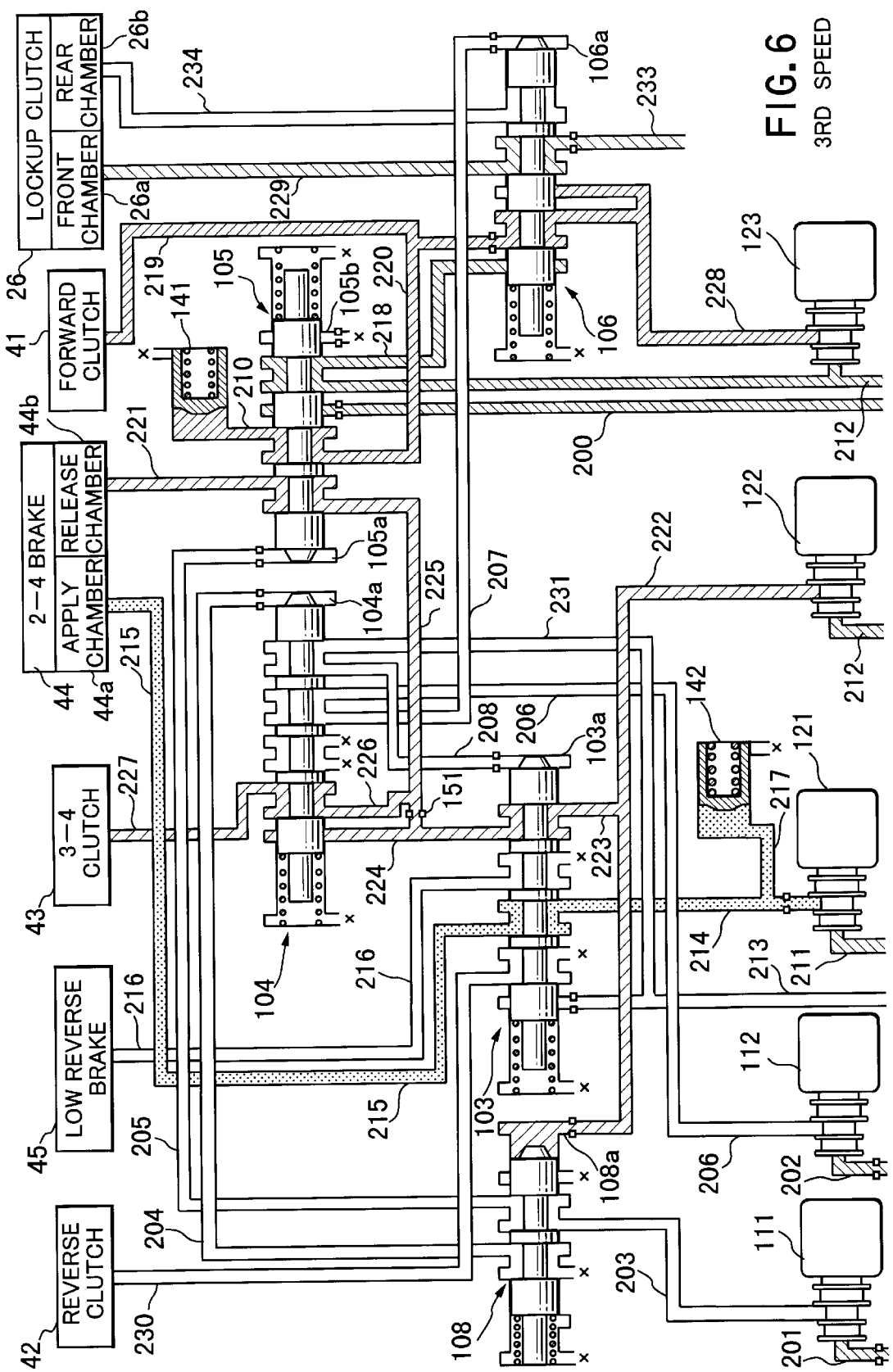
FIG. 6 is a partially enlarged view showing the hydraulic pressure control circuit of a 3rd speed.

Referring to Table 2 and FIG. 6, in the 3rd speed, the second duty SV 122 is also operated in addition to the condition of the above mentioned 2nd speed. The second duty SV 122 generates operating hydraulic pressure by using the line pressure from the second output line 212 as a primary pressure. The operating hydraulic pressure is supplied through the lines 222 and 223 to the low reverse valve 103. The spool of the low reverse valve 103 is positioned at the right side in the 3rd speed, and the operating hydraulic pressure is supplied to the line 224.

TABLE 2

| GEAR STAGE | RANGE | | | | | | | |
|---|---|---|---|---|---|---|---|---|
| | D | | | | | | | |
| | 1ST SPEED | 2ND SPEED | 3RD SPEED | 3RD SPEED LOCKUP | 4TH SPEED | 4ST SPEED LOCKUP | L I | R |
| 1ST ON-OFF SV (111) | X | X | X | X | ○ | ○ | ○ | ○ |
| 2ND ON-OFF SV (112) | X | X | X | ○ | X | ○ | ○ | ○ |
| 1ST DUTY SV (121) | X | ○ | ○ | ○ | ○ | ○ | ○ | ○ |
| 2ND DUTY SV (122) | X | X | ○ | ○ | ○ | ○ | X | ○ |
| 3RD DUTY SV (123) | ○ | ○ | ○ | X (DUTY) | X | X (DUTY) | ○ | ○ |

Figure 4:
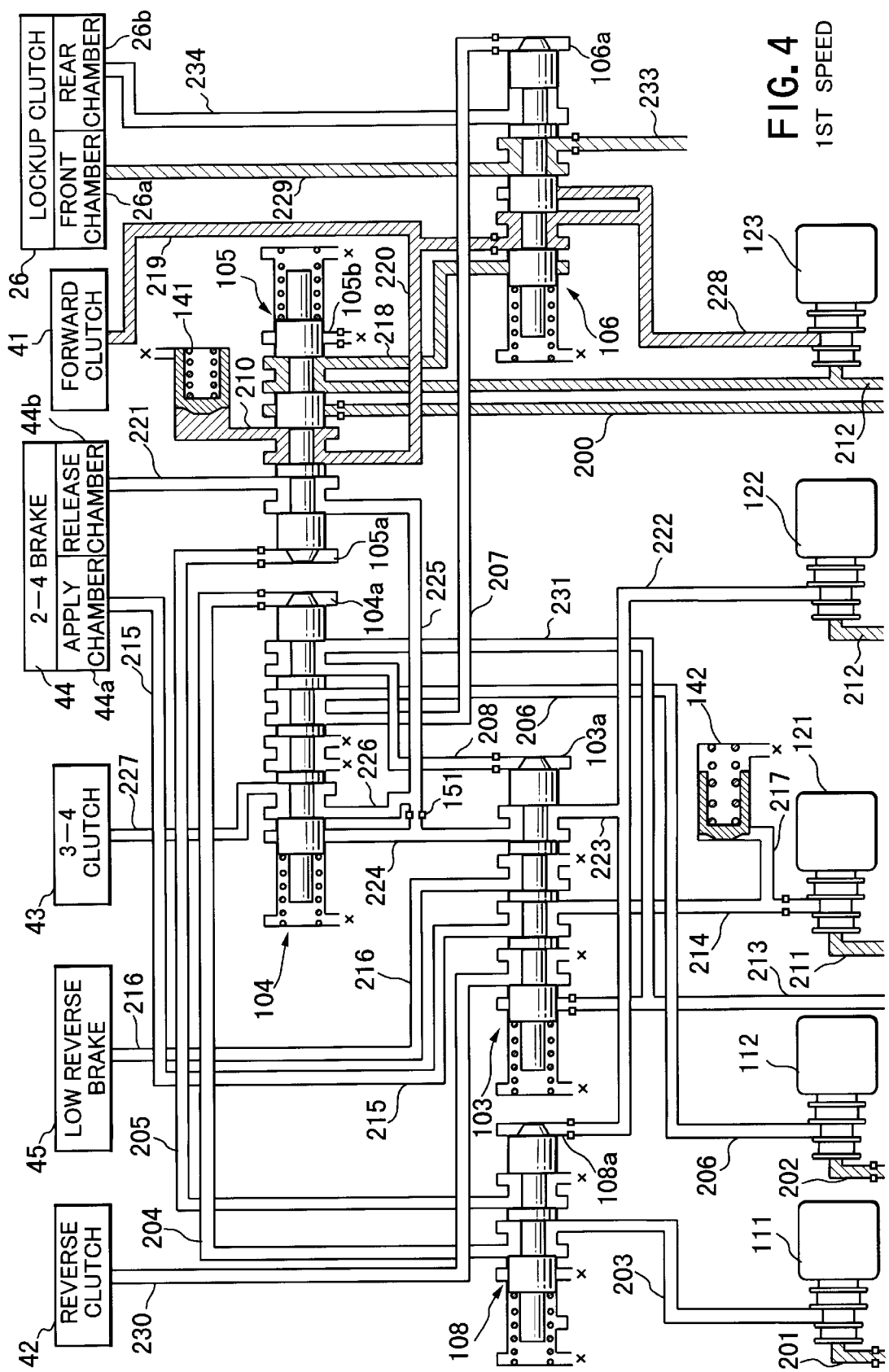
FIG. 4 is a partially enlarged view showing the hydraulic pressure control circuit of a 1st speed.

Referring to Table 2 and FIG. 4, in the 1st speed (except the first speed at L range), the third duty SV 123 is only operated. The third duty SV 123 generates an operating hydraulic pressure by using the line pressure from the second output line 212 as a primary pressure, and the operating hydraulic pressure is supplied through the line 228 to the lockup shift valve 106. The spool of the lockup shift valve 106 is positioned at the right side in the 1st speed, and the operating hydraulic pressure is supplied as a forward The operating hydraulic pressure generated by the second duty SV 122 is introduced through the line 224 and the orifice 151 into the line 225 and further introduced into the 3-4 shift valve 105. The spool of the 3-4 shift valve 105 is positioned at the left side in the 3rd speed, and the operating hydraulic pressure is supplied as a servo release pressure through the line 221 to the release chamber 44b of the 2-4 brake 44 so that the 2-4 brake is released.

The line 226 branches from the line 225 which also branches through the orifice 151 from the line 224. The operating hydraulic pressure is introduced through the line 226 into the bypass valve 104. The spool of the bypass valve 104 is positioned at the right side, and the operating hydraulic pressure is supplied as a 3-4 clutch pressure through the line 227 to the hydraulic chamber of the 3-4 clutch 43. Accordingly, in the 3rd speed, the forward clutch 41 and the 3-4 clutch 43 are both engaged and the 2-4 brake 44 is released.

In the 3rd speed, the second duty SV 122 generates the operating hydraulic pressure as explained above. The operating hydraulic pressure is supplies through the line 222 to the control port 108a of the relay valve 108 so that the spool of the relay valve 108 moves to the left side.

Figure 7:
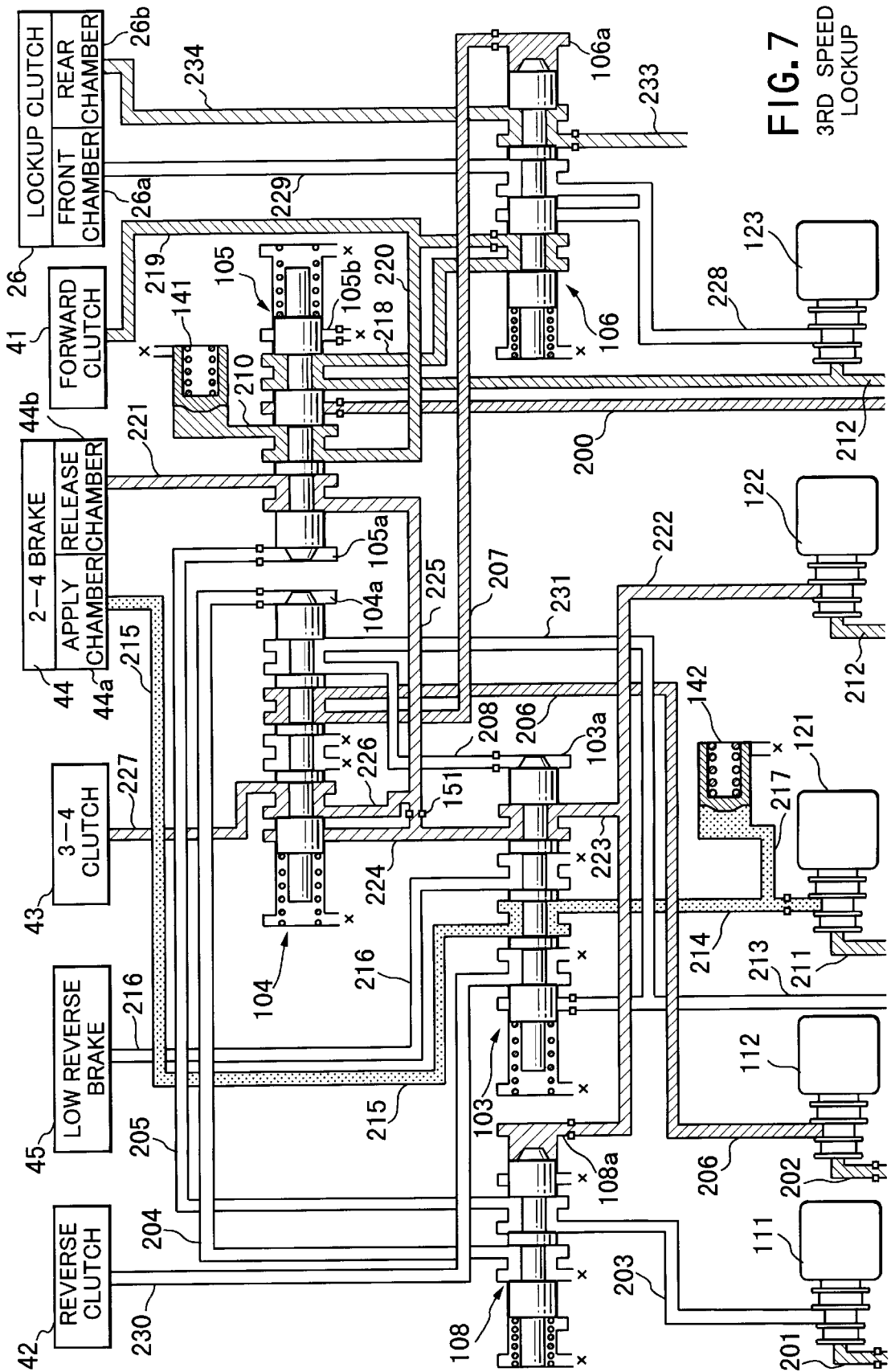
FIG. 7 is a partially enlarged view showing the hydraulic pressure control circuit of a 3rd speed lockup condition.

Referring to Table 2 and FIG. 7, when the lockup clutch 26 is engaged in the 3rd speed, the second on-off SV 112 is first operated on the condition of the 3rd speed. When the SV 112 is operated, the predetermined pressure from the reducing valve 107 (see FIG. 2) is supplied through the second on-off SV 112, the line 206, the bypass valve 104 and the line 207 to the control port 106a of the lockup shift valve 106 so that the spool of the lockup shift valve 106 is moved to the left side. At this time, the operating hydraulic pressure from the line 212 is supplied through the 3-4 shift valve 105, the line 218 and the like to the hydraulic pressure of the forward clutch 41 so that the forward clutch 41 is engaged.

At this time, while the predetermined pressure is supplied from the converter relief valve 109 (see FIG. 2) through the lines 233 and 234 to the rear chamber 26b of the lockup clutch 26, the operating hydraulic pressure in the front chamber 26b is discharged or duty-controlled by the third duty SV 123. Thus, the lockup clutch 26 is controlled so as to be engaged or on a slip condition.

Figure 8:
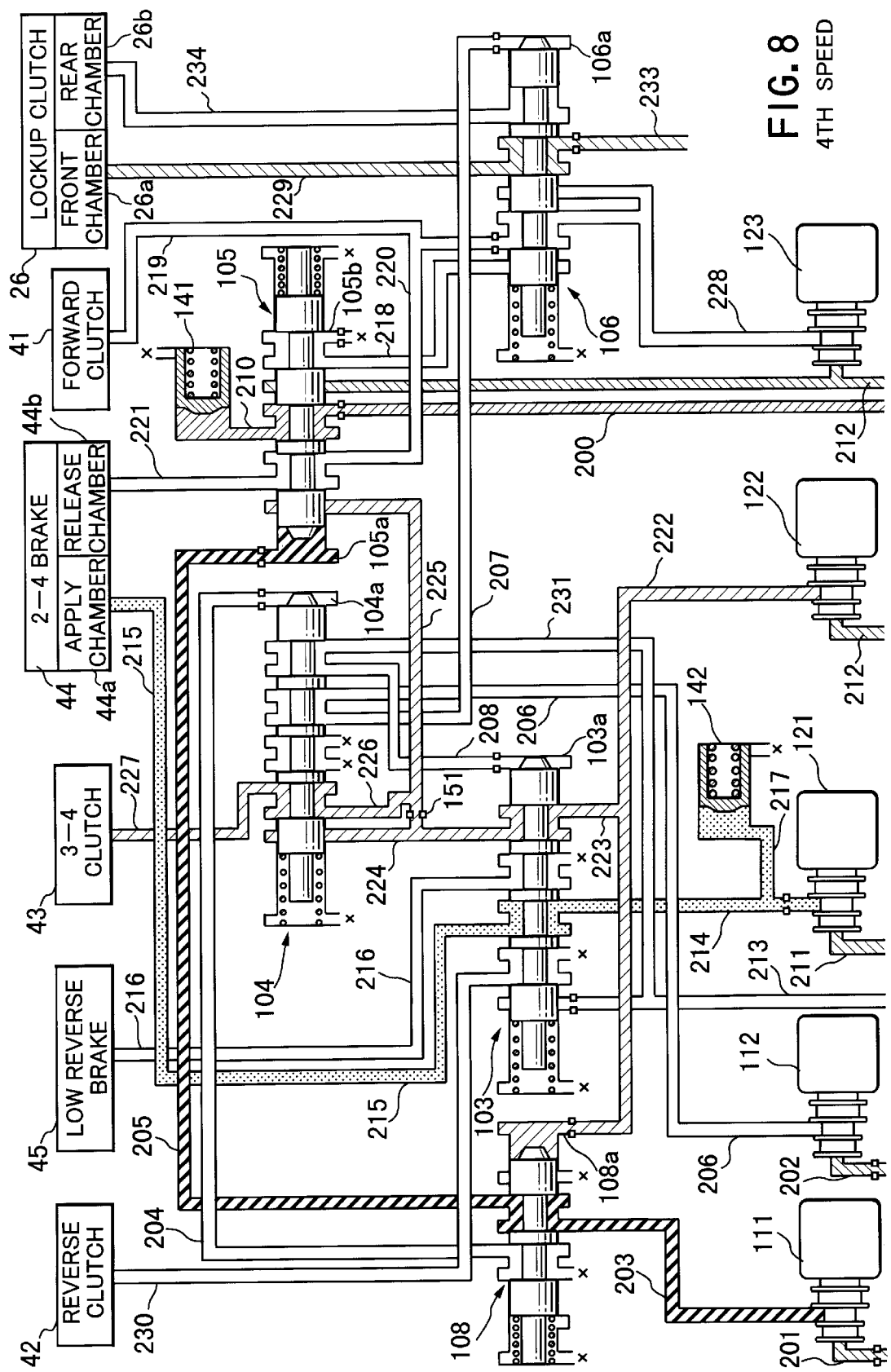
FIG. 8 is a partially enlarged view showing the hydraulic pressure control circuit of a 4th speed.

Referring to Table 2 and FIG. 8, in the 4th speed, the third duty SV 123 first generates an operating hydraulic pressure on the condition of 3rd speed, and the first on-off SV 111 is operated.

When the first on-off SV 111 is operated, the predetermined pressure from the line 201 is supplied through the line 203 to the relay valve 108. At this time, since the spool of the relay valve 108 is positioned at the left side on the condition of the 3rd speed as explained above, the predetermined pressure is supplied through the line 205 to the control port 105a of the 3-4 shift valve 105 so that the spool of the valve 105 is moved to the right side.

As a result, the line 221 communicated with the release chamber 44b of the 2-4 brake 44 is connected through the 3-4 shift valve 105 with the line 220, which branches from the line 219 communicated with the forward clutch 41, so that the release chamber 44b of the 2-4 brake 44 is communicated with the hydraulic chamber of the forward clutch 41.

When the third duty SV 123 stops generating the operating hydraulic pressure such that the downstream side is drained, the operating hydraulic pressures in the release chamber 44b of the 2-4 brake 44 and the hydraulic chamber of the forward clutch 41 are drained through the lockup shift valve 106 and the line 228 by the third duty SV 123. Thus, the 2-4 brake is again applied and the forward clutch 41 is disengaged.

Figure 9:
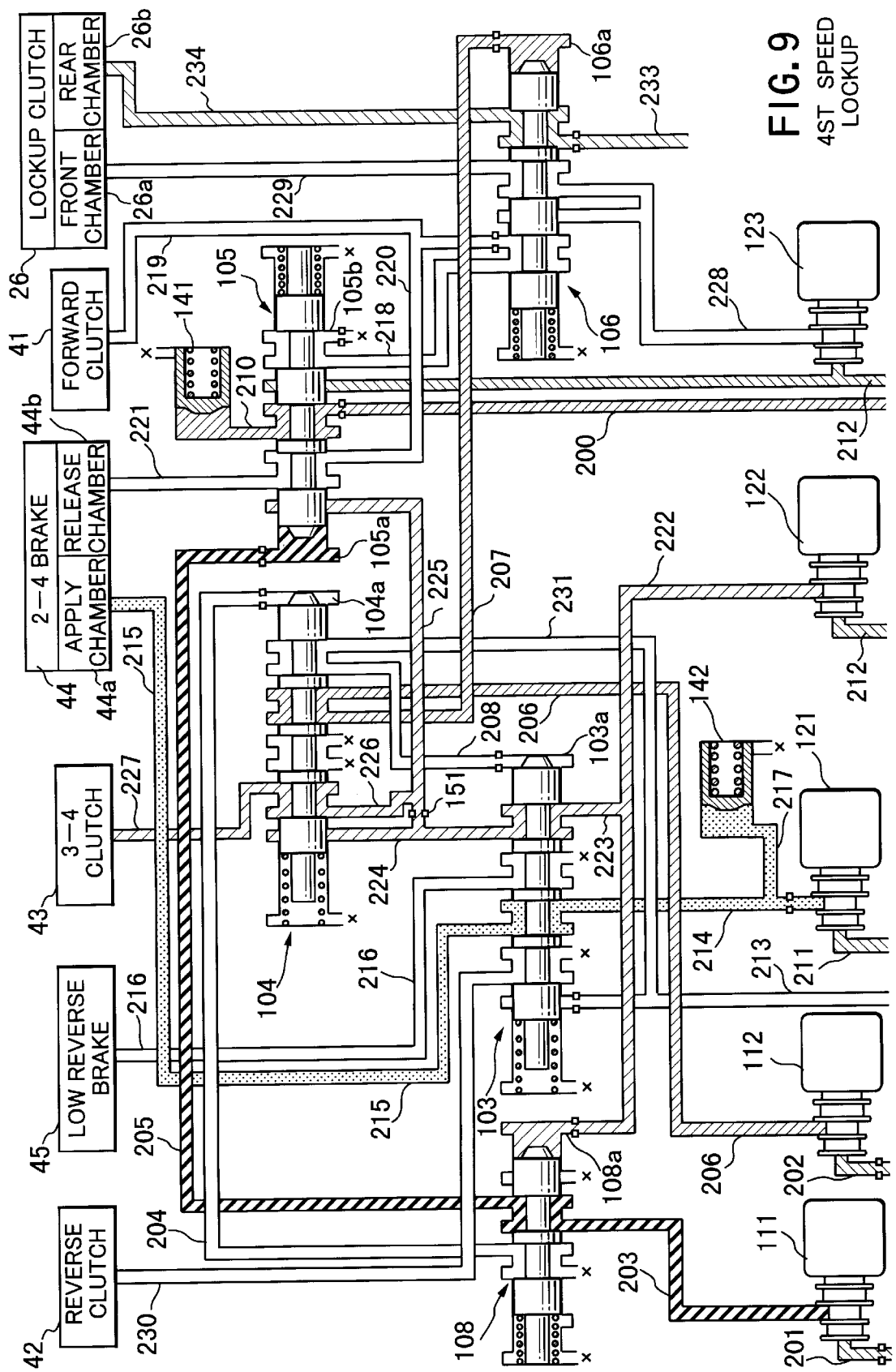
FIG. 9 is a partially enlarged view showing the hydraulic pressure control circuit of a 4th speed lockup condition.

Referring to Table 2 and FIG. 9, when the lockup clutch 26 is engaged in the 4th speed, as in the 3rd speed, second on-off SV 112 is first operated on the condition of the 4th speed. When the SV 112 is operated, the spool of the lockup shift valve 106 is moved to the left side. At this time, while the predetermined pressure is supplied through the lines 233 and 234 to the rear chamber 26b of the lockup clutch 26, the operating hydraulic pressure in the front chamber 26b is discharged or duty-controlled by the third duty SV 123. Thus, the lockup clutch 26 is controlled so as to be engaged or on a slip condition.

Further, in the 4th speed, since the spool of the 3-4 shift valve 105 is positioned at the right side, the line 219 communicated with the forward clutch 41 is connected through the line 220 with the line 221 communicated with the release chamber 44b of the 2-4 brake 44. The lines 219 and 220 are connected through the line 218 with the 3-4 shift valve 105 and connected with the drain port 105b of the valve 105 since the spool of the lockup shift valve 106 is positioned at the left side.

Accordingly, when the lockup clutch 26 is engaged in the 4th speed, the forward clutch pressure and the servo release pressure are respectively switched from the condition of being discharged by the third duty SV 123 to the condition of being drained from the drain port 105b of the 3-4 shift valve 105. As a result, the forward clutch 41 is maintained to be disengaged, and the 2-4 brake 44 is maintained to be applied.

Figure 10:
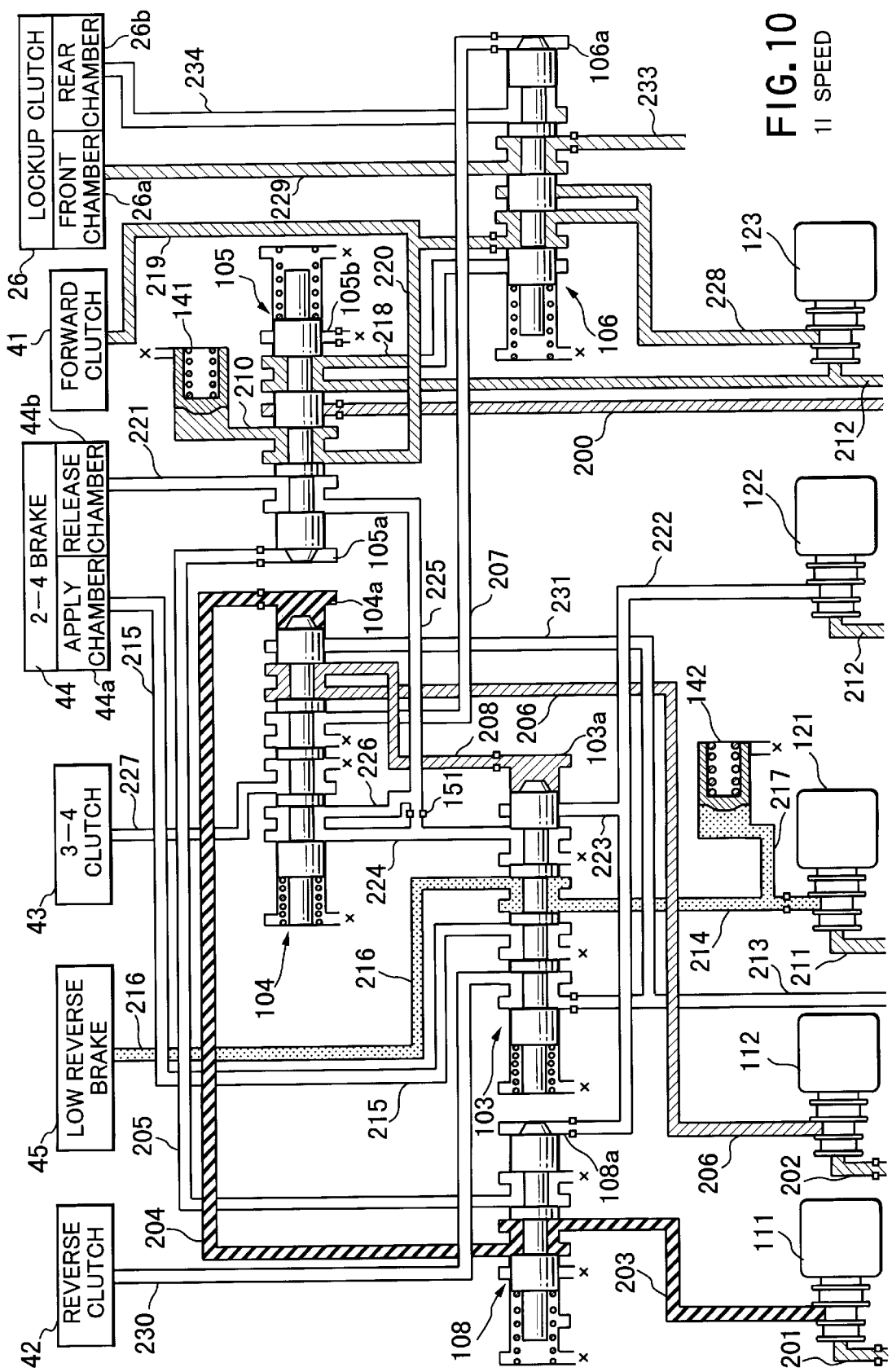
FIG. 10 is a partially enlarged view showing the hydraulic pressure control circuit of the 1st speed in the L range.

Referring to Table 2 and FIG. 10, in the 1st speed of L range, the first and second on-off SVs 111 and 112 and the first and third duty SVs 121 and 123 are operated. As in the 1st speed of D range or the like, operating hydraulic pressure generated by the third duty SV 123 is supplied as forward clutch pressure through the line 228, the lockup shift valve 106 and the line 219 to the hydraulic pressure chamber of the forward clutch 41 so that the forward clutch 41 is engaged. At this time, the operating hydraulic pressure is introduced through the line 220, the 3-4 shift valve 1-5 and the line 210 to the first accumulator 141 so that the forward clutch 41 is gradually engaged.

When the first on-off SV 111 is operated, pilot pressure is introduced through the line 203, the relay valve 108 and the line 204 to the control port 104a of the bypass valve 104 so that the spool of the valve 104 is moved to the left side. Then, the operating hydraulic pressure from the second on-off SV 112 is supplied through the line 206, the bypass valve 104 and the line 208 to the control port 103a of the low reverse valve 103 so that the spool of the valve 103 is moved to the left side.

Accordingly, the operating hydraulic pressure generated by the first duty SV 121 is supplied as a low reverse brake pressure through the line 214, the low reverse valve 103 and the line 216 to the hydraulic pressure chamber of the low reverse brake 45 so that the low reverse brake 45 is applied in addition to the engagement of the forward clutch 41. As a result, the 1st speed, in which an engine brake is operated, can be obtained.

Figure 11:
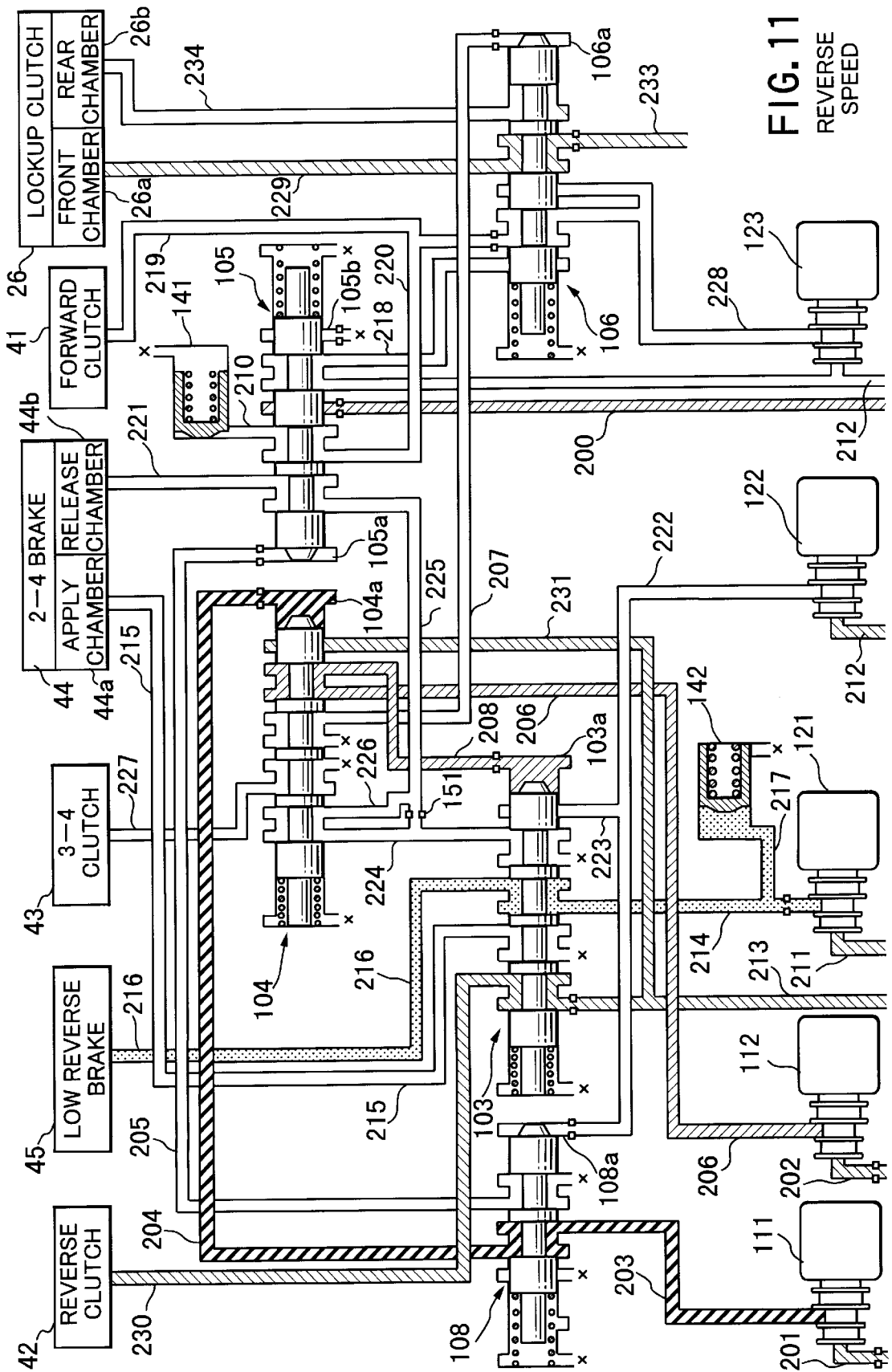
FIG. 11 is a partially enlarged view showing the hydraulic pressure control circuit of a reverse speed.

Referring to Table 2 and FIG. 11, in R range, the first and second on-off SVs 111 and 112 and the first to third duty SVs 121–123 are operated. Here, since the supply of the primary from the second output line 212 is stopped by the manual valve 102, the second and third duty SVs 122 and 123 does not generate the operating hydraulic pressure.

In R range, as explained above, since the first and second on-off SVs 111 and 112 are operated, as in the 1st speed of L range, the spool of the bypass valve 104 is moved to the left side and then the spool of the low reverse valve 103 is also moved to the left side. Under this condition, an operating hydraulic pressure is generated by the first duty SV 121, and the operating hydraulic pressure is supplied as a low reverse brake pressure to the hydraulic pressure chamber of the low reverse brake 45.

Further, in R range, the line pressure is introduced from the manual valve 102 to the third output line 213, and the line pressure is supplied as reverse clutch pressure through the low reverse valve 103, whose spool is moved to the left side, and the line 230 to the hydraulic pressure chamber of the reverse clutch 42. Accordingly, the reverse clutch 42 and the low reverse brake 45 are engaged or applied.

Next, the fail-safe control by the controller 300 in FIG. 3 will be explained. The fail-safe control is carried out for the mechanical failures of the first and second on-off SVs 111 and 112 and the first, second and the third duty SVs 121–123. Before explaining the fail-safe control, the structures of the respective valves 111, 112 and 121–123.

Figure 12:
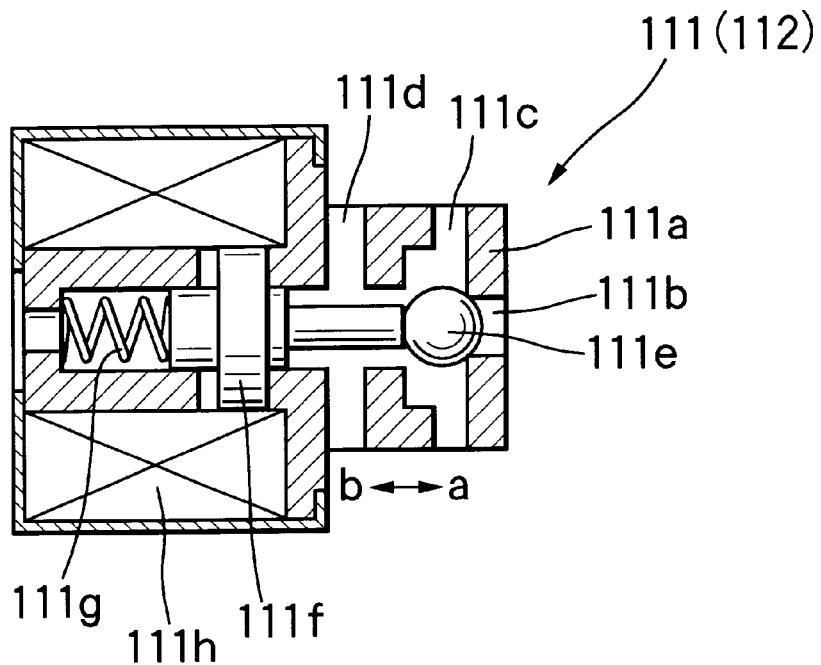
FIG. 12 is a sectional view showing an on-off solenoid valve.

FIG. 12 is a sectional view showing the first on-off SV (solenoid valve) 111. The second on-off SV 112 has a same structure as that of the first SV 111. Referring to FIG. 12, the on-off SV 111 is provided with a body 111a, an upstream side port 111b communicating with the hydraulic pressure source, a downstream side port 111c communicating with the frictional element, and a drain port 111d. The upstream side port 111b is provided on an end surface of the body 111a and the downstream side port 111c and the drain port 111d are provided on the circumference surface of the body 111a. The on-off SV 111 is further provided with a plunger 111f having a ball member 111e. The plunger 111f switches one condition where the downstream side port 111c is communicated with the drain port 111d and not communicated with the upstream side port 111b to the other condition where the downstream side port 111c is communicated with the upstream side port 111b and not communicated with the drain port 111d. The on-off SV 111 is further provided with a spring 111g which bias the plunger 111f to the direction shown as the direction "a" in FIG. 12 such that the upstream side port 111b is not communicated with the downstream side port 111c. The on-off SV 111 is further provided with a coil 111h which moves the plunger 111f by an electromagnetic force to the direction shown as the direction "b" in FIG. 12. The controller 300 sends on-off signals as control signals to the coil 111h.

Accordingly, when the on-off signal is OFF or the power is not supplied to the coil 111h, the plunger 111f is maintained by the spring 111g at the position as shown in FIG. 12 where the upstream side port 111b is not communicated with the downstream side port 111c. At this time, the hydraulic pressure is not supplied from the source to the frictional element and the hydraulic pressure in the frictional element is drained. On the other hand, when the on-off signal is ON or the power is supplied to the coil 111h, the plunger 111f is moved by the electromagnetic force to the direction "b" against the biasing force of the spring 111g. At this time, the upstream side port 111b is communicated with the downstream side port 111c and the hydraulic pressure is supplied from the source to the frictional element.

Figure 13:
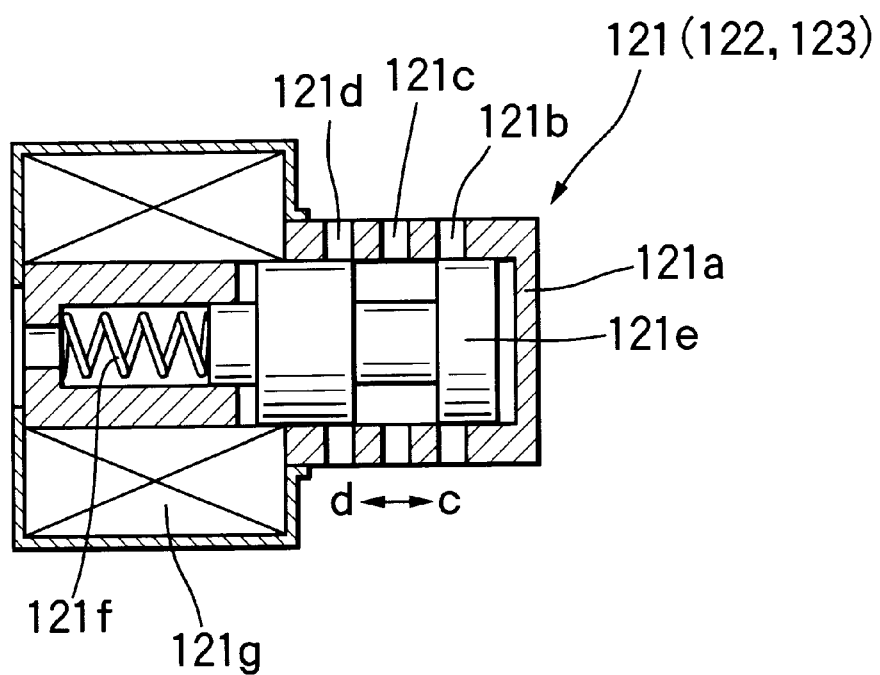
FIG. 13 is a sectional view showing a duty solenoid valve.

FIG. 13 is a sectional view showing the first duty SV (solenoid valve) 121. The second and third duty SVs 122 and 123 have same structures as that of the first duty SV 121. Referring to FIG. 13, the duty SV 121 is provided with a body 121a, an upstream side port 121b communicating with the hydraulic pressure source, a downstream side port 121c communicating with the frictional element, and a drain port 121d. Those ports 121b, 121c and 121d are provided on the circumference surface of the body 121a. The duty SV 121 is further provided with a plunger 121e. When the plunger 121e is moved to the direction "c", the downstream side port 121c is communicated with the upstream side port 121b and not communicated with the drain port 121d. When the plunger 121e is moved to the direction "d", the downstream side port 121c is communicated with the drain port 121d and not communicated with the upstream side port 121b. The duty SV 121 is further provided with a spring 121f, which bias the plunger 121e to the direction "c", and a coil 111g, which moves the plunger 11e by using an electromagnetic force to the direction "d" against the biasing force of the spring 121f. The controller 300 sends a duty signal as a control signal to the coil 121g such that the duty SV 121 becomes repeatedly ON and OFF in a predetermined cycle.

When the controller 300 sends a duty signal of OFF, the plunger 121e is moved to the direction "c" so that the downstream side port 121c is communicated with the upstream side port 121b and the hydraulic pressure supplied to the frictional element is increased. When the controller 300 sends a duty signal of ON, the plunger 121e is moved to the direction "d" so that the downstream side port 121c is communicated with the drain port 121d and the hydraulic pressure supplied to the frictional element is decreased.

Thus, according to the above mentioned duty SVs 121–123, when the duty ratio (a ratio of ON period in one ON-OFF cycle) is small, the supplied hydraulic pressure to the frictional elements becomes high, and the primary hydraulic pressure is therefore just supplied to the frictional elements when the duty ratio is 0%.

By the way, in such kinks of the solenoid valves 111, 112 and 121–123, the mechanical failures, such as a leak or a sticking of the plunger because of a catching of extraneous materials or the like and a poor operation of the plunger because of a damage of the spring might occur. When such mechanical failures occur, the hydraulic pressure supplied to or drained from the frictional elements might not be controlled as the on-off signal instructs, nor the hydraulic pressure might not be regulated as the duty signal instructs, even though the on-off signal and the duty signal are normally sent. In this case, the gear stage to be obtained by the instruction output corresponding to the driving condition or the like might not be actually obtained. The ON and OFF conditions (engaged and disengaged) of the lockup clutch might not be established as instructed. During switching operation from the non-traveling range such as N range to the traveling range such as D range, the frictional element might not be engaged as instructed.

According to the embodiment of the present invention, the controller 300 first determines whether the gear stage is actually established as instructed, whether the condition of the lockup clutch 26 is actually obtained as instructed, and whether the frictional element is actually engaged or disengaged as instructed. If such instruction is not carried out, the controller 300 determines what kinds of the mechanical failures have occurred in which solenoid valve of respective solenoid valves 111, 112 and 121–123 based on the abnormal conditions, and a fail-safe control is finally carried out corresponding to the determined results.

Table 3 shows the relationship between the mechanical failures of the solenoid valves and the abnormal conditions generated in the respective gear stages and the lockup clutch 26 according to the mechanical failures.

In Table 3, "OFF failure" in the respective solenoid valves means the mechanical failure in which the solenoid valve is OFF contrary to an ON instruction. Specifically, the on-off SVs 111 and 112 are on the condition that the hydraulic pressure is not supplied from the hydraulic pressure source to the frictional elements. The duty SVs 121–123 are on the condition that the hydraulic pressure is supplied from the hydraulic pressure source to the frictional elements. Further, "ON failure" in the respective solenoid valves means the mechanical failure in which the solenoid valve is ON contrary to an OFF instruction. Specifically, the on-off SVs 111 and 112 are on the condition that the hydraulic pressure is supplied from the hydraulic pressure source to the frictional elements. The duty SVs 121–123 are on the condition that the hydraulic pressure is not supplied from the hydraulic pressure source to the frictional elements.

Hereinafter, for example, the instruction, instructing that the gear stage is established to be 4th speed and the lockup clutch 20 is to be OFF, is called as "4th speed instruction". The instruction, instructing that the gear stage is established to be 4th speed and the lockup clutch 20 is to be ON, is called as "4th speed lockup instruction". Further, when the actually established gear stage is different from the instructed gear stage or the neutral stage is established contrary to the instruction, such abnormal condition is called as "gear failure". The abnormal condition that the lockup clutch 26 is OFF contrary to the ON instruction is called as "lockup OFF failure". The abnormal condition that the lockup clutch 26 is ON contrary to the OFF instruction is called as "lockup ON failure". The abnormal condition that the engagement operation is not carried out as instructed is called as "engagement failure".

In Table 3, (○) shows the cases where none of "gear failure", "lockup OFF failure" and "lockup ON failure" in the "OFF failure" and "ON failure" of the respective solenoid valves are generated, and (X) shows the cases where the failure is generated. Table 4 is obtained by rewriting Table 3 by using (○) and (x).

TABLE 3

| INSTRUCTION | 1ST SPEED | 2ND SPEED | 3RD SPEED | 3RD SPEED LOCKUP | 4TH SPEED | 4TH SPEED LOCKUP |
|---|---|---|---|---|---|---|
| 1ST ON-OFF SV OFF FAILURE | 1ST SPEED | 2ND SPEED | 3RD SPEED | 3RD SPEED LOCKUP | NEUTRAL | 3RD SPEED LOCKUP |
| 1ST ON-OFF SV ON FAILURE | 1ST SPEED | 2ND SPEED | 3RD SPEED | 4ST SPEED LOCKUP | 4TH SPEED | 4TH SPEED LOCKUP |
| 2ND ON-OFF SV OFF FAILURE | 1ST SPEED | 2ND SPEED | 3RD SPEED | NEUTRAL | 4TH SPEED | 4TH SPEED |
| 2ND ON-OFF SV ON FAILURE | 1ST SPEED | 2ND SPEED | 3RD SPEED | 3RD SPEED LOCKUP | 4TH SPEED LOCKUP | 4TH SPEED LOCKUP |
| 1ST DUTY SV OFF FAILURE | 2ND SPEED | 2ND SPEED | 3RD SPEED | 3RD SPEED LOCKUP | 4TH SPEED | 4TH SPEED LOCKUP |
| 1ST DUTY SV ON FAILURE | 1ST SPEED | 1ST SPEED | 3RD SPEED | 3RD SPEED LOCKUP | NEUTRAL | NEUTRAL |
| 2ND DUTY SV OFF FAILURE | 3RD SPEED | 3RD SPEED | 3RD SPEED | 3RD SPEED LOCKUP | 4TH SPEED | 4TH SPEED LOCKUP |
| 2ND DUTY SV ON FAILURE | 1ST SPEED | 2ND SPEED | 2ND SPEED | 2ND SPEED LOCKUP | NEUTRAL | NEUTRAL |
| 3RD DUTY SV OFF FAILURE | 1ST SPEED | 2ND SPEED | 3RD SPEED | 3RD SPEED LOCKUP | 3RD SPEED | 4TH SPEED |
| 3RD DUTY SV ON FAILURE | NEUTRAL ENGAGEMENT FAILURE | NEUTRAL ENGAGEMENT FAILURE | NEUTRAL ENGAGEMENT FAILURE | 3RD SPEED LOCKUP | 4TH SPEED | 4TH SPEED LOCKUP |

TABLE 4

| | INSTRUCTION | | | | | | | | | |
|---|---|---|---|---|---|---|---|---|---|---|
| | 1ST | 2ND | 3RD SPEED | | 3RD SPEED LOCKUP | | 4TH SPEED | | 4TH SPEED LOCKUP | |
| KINDS OF FAILURE | SPEED GEAR FAILURE | SPEED GEAR FAILURE | GEAR FAILURE | LOCKUP ON FAILURE | GEAR FAILURE | LOCKUP ON FAILURE | GEAR FAILURE | LOCKUP ON FAILURE | GEAR FAILURE | LOCKUP ON FAILURE |
| 1ST ON-OFF SV OFF FAILURE | ○ | ○ | ○ | ○ | ○ | ○ | X (NEUTRAL) | ○ | X (3RD SPEED) | ○ |
| 1ST ON-OFF SV ON FAILURE | ○ | ○ | ○ | ○ | X (4TH SPEED) | ○ | ○ | ○ | ○ | ○ |
| 2ND ON-OFF SV OFF FAILURE | ○ | ○ | ○ | ○ | X (NEUTRAL) | ○ | ○ | ○ | ○ | X |
| 2ND ON-OFF SV ON FAILURE | ○ | ○ | ○ | ○ | ○ | ○ | ○ | X | ○ | ○ |
| 1ST DUTY SV OFF FAILURE | X (2ND SPEED) | ○ | ○ | ○ | ○ | ○ | ○ | ○ | ○ | ○ |
| 1ST DUTY SV ON FAILURE | ○ | X (1ST SPEED) | ○ | ○ | ○ | ○ | X (NEUTRAL) | ○ | X (NEUTRAL) | ○ |
| 2ND DUTY | X | X | ○ | ○ | ○ | ○ | ○ | ○ | ○ | ○ |

TABLE 4-continued

| | | | 3RD SPEED | | 3RD SPEED LOCKUP | | 4TH SPEED | | 4TH SPEED LOCKUP | |
|---|---|---|---|---|---|---|---|---|---|---|
| | 1ST | 2ND | 3RD SPEED | | LOCKUP | | 4TH SPEED | | LOCKUP | |
| KINDS OF FAILURE | SPEED GEAR FAILURE | SPEED GEAR FAILURE | GEAR FAILURE | LOCKUP ON FAILURE | GEAR FAILURE | LOCKUP ON FAILURE | GEAR FAILURE | LOCKUP ON FAILURE | GEAR FAILURE | LOCKUP ON FAILURE |
| SV OFF FAILURE | (3RD SPEED) | (3RD SPEED) | | | | | | | | |
| 2ND DUTY SV ON FAILURE | O | O | X (2ND SPEED) | O | X (2ND SPEED) | O | X (NEU-TRAL) | O | X (NEU-TRAL) | O |
| 3RD DUTY SV OFF FAILURE | O | O | O | O | O | O | X (3RD SPEED) | O | O | X |
| 3RD DUTY SV ON FAILURE | X (ENGAGE-MENT FAILURE) | X (ENGAGE-MENT FAILURE) | X (ENGAGE-MENT FAILURE) | O | O | O | O | O | O | O |

Next, the contents of the Tables 3 and 4 will be explained in detail. When there is an OFF failure of the first on-off SV 111, two failures are generated. The failures are the gear failure of the gear stage becoming a neutral condition at a 4th speed instruction and a gear failure of the gear stage becoming a 3rd speed at a 4th speed lockup instruction.

Namely, on the 4th speed condition shown in FIG. 8, when the first on-off SV 111 is OFF, since the pilot pressure is not supplied from the lines 203 and 205 to the control port 105a of the 3-4 shift valve 105, the spool of the 3-4 shift valve 105 is positioned at the left side. Therefore, the 3-4 clutch pressure generated by the second duty SV 122 is supplied from the line 225 through the 3-4 shift valve 105 and the line 221 to the release chamber 44b of the 2-4 brake 44. As a result, the 2-4 brake 44 is released and the gear stage becomes neutral.

Further, on the 4th speed lockup condition shown in FIG. 9, when the first on-off SV 111 is OFF, since the pilot pressure is not supplied from the lines 203 and 205 to the control port 105a of the 3-4 shift valve 105, the spool of the 3-4 shift valve 105 is positioned at the left side. Therefore, the 3-4 clutch pressure generated by the second duty SV 122 is supplied from the line 225 through the 3-4 shift valve 105 and the line 221 to the release chamber 44b of the 2-4 brake 44. Further, the line pressure from the second output line 212 is supplied through the 3-4 shift valve, the line 218, the lockup shift valve 106 and the line 219 to the hydraulic pressure of the forward clutch 41, and the forward clutch 41 is therefore engaged. As a result, the gear stage becomes the 3rd speed which is different from the instructed one.

When there is an ON failure of the first on-off SV 111, a failure is generated. The failure is a gear failure of the gear stage becoming a 4th speed at a 3rd speed lockup instruction.

Namely, on the 3rd speed lockup condition in FIG. 7, when the first on-off SV 111 is ON, since the pilot pressure is supplied through the line 203, the relay valve 108 and the line 205 to the control port 105a of the 3-4 shift valve 105, the spool of the 3-4 shift valve 105 is positioned at the right side. Therefore, the release chamber 44b of the 2-4 brake is communicated through line 221, the 3-4 shift valve 105 and the lines 220 and 219 with the hydraulic chamber of the forward clutch 41, and the operating hydraulic pressures in both chambers are drained through the lockup shift valve 106 and the line 218 to the drain port 105b of the 3-4 shift valve 105. As a result, the 2-4 brake 44 is applied and the gear stage becomes the 4th speed which is different from the instructed one.

When there is an OFF failure of the second on-off SV 112, two failures are generated. The failures are the gear failure of the gear stage becoming a neutral condition at a 3rd speed lockup instruction and the lockup OFF failure of the lockup clutch 26 being not engaged at a 4th speed lockup instruction. Namely, on the 3rd speed lockup condition shown in FIG. 7, when the second on-off SV 112 is OFF, since the pilot pressure is not supplied from the line 206, the bypass valve 104 and the line 207 to the control port 106a of the lockup shift valve 106, the spool of the lockup shift valve 105 is positioned at the right side. Therefore, the operating hydraulic pressure in the hydraulic chamber of the forward clutch 41 is drained through the line 219, the lockup shift valve 106 and the line 228 at the third duty SV 123. As a result, the forward clutch is disengaged and the gear stage becomes a neutral.

Further, on the 4th speed lockup condition shown in FIG. 9, when the second on-off SV 112 is OFF, since the pilot pressure is not supplied to the control port 106a of the lockup shift valve 106, the spool of the lockup shift valve 106 is positioned at the right side. Therefore, the predetermined hydraulic pressure in the line 233 is supplied through the lockup shift valve 106 and the line 229 to the front chamber 26a of the lockup clutch 26. As a result, the lockup clutch 26 is disengaged although the clutch 26 is to be ON.

When there is an ON failure of the second on-off SV 112, a failure is generated. The failure is a lockup ON failure of the lockup clutch 26 is engaged.

Namely, on the 4th speed condition in FIG. 8, when the second on-off SV 112 is ON, since the pilot pressure is supplied through the line 206, the bypass valve 104 and the line 207 to the control port 106a of the lockup shift valve 106, the spool of the lockup shift valve 105 is positioned at the left side. Therefore, the predetermined hydraulic pressure in the line 233 is supplied through the lockup shift valve 106 and the line 234 to the rear chamber 26b of the lockup clutch 26, and the hydraulic pressure in the front chamber 26a is drained through the line 229, the lockup shift valve 106 and the line 228 at the third duty SV 123. As a result, the lockup clutch 26 is engaged although the clutch 26 is to be disengaged.

When there is an OFF failure of the first duty SV 121, a failure is generated. The failure is a gear failure of the gear stage becoming a 2nd speed at a 1st speed instruction.

Namely, on the 1st speed condition in FIG. 1, when the first duty SV 1121 is OFF (the duty ratio is 0), since the line pressure is supplied to the line 214 by the first duty SV 121, the line pressure is supplied through the low reverse clutch 103 and the line 215 to the apply chamber 44a of the 2-4 brake 44. As a result, the 2-4 brake 44 is applied and the gear stage becomes the 2nd speed which is different from the instructed one.

When there is an ON failure of the first duty SV 121, three failures are generated. The failures are the gear failure of the gear stage becoming a 1st speed at a 2nd speed, the gear failure of the gear stage becoming a neutral condition at a 4th speed lockup instruction, and the gear stage becoming a neutral condition at 4th speed lockup instruction.

Namely, on the 2nd speed condition shown in FIG. 5, when the first duty SV 121 is ON (the duty ratio is 100%), the operating hydraulic pressure, supplied from the first duty SV 121 through the line 214, the low reverse valve 103 and the line 215 to the apply chamber 44a of the 2-4 brake 44, is drained at the first duty SV 121. As a result, the 2-4 brake 44 is released and the gear stage becomes a 1st speed.

Further, on the 4th speed condition shown in FIG. 9 and the on the 4th speed lockup condition, when the first duty SV 121 is ON, the operating hydraulic pressure supplied to the apply chamber 44a of the 2-4 brake 44 is drained, and the 2-4 brake 44 is released. At this time, since the forward clutch 41 is not engaged, the gear stage becomes a neutral.

When there is an OFF failure of the second duty SV 122, two failures are generated. The failures are the gear failures of the gear stages becoming 3rd speeds at a 1st speed instruction and a 2nd speed instruction.

Namely, on the 1st speed condition shown in FIG. 4, when the second duty SV 122 is OFF, the line pressure is supplied from the second duty SV 122 to the line 222, and the line pressure is further supplied through the low reverse valve 103, the lines 224 and 226, the bypass valve 104 and the line 227 to the hydraulic chamber of the 3-4 clutch 43. As a result, the 3-4 clutch 43 is engaged and the gear stage becomes a 3rd speed.

Further, on the 2nd speed condition shown in FIG. 5, when the second duty SV 122 is OFF, the line pressure is supplied from the second duty SV 122 to the 3-4 clutch 43 so that the 3-4 clutch 43 is engaged, and the line pressure is further supplied from the line 225 through the 3-4 shift valve 105 and the line 221 to the release chamber 44b of the 2-4 brake 44 so that the 2-4 brake 44 is released. As a result, the gear stage also becomes a 3rd speed.

When there is an ON failure of the second duty SV 122, four failures are generated. The failures are the gear failures of the gear stages becoming 2nd speeds at a 3rd speed instruction and a 3rd speed lockup instruction, and the gear failures of the gear stages becoming neutral conditions at a 4th speed instruction and a 4th speed lockup instruction.

Namely, on the 3rd speed condition shown in FIG. 6 and on the 3rd speed lockup condition, when the second duty SV 122 is ON, the 3-4 clutch pressure, supplied from the second duty SV 122 through the line 222, the low reverse valve 103, lines 224 and 226, the bypass valve 104 and the line 227 to the hydraulic chamber of the 3-4 clutch 43, is drained at the second duty SV 122. At the same time, the servo release pressure, supplied from the line 224 through the line 225, the 3-4 shift valve 105 and the line 221 to the release chamber 44b of the 2-4 brake 44, is drained at the second duty SV 122. As a result, the 3-4 clutch 43 is disengaged brake 44 is released while the 2-4 brake 44 is applied, and the gear stages become 2nd speeds.

Further, on the 4th speed condition shown in FIG. 8 and on the 4th speed lockup condition shown in FIG. 9, when the second duty SV 122 is ON, the 3-4 drain pressure is drained as the manner explained above. In these cases, since the forward clutch 41 is not engaged, the gear stages become neutral. When there is an OFF failure of the third duty SV 123, two failures are generated. The failure is the gear failure of the gear stage becoming a 3rd speed at a 4th speed instruction, and the lockup OFF failure of the lockup clutch 26 being not engaged at a 4th speed lockup instruction.

Namely, on the 4th speed condition shown in FIG. 8, when the third duty SV 123 is OFF, the line pressure is just supplied from the third duty SV 123 to the line 228. The line pressure is further supplied through the lockup shift valve 106 and the line 219 to the hydraulic chamber of the forward clutch 41 while the line pressure is further supplied from the line 219 through the line 220, the 3-4 shift valve 105 and the line 221 to the release chamber 44b of the 2-4 brake 44. As a result, the 2-4 brake 44 is released and the gear stage becomes a 3rd speed.

Further, on the 4th speed lockup condition shown in FIG. 9, when the first duty SV 121 is OFF, the line pressure is supplied from the third duty SV 123 through the line 228, the lockup shift valve 106 and the line 229 to the front chamber 26a of the lockup clutch 26. As a result, the lockup clutch 26 is disengaged which is different from the condition instructed.

Finally, when there is an ON failure of the third duty SV 123, four failures are generated. The failures are the neutral failures of the gear stages becoming neutral at a 1st speed instruction, a 2nd speed instruction and a 3rd speed instruction, and the engagement failure in which the frictional element is not engaged although the frictional element is instructed to be engaged when the vehicle is stopped.

Namely, on the 1st speed condition shown in FIG. 4, on the 2nd speed condition shown in FIG. 6 and on the 3rd speed condition shown in FIG. 6, when the third duty SV 123 is ON, the operating hydraulic pressure, supplied from the third duty SV 123 through the line 228, the lockup shift valve 106 and the line 219 to the hydraulic chamber of the forward clutch 41, is drained at the third duty SV 123, or the operating hydraulic pressure is not supplied to the hydraulic pressure chamber of the forward clutch 41. As a result, the forward clutch 41 is released or not engaged, the gear stage becomes neutral, or the vehicle can not start at the 1st, 2nd and 3rd speeds because of the engagement failure.

Thus, when there are mechanical failures in the respective solenoid valves, the gear failure, the lockup OFF failure, the lockup ON failure and the engagement failure occur based on the kinds and the manners of the failed solenoid valve at the respective instructions. Therefore, by detecting the existences of the gear failure, the lockup OFF failure, the lockup ON failure and the engagement failure with the kinds of the instruction, it would be possible to determine what kind of the solenoid valves has the mechanical failure of what manner.

According to the embodiment of the present invention, the controller 300 detects what kind of the solenoid valve has a mechanical failure and detects the solenoid have has a mechanical failures of what manner by detecting the existences of the gear failure, the lockup OFF failure, the lockup ON failure and the engagement failure when the respective instructions are output, and then carries out the fail-safe control based on the results of the detection.

In order to detect what kind of the solenoid valve has a mechanical failure, there is no need to detect the mechanical failure at all instructions shown in Table 4.

For example, when the gear failure of the gear stage becoming other than a 1st speed at the 1st speed instruction is generated, it is considered that such gear failure is one of the OFF failure of the first duty SV 121, the OFF failure of the second duty SV 122 and the ON failure of the third duty SV 123. The solenoid valve with the mechanical failure can not be detected only based on the detection of the gear failures at the 1st speed instruction. However, if there is no such mechanical failure at the 2nd speed instruction, it can be detected that the above-mentioned gear failure is the OFF failure of the first duty SV 121. If there is a mechanical failure at the 2nd speed instruction while there is no mechanical failure at the 3rd speed instruction, it can be detected that the above-mentioned mechanical failure is the OFF failure of the second duty SV 122.

Thus, by detecting only the existences of the gear failure, the lockup ON failure, the lockup OFF failure and the engagement failure at some of the instructions, what kind of the solenoid valves and what manner of the mechanical failures can be detected or specified. The controller 300 is therefore arranged to detect the gear failures and the like by using possibly small number of the instructions.

Especially, since the 4th speed lockup instruction is output only when the vehicle is traveling with a high speed, the 4th speed lockup instruction is rarely output. Therefore, when the mechanical failure is detected at the 4th speed lockup instruction, the essential instructions are only used so as to detect the solenoid valve with the mechanical failure.

Accordingly, the mechanical failure of the solenoid valve can be determined precisely and quickly at the 4th speed lockup instruction.

Therefore, according to the embodiment of the present invention, the instructions or conditions shown in Table 5, which is made based on Table 4, are used in order to determine the mechanical failures of the solenoid valves.

As to the gear failures in the 4th speed instruction, the controller 300 is arranged to determine the gear failure of becoming neutral and the gear failure of becoming a third speed. This is because it is necessary to distinguish between the gear failure of being neutral and the gear failure of being the 3rd speed in order to determined the OFF failure of the first on-off SV 111 and the OFF failure of the third duty SV 123.

Further, the ON failure of the third duty SV 123 includes the gear failures of being neutral and the engagement failures at the 1st -3rd speed instructions.

As to the other gear failures shown in Table 5, it is only determined whether or not the actual gear stage is corresponding to the instructed one. Further, when any of the solenoid valves is failed, there is no lockup ON failure nor lockup OFF failure at the 3rd speed and 3rd speed lockup instructions. Therefore, the lockup ON failure and the lockup OFF failure at the 3rd speed and the 3rd lockup instructions are not determined.

TABLE 5

| | INSTRUCTION | | | | | | | | | |
|---|---|---|---|---|---|---|---|---|---|---|
| | 1ST | 2ND | 3RD SPEED | | 3RD SPEED LOCKUP | | 4TH SPEED | | 4TH SPEED LOCKUP | |
| KINDS OF FAILURE | SPEED GEAR FAILURE | SPEED GEAR FAILURE | GEAR FAILURE | LOCKUP ON FAILURE | GEAR FAILURE | LOCKUP ON FAILURE | GEAR FAILURE | LOCKUP ON FAILURE | GEAR FAILURE | LOCKUP ON FAILURE |
| 1ST ON-OFF SV OFF FAILURE | ○ | ○ | ○ | | | | X (NEUTRAL) | | | |
| 1ST ON-OFF SV ON FAILURE | ○ | ○ | | X | | | ○ | | | ○ |
| 2ND ON-OFF SV OFF FAILURE | ○ | ○ | ○ | | | | ○ | | | X |
| 2ND ON-OFF SV ON FAILURE | ○ | ○ | ○ | | | | ○ | X | | |
| 1ST DUTY SV OFF FAILURE | X | ○ | ○ | | | | ○ | | | |
| 1ST DUTY SV ON FAILURE | ○ | X | ○ | | | | X (NEUTRAL) | | | |
| 2ND DUTY SV OFF FAILURE | X | X | ○ | | | | ○ | | | |
| 2ND DUTY SV ON FAILURE | ○ | ○ | X | | | | X (NEUTRAL) | | | |
| 3RD DUTY SV OFF FAILURE | ○ | ○ | ○ | | | | X (3RD SPEED) | | | |
| 3RD DUTY SV ON FAILURE | X (ENGAGEMENT FAILURE) | X (ENGAGEMENT FAILURE) | X (ENGAGEMENT FAILURE) | | | | ○ | | | |

Next, there will be explained how the controller 300 carries out the mechanical failure determination control and the fail-safe control based on the determined mechanical failure in accordance with the flowcharts.

Figure 14:
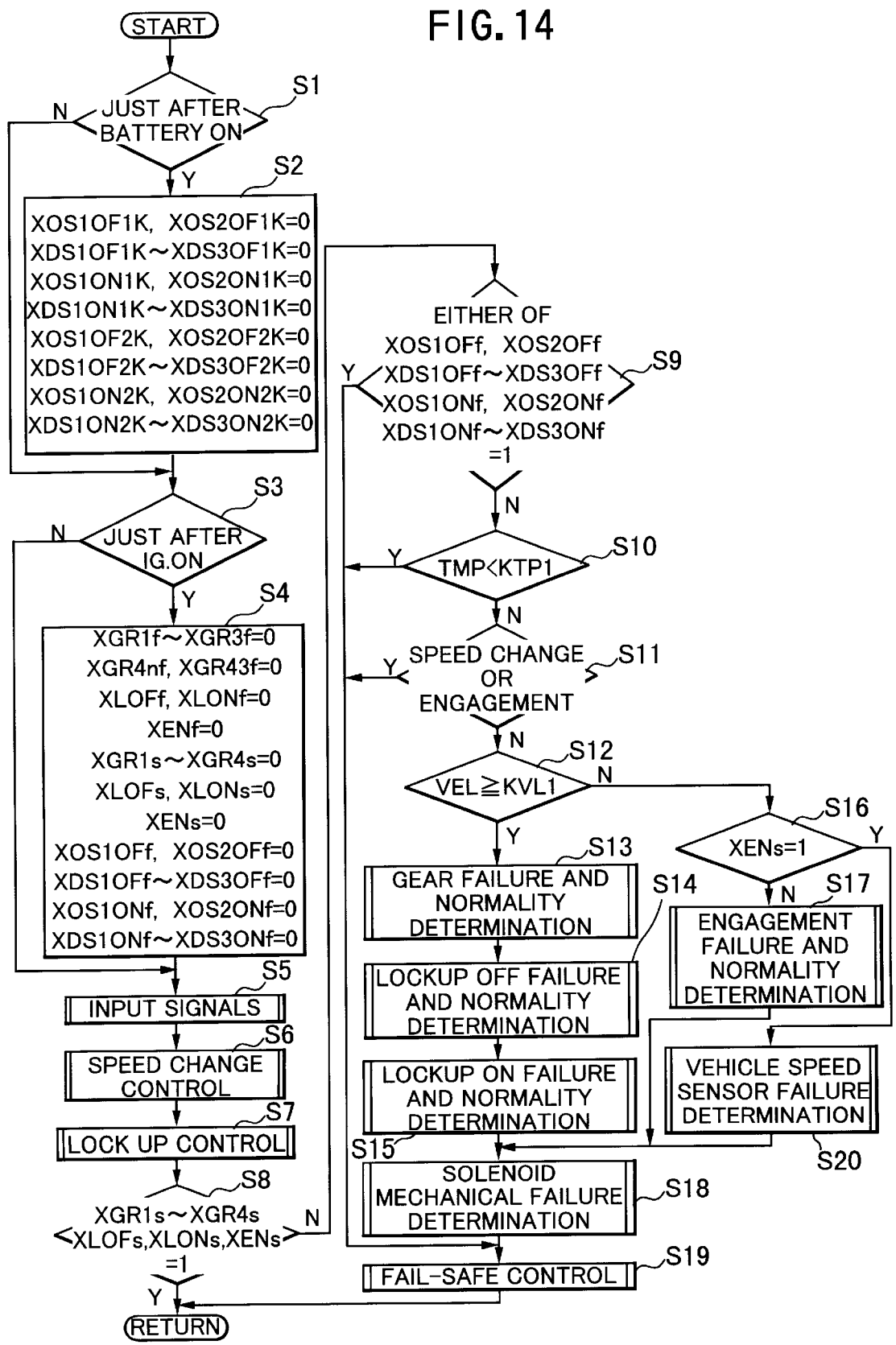
FIG. 14 is a flowchart showing a main program for a failure determination control.

FIG. 14 is a flowchart showing a main program for a failure determination program. Referring to FIG. 14, the controller 300 determines whether or not it is just after a battery is ON in step S1 of the program. If YES in step S1, the procedure goes to step S2 where all KAM (Keep Alive Flag) flags are reset which are used in the following steps.

The KAM flag is the flag where the content in a memory is maintained even if an ignition switch is OFF, and the KAM flag is reset only just after the battery is ON.

The KAM flags are OFF failure first DCKAM flags of the first and second on-off SVs 111 and 112 and the first, second and third duty SVs 121–123, ON failure first DCKAM flags, OFF failure second DCKAM flags and ON failure second DCKAM flags. The OFF failure first DCKAM flags are XOS1OF1k, XOS2OF1k and XDS1OF1k–XDS3OF1k. The ON failure first DCKAM flags are XOS1ON1k, XOS2ON1k and XDS1ON1k–XDS3ON1k. The OFF failure second DCKAM flags are XOS1OF2k, XOS2OF2k and XDS1OF2k–XDS3OF2k. The ON failure second DCKAM flags are XOS1ON2k, XOS2ON2k and XDS1ON2k–XDS3ON2k.

The "DC" is an abbreviation of "Driving Cycle" and means a time period between an ON to an OFF of the ignition switch. The "1k" means a KAM flag which is set at the first driving cycle, and the "2k" means a KAM flag which is set at the second driving cycle.

In step S3, it is determined whether it is just after the ignition is ON or it is just after the above-mentioned driving cycle newly has started. If YES in step S3, the procedure goes to step S4 where all failure flags and normality flags used in the following steps are reset. The flags reset in step S4 are gear failure flags in the respective gear stages of XGR111f–XGR3f, XGR4Nf and XGR43f, a lockup OFF failure flag of XLOFf, a lockup ON failure flag of XLONf, an engagement failure flag of XENf, gear normality flag in the respective stages of XGR1s–XGR4s, a lockup OFF normality flag of XLOFs, a lockup ON normality flag of XLONs, an engagement normality flag of XENs. The flags in step S4 are further the OFF failure flags of the respective solenoid valves 111, 112 and 121–123 of XOS1OFf, XOS2OFf and XDS1OFf–XDS3Off and the ON failure flags of the solenoid valves of XOS1ONf, XOS2ONf and XDS1ONf–XDS3ONf.

The "f" attached on the end of the flag names means a failure flag, and the "s" means a normality flag.

In step S5, various signals relating a driving condition are input. Such various signals are obtained from the sensors and switches 301–307 and composed of a vehicle speed VEL, a throttle opening TVO, an engine speed ESPD, a range selected by a shift lever, a turbine rotation number TREV which is an input rotation number input to the speed change gears 30, an output rotation number OREV of the speed change gears 30, a temperature TMP of the operating hydraulic pressure and the like.

In step S6, a speed change control is carried out by changing the gear stages based on the vehicle speed VEL, the throttle valve opening TVO and the like. In step S7, a lockup control of ON and OFF is carried out.

In step S8, the controller 300 determines whether the respective normality flags XGR1s–XGR4s, XLOFs, XLONs and XENs are all set.

When the normality flags are all set, namely a failure and normality determination control determines that all solenoid valves are normal, the procedure returns to step S1. Since the normality flags are reset just after the ignition is ON in step S4, the procedure goes to step S9 in each driving cycle until all normality flags are set.

In step S9, it is determined whether any of the solenoid failure flags of XOS1OFf, XOS2OFf, XDS1OFf–XDS3OFf, XOS1ONf, XOS2ONf and XDSIONf–XDS3ONfis set or not.

When at least one of the failure flags is set, a fail-safe control is carried out. Since the failure flags are reset just after the ignition is ON in step S4, the procedure goes to step S10 until a solenoid mechanical failure determination control determines any of the failure of the solenoid valves.

It is determined whether the oil temperature TMP is less than a predetermined oil temperature TMP1 in step S10, and it is determined whether the automatic transmission is changing the speed gears or whether the engaging operation, in which the neutral condition is moved to the traveling condition according to for example the N to D range shifting operation, is carried out in step S11. If NO in both steps S10 and S11, namely the transmission is in a stable condition, it is determined in step S12 whether the vehicle speed VEL is equal to or greater than a predetermined vehicle speed KVL1.

If YES in step S12, namely the vehicle speed is equal to or greater than the predetermined vehicle speed which is a minimum vehicle speed necessary to carry out the following determination controls, the procedure goes to steps S13, S14 and S15. In step S13, a gear failure and normality determination control, for determining whether the gear stage is established as instructed, is carried out. In step S14, a lockup OFF failure and normality determination control, for determining whether the lockup OFF failure occurs, is carried out. The lockup OFF failure means the abnormal condition that the lockup clutch is OFF contrary to the ON instruction. In step S15, a lockup ON failure and normality determination control, for determining whether the lockup ON failure occurs, is carried out. The lockup ON failure means the abnormal condition that the lockup clutch is ON contrary to the OFF instruction.

On the other hand, when the vehicle is stopped or the vehicle speed is less than the predetermined speed, the procedure goes to step S16 in which it is determined whether the engagement normality flag XENs is set. Since the flag XEN1 is reset in step S4 just after the ignition is ON, the procedure goes to steps S17 at the beginning. In step S17, an engagement failure and normality determination control, for determining whether an abnormal engaging operation occurs, is carried out.

In step S18, a solenoid mechanical failure determination control for determining the solenoid mechanical failure is carried out based on the respective determination controls in the above mentioned steps. In step S19, a fail-safe control is carried out based on the results of the solenoid mechanical failure determination control.

When it is determined that the engagement normality flag XENs is reset in step S16, the procedure goes to step S20 in which a vehicle speed sensor failure determination control, for determining the vehicle speed sensor 303 (see FIG. 3) is normal, is carried out.

The vehicle speed sensor failure determination control determines the failure when the vehicle speed sensor 301 outputs zero although the vehicle is actually traveling. Therefore, if the determination control is carried out when the vehicle is stopped, the right result can not be obtained. According to the embodiment, when the engagement failure and normality determination control determines that the engaging operation is wrongly carried out and the vehicle can not travel, the vehicle sensor failure and normality determination control is stopped so that the wrong determination can be avoided. As a result, the respective controls, the speed change control of the automatic transmission, the lockup control and the like all of which uses an output of the vehicle speed sensor 301 is favorably carried out.

When the respective failure and normality determination controls determine that all are normal in steps S13–S15 and S17 and the normality flags XGR1s–XGR4s, XLOFs, XLONs and XENs are all set, as explained above, the procedure ends at step S8 in the driving cycle. Thereafter, the failure and normality determination controls are not carried out so as to avoid the wrong determinations of the controls.

Namely, when the 1st speed gear failure flag XGR1f is set based on for example the gear failure in the 1st speed by the gear failure and normality determination control after the normality flags XGR1s–XGR4s, XLOFs, XLONs and XENs are all set, it is directly determined that the OFF failure of the first duty SV 121 occurs. However, in this case, the failure might be the OFF failure of the first duty SV 121, the OFF failure of the second duty SV 122 or the ON failure of the third duty SV 123 (see Table 5). Therefore, the failure might be wrongly determined. According to the embodiment of the present invention, after the normality flags XGR1s–XGR4s, XLOFs, XLONs and XENs are once all set, the failure and normality determination controls are prohibited in the driving cycle so that the above mentioned wrong determination can be avoid.

Further, after one of the solenoid failure flags of XOS1OFf, XOS2OFf, XDS1OFf–XDS3OFf, XOS1ONf, XOS2ONf and XDS1ONf–XDS3ONf is once set based on the results of the respective failure and normality determination in steps 13–15 and 17, even before the normality flags XGR1s–XGR4s, XLOFs, XLONs and XENs are once all set, the failure and normality determination controls are also prohibited in the driving cycle and the procedure directly goes to step S19 from step S9 so as to carry out the fail-safe control.

According to the embodiment, such determination controls are prohibited after the mechanical failure occurs in any of the solenoid valves, since the accurate determination can not be expected under the existence of such mechanical failure even if the determination control tries to determine mechanical failures of the other solenoid valves. Therefore, after the failure determination flag is set in any of the solenoid valves, the failure and normality determination controls are not carried out and the wrong determination can be avoided.

Next, the respective determination controls will be explained in detail.

The gear failure and normality determination control in step S13 in FIG. 14 will be explained in accordance with FIGS. 15–20.

Figure 15:
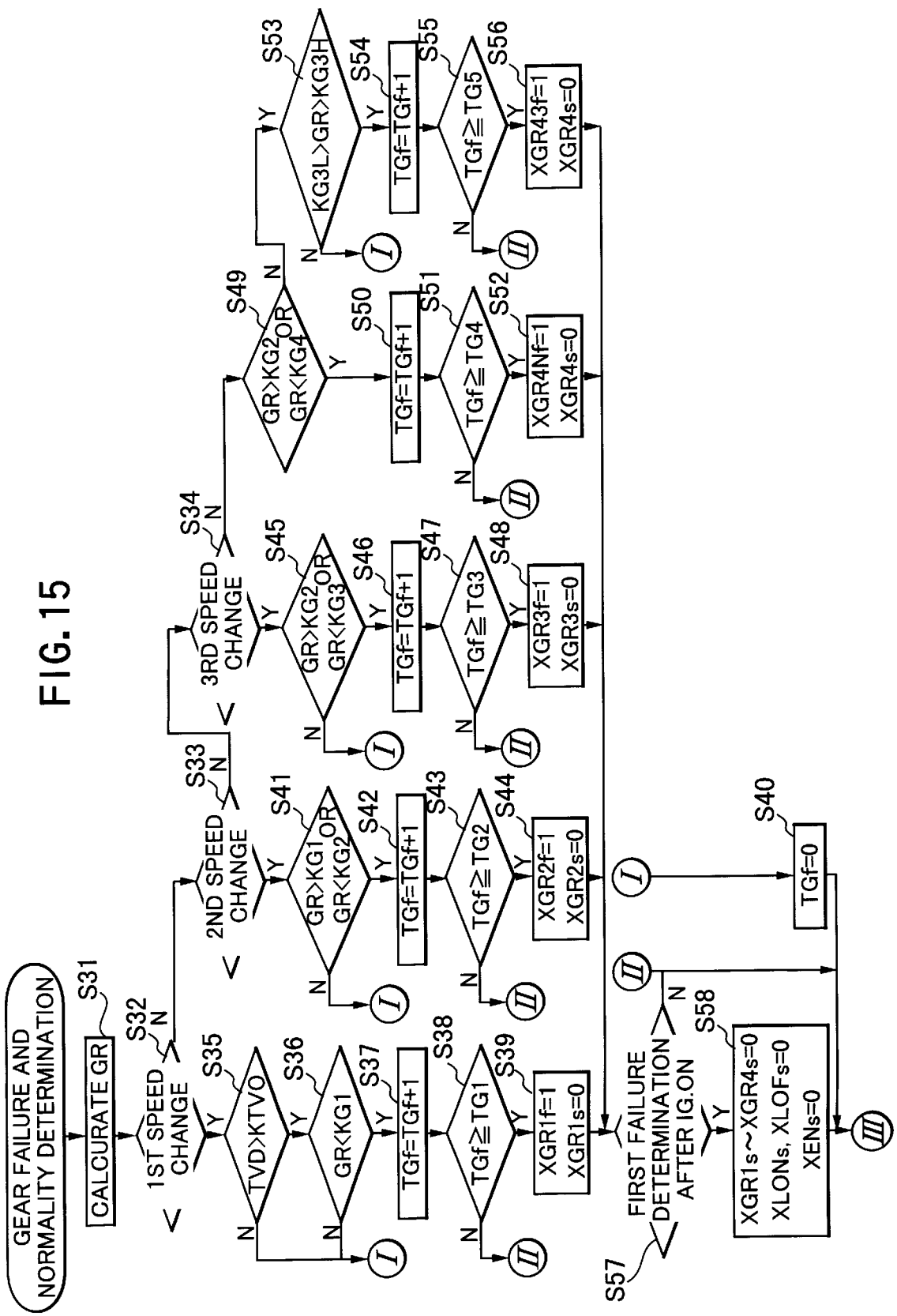
FIG. 15 is a flowchart showing a first half of a program for a gear failure and normality determination control.
Figure 16:
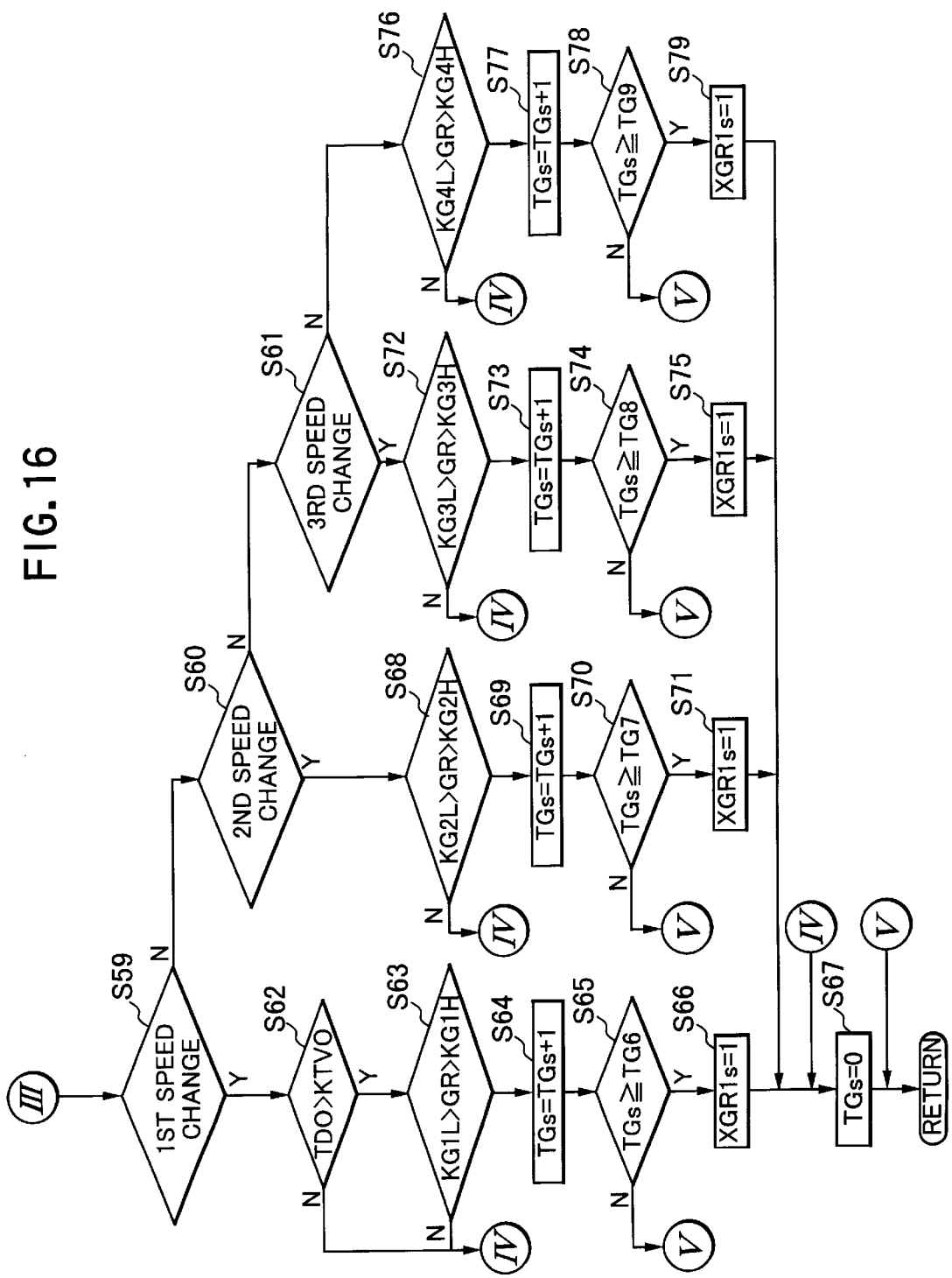
FIG. 16 is a flowchart showing a second half of a program for a gear failure and normality determination control.

FIGS. 15 and 16 are flowcharts showing the gear failure and normality determination control. The controller 300 calculates a gear ratio GR (=TREV/OREV) of the present time based on the turbine revolution number TREV and the output revolution number OREV in step S31.

First, the gear failure determination is explained in steps S32–S58.

In steps S32–S34, it is determined whether the instructed speed change at the present time is 1st speed change, 2nd speed change or 3rd speed.

When the 1st speed change is instructed, the procedure goes to steps S35–S39. In step S35, it is determined whether the throttle valve opening is greater than a predetermined opening KTV0 which is relatively small, namely the turbine revolution number TREV and like are stable. If YES in step S35, it is determined in step S36 whether the gear ratio GR is smaller than a first predetermined gear ratio KG1 located between the gear ratio G1 of the 1st speed and the gear ratio G2 of the 2nd speed ration.

Figure 17:
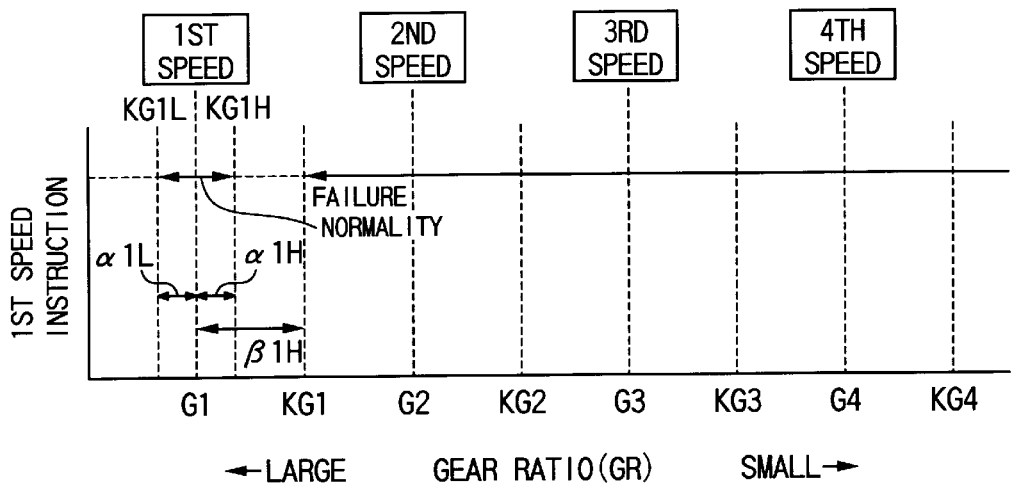
FIG. 17 is a graphical representation showing a gear ratio for a 1st speed gear failure and normality determination.

As shown in FIG. 17, when the gear ratio GR is smaller than the first predetermined gear ratio KG1, the actual gear ratio GR is located in the gear ratios of the 2nd to 4th speeds. This means that the gear failure has occurred.

If YES in step S36, the number of the gear failure timer TGf is increased one by one in step S37. When it is determined in step S38 that the number of the timer TGf is equal to or greater than a predetermined value TG1, namely the abnormal gear ratio has continued for the predetermined time period, the procedure goes to step S39 in which the 1st speed gear failure flag XGR1f is set while the 1st gear normality flag XGR1s is reset.

When the throttle valve opening TVO is equal to or less than the predetermined opening KTV0 and the gear ratio GR is not less than the first gear ratio KG1, the procedure goes from step S35 or S36 to step S40 in which the gear failure timer TGf is reset and thereafter the gear normality determination control explained hereinafter is carried out. Until the number of the gear failure timer TGf has reached to the predetermined number TG1 when the gear ratio GR is less than the first predetermined gear ratio KG1, the above control procedures are repeatedly carried out without resetting the timer TGf in step S40.

When the 2nd speed change is instructed, the procedures in step S33 and S41–S44 are carried out. In step S41, it is determined whether or not the gear ratio GR is greater than the first predetermined gear ratio KG1 or smaller than a second predetermined gear ratio KG2 located between the gear ratio G2 of the 2nd speed and the gear ratio G3 of the 3rd speed.

Figure 18:
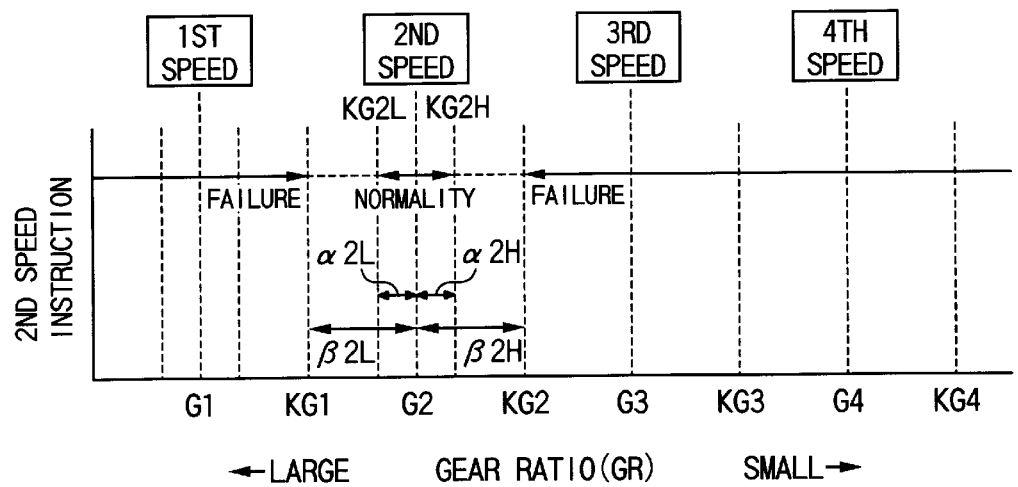
FIG. 18 is a graphical representation showing a gear ratio for a 2nd speed gear failure and normality determination.

As shown in FIG. 18, when the gear ratio GR is greater than the first predetermined gear ratio KG1, the actual gear ratio GR is the one of the 1st speed contrary to the 2nd speed instruction. When the gear ratio GR is smaller than the second predetermined gear ratio KG2, the actual gear ratio is located in the gear ratio of the 3rd or 4th speed. The gear failure has occurred in both conditions.

If YES in step S41, the number of the gear failure timer TGf is increased one by one in step S42. When it is determined in step S43 that the number of the timer TGf is equal to or greater than a predetermined value TG2, namely the abnormal gear ratio has continued for the predetermined time period, the procedure goes to step S44 in which the 2nd speed gear failure flag XGR2f is set while the 2nd speed gear normality flag XGR2s is reset.

When the gear ratio GR is not greater than the first gear ratio KG1 and not less than the second gear ratio KG2, the procedure goes from step S41 to step S40 in which the gear failure timer TGf is reset and thereafter the gear normality determination control explained hereinafter is carried out. Until the number of the gear failure timer TGf has reached to the predetermined number TG2 when the gear ratio GR is greater than the first predetermined gear ratio KG1 and less than the second predetermined gear ratio KG2, the above control procedures are repeatedly carried out without resetting the timer TGf in step S40.

When the 3rd speed change is instructed, the procedures in step S34 and S45–S48 are carried out. In step S45, it is determined whether or not the gear ratio GR is greater than the second predetermined gear ratio KG2 or smaller than a third predetermined gear ratio KG3 located between the gear ratio G3 of the 3rd speed and the gear ratio G4 of the 4th speed.

Figure 19:
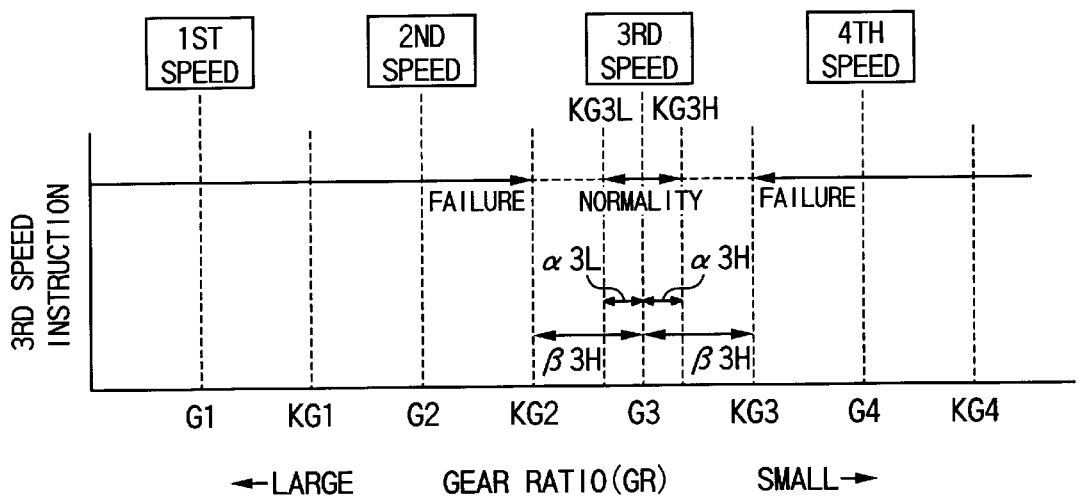
FIG. 19 is a graphical representation showing a gear ratio for a 3rd speed gear failure and normality determination.

As shown in FIG. 19, when the gear ratio GR is greater than the second predetermined gear ratio KG2, the actual gear ratio GR is located in the gear ratio of the 1st or 2nd speed contrary to the 3rd speed instruction. When the gear ratio GR is smaller than the third predetermined gear ratio KG3, the actual gear ratio is the gear ratio of the 4th speed. The gear failure has occurred in both conditions.

If YES in step S45, the number of the gear failure timer TGf is increased one by one in step S46. When it is determined in step S47 that the number of the timer TGf is equal to or greater than a predetermined value TG3, namely the abnormal gear ratio has continued for the predetermined time period, the procedure goes to step S48 in which the 3rd speed gear failure flag XGR3f is set while the 3rd speed gear normality flag XGR3s is reset.

When the gear ratio GR is not greater than the second gear ratio KG2 and not less than the third gear ratio KG3, the procedure goes from step S45 to step S40 in which the gear failure timer TGf is reset and thereafter the gear normality determination control explained hereinafter is carried out. Until the number of the gear failure timer TGf has reached to the predetermined number TG3 when the gear ratio GR is greater than the second predetermined gear ratio KG2 and less than the third predetermined gear ratio KG3, the above control procedures are repeatedly carried out without resetting the timer TGf in step S40.

When the 4th speed change is instructed, the procedures in steps S49–S56 are carried out. In step S49, it is determined whether or not the gear ratio GR is greater than the second predetermined gear ratio KG2 or smaller than a fourth predetermined gear ratio KG4 which is smaller than located the gear ratio G4 of the 4th speed.

The gear failures occurred at the 4th speed instruction include the case in which the gear stage is in a neutral condition and the case in which the gear stage is in a 3rd stage, as explained above.

Figure 20:
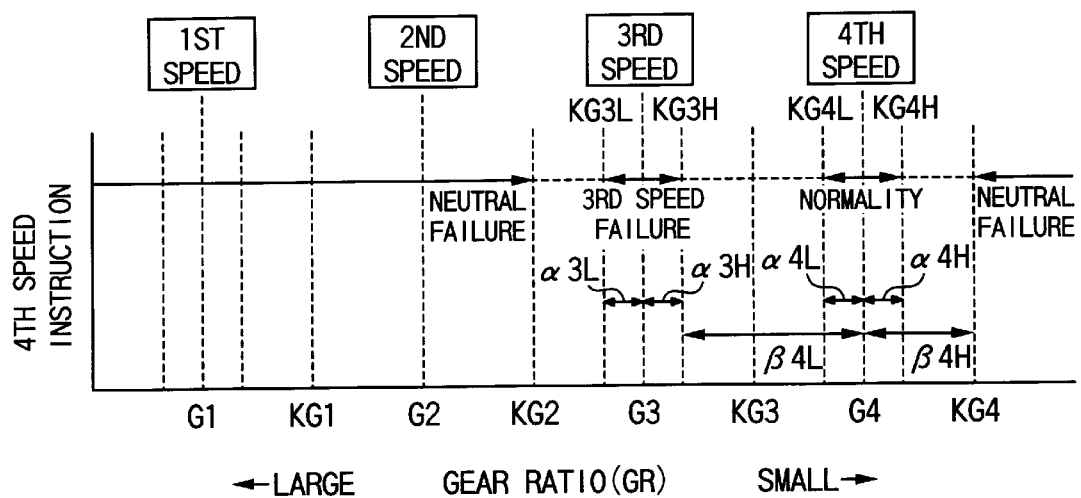
FIG. 20 is a graphical representation showing a gear ratio for a 4th speed gear failure and normality determination.

As shown in FIG. 20, when the gear ratio GR is greater than the second predetermined gear ratio KG2 or less than the fourth predetermined gear ratio KG4, the actual gear ratio GR is in the neutral condition. The 4th speed neutral failure, in which the gear stage in the neutral condition contrary to the 4th speed instruction, has occurred.

If YES in step S49, the number of the gear failure timer TGf is increased one by one in step S50. When it is determined in step S51 that the number of the timer TGf is equal to or greater than a predetermined value TG4, namely the abnormal gear ratio has continued for the predetermined time period, the procedure goes to step S52 in which the 4th speed neutral failure flag XGR4Nf is set while the 4th speed gear normality flag XGR4s is reset.

If NO in step S49, the procedure goes to step S53 in which it is determined whether the gear ratio GR is located between the 3rd speed gear ratio upper limit value KG3L (=G3+α3L) and the 3rd speed gear ratio lower limit valve KG3H (=G3−α3H). These α3L and α3H are predetermined deflections provided on the low speed side and the high speed side of the 3rd speed gear ratio GR3. The α3L and α3H are used to determine the gear normality at the 3rd speed instruction in a gear normality determination control explained hereinafter.

If it is determined in step S53 the gear ratio GR is located between the 3rd speed gear ratio upper limit value KG3L and the 3rd speed gear ratio lower limit valve KG3H, namely a 4th speed 3rd speed failure, in which the gear ratio GR is in the 3rd speed condition contrary to the 4th speed instruction, has occurred, the procedure goes to step S54. In step S54, the number of the gear failure timer TGf is increased one by one. When it is determined in step S55 that the number of the timer TGf is equal to or greater than a predetermined value TG5, namely the abnormal gear ratio has continued for the predetermined time period, the procedure goes to step S56 in which the 4th speed 3rd speed failure flag XGR43f is set while the 4th speed gear normality flag XGR4s is reset.

Further, when the gear ratio GR is not greater than the second gear ratio KG2 and not less than the fourth gear ratio KG4 and the gear ratio GR is not located between the upper limit value KG3L and the lower limit valve KG3H of the 3rd speed gear ratio, the procedure goes from step S53 to step S40. In step S40, the gear failure timer TGf is reset and thereafter the gear normality determination control explained hereinafter is carried out. Until the number of the gear failure timer TGf has reached to the predetermined number TG4 or TG5 when the gear ratio GR is not greater than the second gear ratio KG2 and not less than the fourth gear ratio KG4 and the gear ratio GR is not located between the upper limit value KG3L and the lower limit valve KG3H of the 3rd speed gear ratio, the above control procedures are repeatedly carried out without resetting the timer TGf in step S40.

The gear failure timer TGf is reset when the speed change instruction is changed even though the timer is operated.

As explained above, the gear failure is determined based on whether the actual gear stage corresponds to the instructed one. If the gear failure occurs, the gear failure flag in the gear stage is set and the gear normality flag is reset.

The controller 300 determines whether the gear failure occurs for the first time after the ignition switch is ON in step S57. If it occurs for the first time, the procedure goes to step S58 in which the normality flags XGR1s–XGR4s, XLOFs, XLONs and XENs are once reset. Thereafter the gear normality determination is carried out in steps S59–S67.

The reason why the procedures in steps S57 and S58 will be explained in detail hereinafter.

The gear normality determination is explained in steps S59–S67.

In steps S59–S61, it is determined whether the instructed speed change at the present time is 1st speed change, 2nd speed change or 3rd speed.

When the 1st speed change is instructed, the procedure goes from step S59 to steps S62–S66. In step S62, it is determined whether the throttle valve opening is greater than a predetermined opening KTV0 which is relatively small, namely the turbine revolution number TREV and like are stable. If YES in step S62, it is determined in step S63 whether the gear ratio GR is located between the 1st speed gear ratio upper limit value KG1L (=G1+α1L) and the 1st speed gear ratio lower limit valve KG1H (=G1−α1H) as shown in FIG. 17. These α1L and α1H are predetermined deflections provided on the low speed side and the high speed side of the 1st speed gear ratio GRl.

When the gear ratio GR is located between the upper limit value KG1L and the lower limit valve KG1H, it is determined that the gear ratio GR is normal in step S63. Then, the procedure goes to step S64, in which the number of the gear normality timer TGs is increased one by one. When it is determined in step S65 that the number of the timer TGs is equal to or greater than a predetermined value TG6, namely the normal gear ratio has continued for the predetermined time period, the procedure goes to step S66 in which the 1st speed gear normality flag XGR1s is set.

The deflection $\alpha$1H of the high side of the 1st speed gear ratio is less than the deflection $\beta$1H between the gear ratio G1 of the 1st speed and the first predetermined gear ratio KG1 for the gear failure determination so that a dead zone is provided on the high speed side of the 1st speed gear ratio G1 in which none of the gear failure determination and the gear normality determination is carried out.

When the throttle valve opening TVO is equal to or less than the predetermined opening KTV0 or the gear ratio GR is not located between the upper limit value KG1L and the lower limit valve KG1H, the procedure goes from step S62 or S63 to step S67 in which the gear normality timer TGs is reset. Until the number of the gear normality timer TGs has reached to the predetermined number TG6 when the gear ratio GR is located between the upper limit value KG1L and the lower limit valve KG1H, the above control procedures are repeatedly carried out without resetting the timer TGs in step S67.

When the 2nd speed change is instructed, the procedure goes from step S60 to steps S68–S71. In step S68, it is determined whether the gear ratio GR is located between the 2nd speed gear ratio upper limit value KG2L (=G2+$\alpha$2L) and the 2nd speed gear ratio lower limit valve KG2H (=G2–$\alpha$2H) as shown in FIG. 18. These $\alpha$2L and $\alpha$2H are predetermined deflections provided on the low speed side and the high speed side of the 2nd speed gear ratio G2.

When the gear ratio GR is located between the upper limit value KG2L and the lower limit valve KG2H, it is determined that the gear ratio GR is normal in step S68. Then, the procedure goes to step S69, in which the number of the gear normality timer TGs is increased one by one. When it is determined in step S70 that the number of the timer TGs is equal to or greater than a predetermined value TG7, namely the normal gear ratio has continued for the predetermined time period, the procedure goes to step S71 in which the 2nd speed gear normality flag XGR2s is set.

The deflections $\alpha$2L and $\alpha$2H of the low and high sides of the 2nd speed gear ratio are respectively less than the deflection $\beta$2L between the gear ratio G2 of the 2nd speed and the first predetermined gear ratio KG1 for the gear failure determination and the deflection $\beta$2H between the gear ratio G2 and the second predetermined gear ratio KG2 for the gear failure determination so that a dead zone is provided on the low speed side and the high speed side of the 2nd speed gear ratio G2 in which none of the gear failure determination and the gear normality determination is carried out.

When the gear ratio GR is not located between the upper limit value KG2L and the lower limit valve KG2H, the procedure goes from step S68 to step S67 in which the gear normality timer TGs is reset. Until the number of the gear normality timer TGs has reached to the predetermined number TG7 when the gear ratio GR is located between the upper limit value KG2L and the lower limit valve KG2H, the above control procedures are repeatedly carried out without resetting the timer TGs in step S67.

When the 3rd speed change is instructed, the procedure goes from step S61 to steps S72–S75. In step S72, it is determined whether the gear ratio GR is located between the 3rd speed gear ratio upper limit value KG3L (=G3+$\alpha$3L) and the 3rd speed gear ratio lower limit valve KG3H (=G3–$\alpha$3H) as shown in FIG. 19. These $\alpha$3L and $\alpha$3H are predetermined deflections provided on the low speed side and the high speed side of the 3rd speed gear ratio G3.

When the gear ratio GR is located between the upper limit value KG3L and the lower limit valve KG3H, it is determined that the gear ratio GR is normal in step S72. Then, the procedure goes to step S73, in which the number of the gear normality timer TGs is increased one by one. When it is determined in step S74 that the number of the timer TGs is equal to or greater than a predetermined value TG8, namely the normal gear ratio has continued for the predetermined time period, the procedure goes to step S72 in which the 3rd speed gear normality flag XGR3s is set.

The deflections $\alpha$3L and $\alpha$3H of the low and high sides of the 3rd speed gear ratio are respectively less than the deflection $\beta$3L between the gear ratio G3 of the 3rd speed and the second predetermined gear ratio KG2 for the gear failure determination and the deflection $\beta$3H between the gear ratio G3 and the third predetermined gear ratio KG3 for the gear failure determination so that a dead zone is provided on the low speed side and the high speed side of the 3rd speed gear ratio G3 in which none of the gear failure determination and the gear normality determination is carried out.

When the gear ratio GR is not located between the upper limit value KG3L and the lower limit valve KG3H, the procedure goes from step S72 to step S67 in which the gear normality timer TGs is reset. Until the number of the gear normality timer TGs has reached to the predetermined number TG8 when the gear ratio GR is located between the upper limit value KG3L and the lower limit valve KG3H, the above control procedures are repeatedly carried out without resetting the timer TGs in step S67.

When the 4th speed change is instructed, the procedure goes from step S61 to steps S76–S79. In step S76, it is determined whether the gear ratio GR is located between the 4th speed gear ratio upper limit value KG4L (=G4+$\alpha$4L) and the 4th speed gear ratio lower limit valve KG4H (=G4–$\alpha$4H) as shown in FIG. 20. These $\alpha$4L and $\alpha$4H are predetermined deflections provided on the low speed side and the high speed side of the 4th speed gear ratio G4.

When the gear ratio GR is located between the upper limit value KG4L and the lower limit valve KG4H, it is determined that the gear ratio GR is normal in step S76. Then, the procedure goes to step S77, in which the number of the gear normality timer TGs is increased one by one. When it is determined in step S78 that the number of the timer TGs is equal to or greater than a predetermined value TG9, namely the normal gear ratio has continued for the predetermined time period, the procedure goes to step S79 in which the 4th speed gear normality flag XGR4s is set.

The deflection $\alpha$4H of the high speed side of the 4th speed gear ratio is less than the deflection $\beta$4H between the gear ratio G4 of the 4th speed and the fourth predetermined gear ratio KG4 for the 4th speed neutral failure determination so that a dead zone is provided on the high speed side of the 4th speed gear ratio G4 in which none of the gear failure determination and the gear normality determination is carried out. The deflection a 4L of the low speed side of the 4th speed gear ratio is less than the deflection $\beta$3L between the gear ratio G4 of the 4th speed and the 3rd speed gear ratio lower limit valve KG3HKG4H (=G3–$\alpha$3H) for the 4th speed 3rd speed failure determination so that a dead zone is provided on the low speed side of the 4th speed gear ratio G4 in which none of the gear failure determination and the gear normality determination is carried out. As a result, the dead zones are respectively provided between the 4th speed neutral failure determination zone, the 4th speed 3rd speed failure determination zone and the 4th speed gear ratio normality determination zone.

When the gear ratio GR is not located between the upper limit value KG4L and the lower limit valve KG4H, the procedure goes from step S76 to step S67 in which the gear normality timer TGs is reset. Until the number of the gear normality timer TGs has reached to the predetermined number TG9 when the gear ratio GR is located between the upper limit value KG4L and the lower limit valve KG4H, the above control procedures are repeatedly carried out without resetting the timer TGs in step S67.

The gear normality timer TGs is reset when the speed change instruction is changed even though the timer is operated.

As explained above, the failure determination and the normality determination are carried out in the 1st to 4th speeds in the respective gear stages. Further, the respective gear failure flags XGR1f–XGR3f, XGR4Nf and XGR43f and the respective gear normality flags XGR1s–XGR4s are all set or reset.

When the failure determination and the normality determination are carried out in the 1st to 3rd speeds, the dead zone is provided between the gear ratio zone for the failure determination and the gear ratio zone for the normality determination. When the failure determination and the normality determination are carried out in the 4th speed, the dead zones are respectively provided between the 4th speed neutral failure determination zone, the 4th speed 3rd speed failure determination zone and the 4th speed gear ratio normality determination zone. Accordingly, there are some gear ratio zones where none of the failure determination and the normality determination is carried out.

In other words, the failure determination is carried out only where the deflection between the actual gear ratio GR and the instructed gear ratio is relatively large, or where the actual gear ration is located close to the gear ratio of the different gear stage from the instructed one. The normality determination is carried out only where the deflection between the actual gear ratio and the instructed gear ratio is relatively small. Accordingly, the gear failure, in which the gear stage is obtained which is different from the instructed one based on the solenoid valve mechanical failure, is distinguished from the condition in which it can not be determined in which gear stage the gear ratio is located based on the slip of the frictional element. The wrong determination in determining the gear failure can be surely avoided. As a result, the wrong determination in determining the mechanical failure of the solenoid valve explained hereinafter is avoided, and the fail-safe control will be surely carried out.

According to the embodiment of the present invention, as explained above, the predetermined deflections α3L and α3H to the 3rd speed gear ratio G3 for determining the 4th speed 3rd speed failure at the 4th speed instruction is also used as the predetermined deflections for determining the normality determination at the 3rd speed instruction. The deflections for the different determinations can be commonly used so as to reduce the memory capacity and simplify the control operation.

Here, the reason why the procedures in steps S57 and S58 are carried out is explained. As explained above, when all of the normality flags XGR1s–XGR4s, XLOFs, XLONs and XENs are set, the control is finished in step S8 of the main program. However, for example, when the gear failure in the 1st speed occurs under the condition that several normality flags are set previously, the reason of the gear failure might include the OFF failure of the 1st duty SV 121, the OFF failure of the 2nd duty SV 122 and the ON failure of the 1st duty SV 121. If the normality flags XGR2s–XGR4s of the 2nd to 4th speeds are set before this failure determination, the OFF failure of the 1st duty SV 121 is determined only based on the gear failure of the 1st speed. Thus, the wrong determination might occur.

Accordingly, in these cases, after the normality flags previously set are once reset and thereafter the gear failure and normality determination and the like are carried out, it needs to be determined which solenoid valve has a mechanical failure. Therefore, according to the embodiment, all normality flags are once reset when the first gear failure is determined in steps S57 and S58.

Next, the lockup OFF failure and normality determination control in step S14 in FIG. 14 will be explained in accordance with FIGS. 21 and 22.

Figure 21:
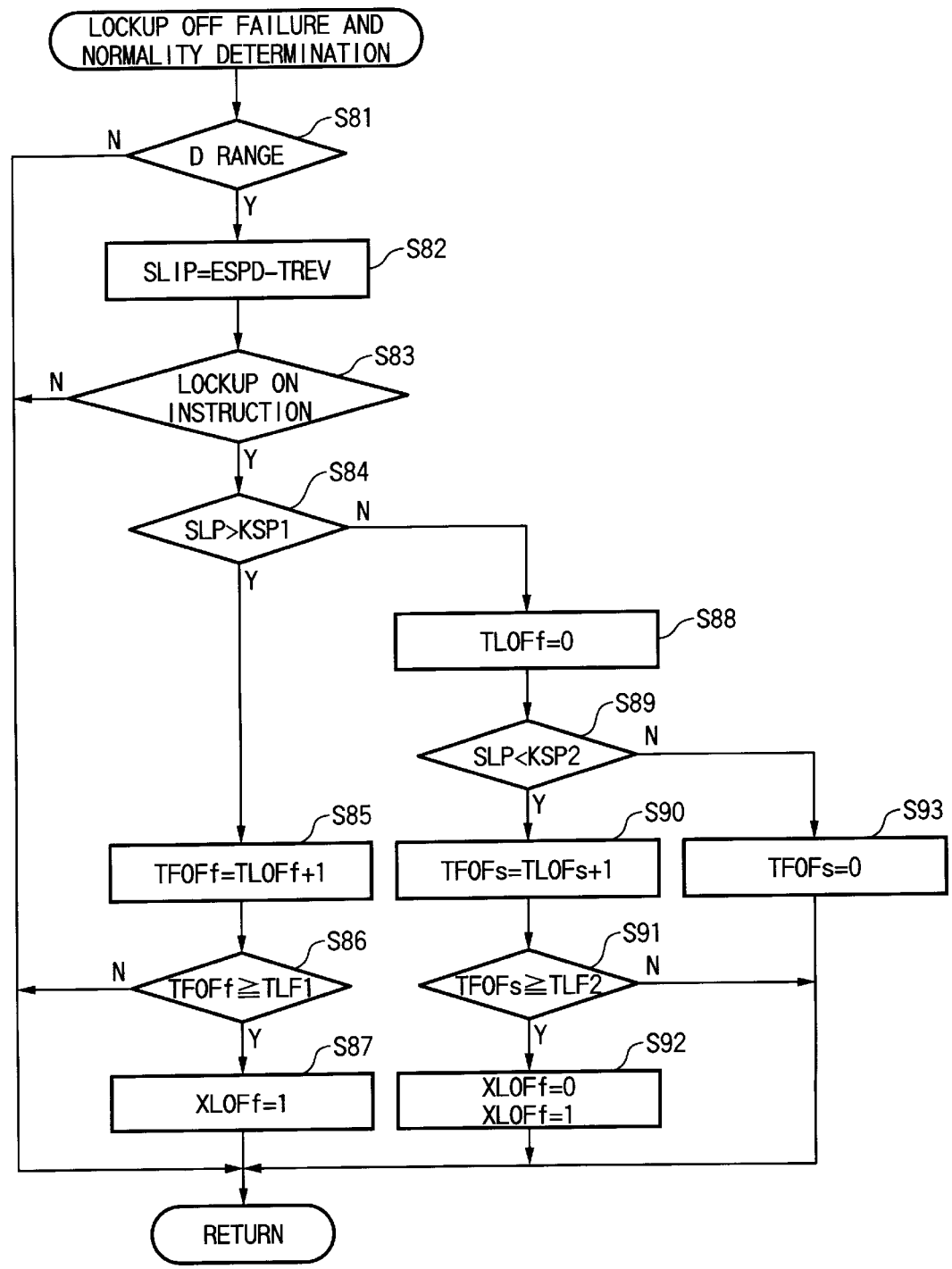
FIG. 21 is a flowchart showing a program for a lockup OFF failure and normality determination.

Referring to FIG. 21, the controller 300 determines whether the range selected by the driver is D range in step S81. If YES in step S81, the procedure goes to step S82 in which the slip rotation number SLP (=ESPD−TREV) of the lockup clutch 26 is obtained based on the engine rotation number ESPD and the turbine rotation number TREV.

In step S83, it is determined whether a lockup ON instruction, which instructs that the lockup clutch 26 is to be engaged, is output. If the ON instruction is output, the procedure goes to step S84 in which it is determined whether the slip rotation number SLP is greater than a first predetermined rotation number KSP1.

Figure 22:
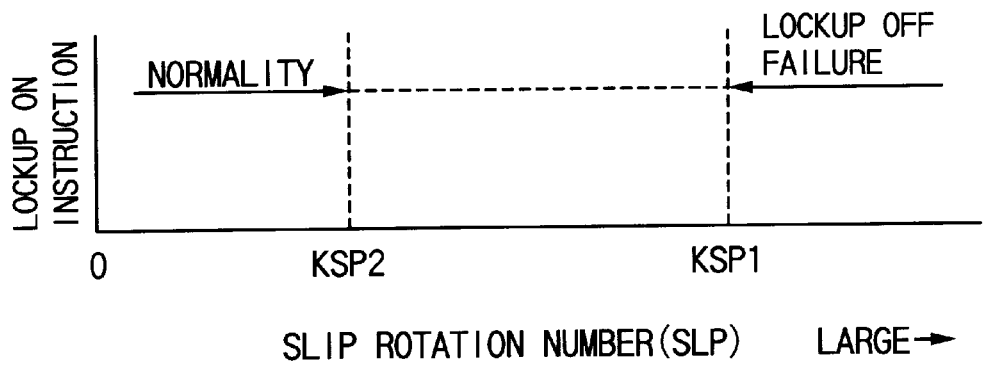
FIG. 22 is a graphical representation showing a slip rotation number for a lockup OFF failure and normality determination.

When SLP is greater than KSP1 as shown in FIG. 22, namely the slip rotation number SLP of the lockup clutch 26 is relatively large, it is determined that the lockup OFF failure occurs in which the lockup clutch 26 is disengaged contrary to the ON instruction. If so, the procedure goes to step S85 in which the number of a lockup OFF failure timer TLOFf is increased one by one. When it is determined in step S86 that the number of the timer TLOFf is equal to or greater than a predetermined value TLF1, namely the lockup OFF failure has continued for the predetermined time, the procedure goes to step S87 in which the lockup OFF failure flag XLOFf is set.

If NO in step S84, the procedure goes to step S88 in which the lockup OFF failure timer TLOFf is reset and then goes to step S89 in which it is determined whether the slip rotation number SLP is less than a second predetermined rotation number KSP2 which is less than the first predetermined rotation number KSP1 for the lockup OFF failure determination.

When SLP is less than KSP2 as shown in FIG. 22, namely the slip rotation number SLP of the lockup clutch 26 is fully small, it is determined that the lockup clutch 26 is engaged as instructed by the lockup ON instruction. If so, the procedure goes to step S90 in which the number of a lockup OFF normality timer TLOFs is increased one by one. When it is determined in step S91 that the number of the timer TLOFs is equal to or greater than a predetermined value TLF2, namely the lockup OFF normal condition has continued for the predetermined time, the procedure goes to step S92 in which the lockup OFF failure flag XLOFf is reset while the lockup OFF normality flag XLOFs is set.

Here, the "lockup OFF normality" means that the lockup clutch is ON without generating the lockup OFF failure at the lockup ON instruction.

When it is determined in step S89 that the slip rotation number SLP is equal to or less than the second predetermined rotation number KSP2, the procedure goes to step S93 in which the lockup OFF normality timer TLOFs is reset. At this time, the lockup OFF failure timer TLOFf and the lockup OFF normality timer TLOFs are both reset.

As shown in FIG. 22, a dead zone is located in the slip rotation number SLP between the first predetermined rotation number KSP1 for the lockup OFF failure determination and the second predetermined rotation number KSP2 for the lockup OFF normality determination. In the dead zone, the numbers of both the lockup OFF failure timer and the lockup OFF normality timer are not increased. The failure is determined when the slip rotation number SLP becomes greater than the dead zone, the normality is determined when the slip rotation number SLP becomes less than the dead zone.

Therefore, the lockup OFF failure determination and the lockup OFF normality determination can be carried out with accuracy. Further, if such determinations are carried out based on a single predetermined value, the failure determination and the normality determination are repeatedly carried out in front and behind of the single predetermined value. Such hunting in the determinations is avoided by the embodiment of the present invention. As a result, the mechanical failure of the solenoid valve can be favorably determined and the fail-safe control can be also favorably carried out.

Next, the lockup ON failure and normality determination control in step S15 in FIG. 14 will be explained in accordance with FIGS. 23–26.

Figure 23:
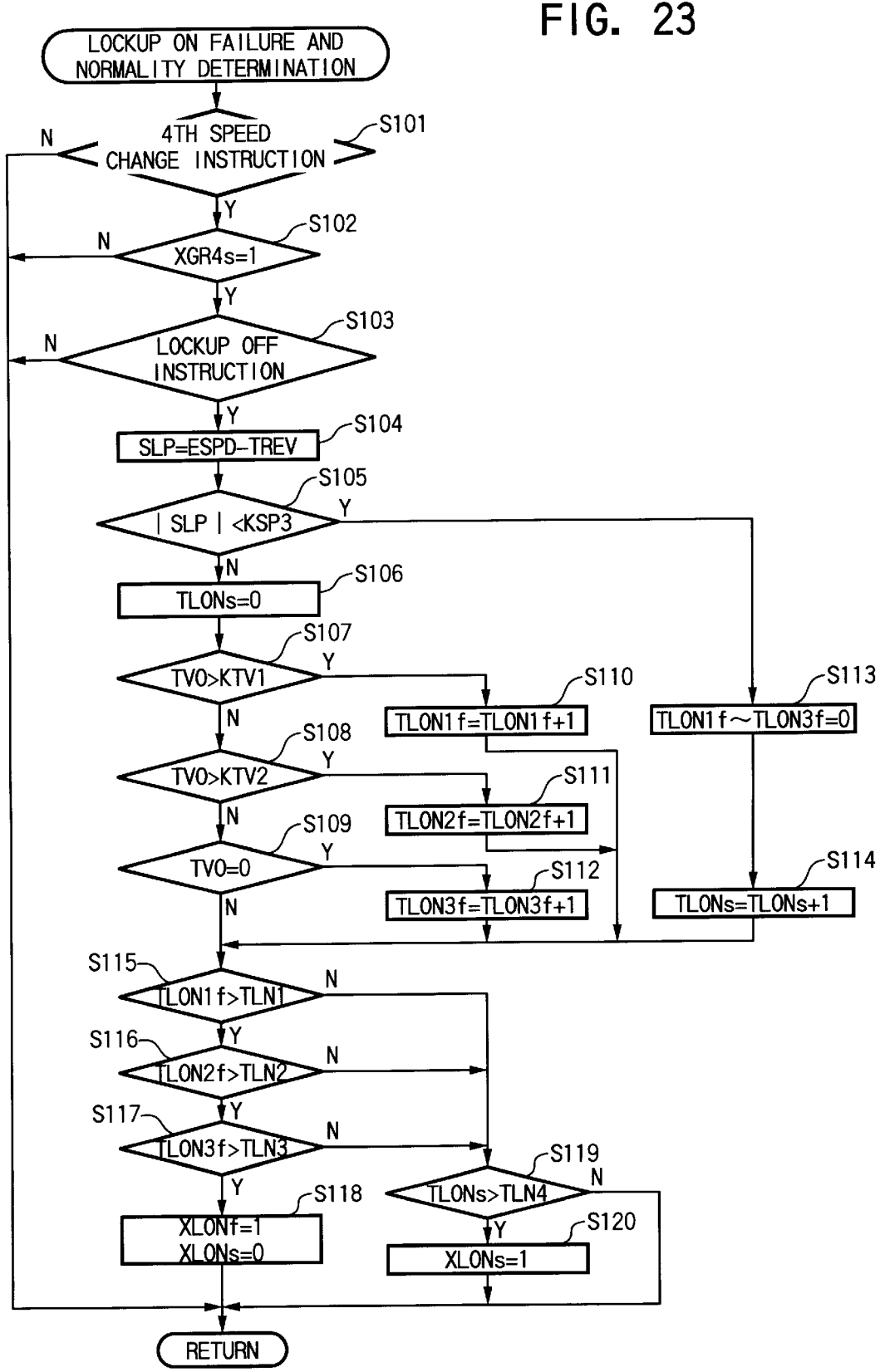
FIG. 23 is a flowchart showing a program for a lockup ON failure and normality determination.

Referring to FIG. 23, the controller 300 determines in steps S101 and S102 whether the speed change instruction of the 4th speed is output and whether the 4th speed gear normality flag XGR4s is set. When the 4th speed instruction is output and the 4th speed gear failure does not occur, namely there is no gear failure at the 4th speed instruction, the procedure goes to step S103 in which it is determined whether a lockup OFF instruction is output. If the instruction is output, the lockup ON failure and normality determination control is carried out.

The lockup ON failure and normality determination control is carried out only at the 4th speed instruction, since the lockup ON failure based on the mechanical failure of the solenoid valve never occur at other than the 4th speed gear stage.

The lockup ON failure and normality determination control is carried out only when the 4th speed gear normality flag XGR4s is set, since instruction, since the ON failure might be wrongly determined when the 4th speed gear failure, especially the 4th speed neutral failure occurs and the slip amount therefore does not become so large during the disengagement of the lockup clutch 26.

If YES in the steps S102–S104, the procedure goes to step S104 in which the slip rotation number SLP (=ESPD−TREV) of the lockup clutch 26 is obtained based on the engine rotation number ESPD and the turbine rotation number TREV. In step S105, it is determined whether the absolute value of the slip rotation number SLP is less than a predetermined rotation number KSP3.

Figure 24:
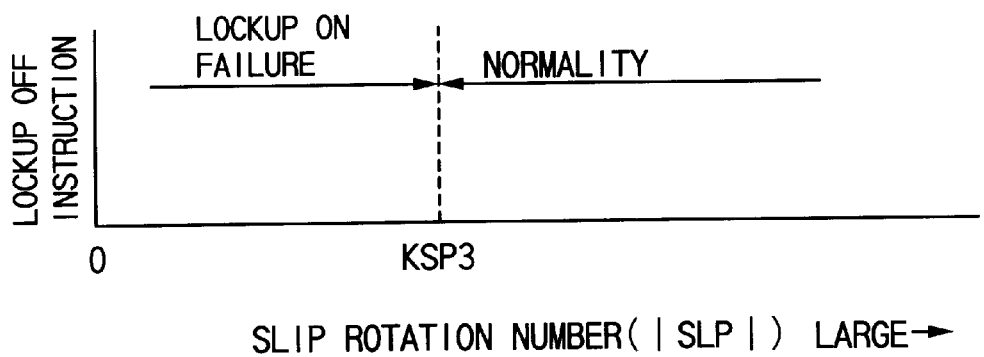
FIG. 24 is a graphical representation showing a slip rotation number for a lockup ON failure and normality determination.

When the slip rotation number SLP of the lockup clutch 26 is less than the predetermined rotation number KSP3, it is generally considered that the clutch is engaged. The predetermined rotation number KSP3 has such meaning. Therefore, as shown in FIG. 24, when |SLP|<KSP3 at the lockup OFF instruction, it is as a rule determined that the lockup ON failure occurs. In step S106, the lockup ON normality timer TLONs is reset, and then the control for the lockup ON failure is carried out.

Namely, it is determined whether the throttle opening TVO is greater than a first predetermined opening KTV1 in step S107. When the throttle opening TVO is equal to or less than the first predetermined opening KTV1, it is determined in step S108 whether the throttle opening TVO is greater than a second predetermined opening KTV2. When the throttle opening TVO is equal to or less than the second predetermined opening KTV2, it is determined in step S109 whether the throttle valve is fully closed (TVO=0).

Figure 25:
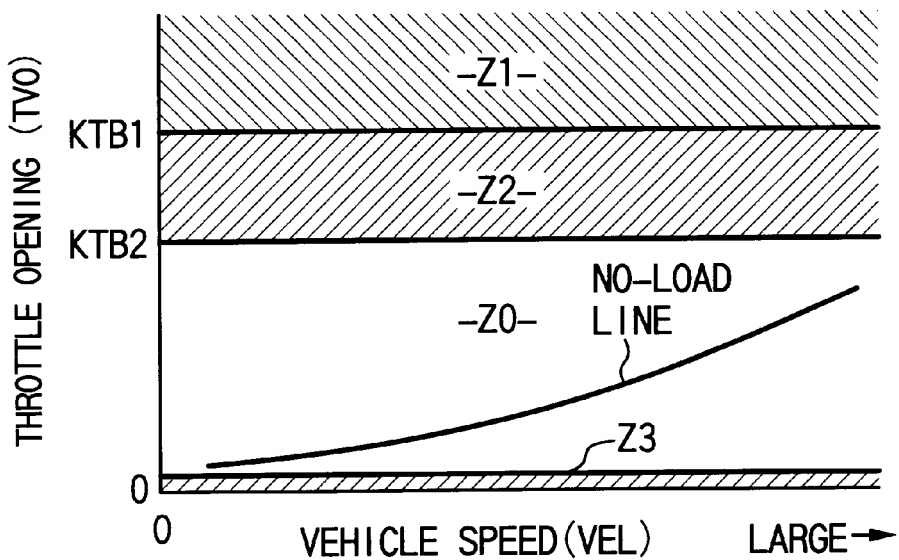
FIG. 25 is a graphical representation showing a throttle opening.

As shown in FIG. 25, the second predetermined opening KTV2 is provided at a high load side above the no-load-line which shows the characteristic of the throttle opening TVO which is necessary to maintain the engine rotation number ESPD at the present time. Therefore, in steps S107–S109, in the area of the throttle opening TVO, the area Z0 including the no-load-line is deleted, the higher load area than the no-load-line is divided into a high load area Z1 and an middle load area Z2, and a fully closed area Z3, which is located in a lower load area than the no-load-line, is provided.

It is determined to which areas Z1–Z3 the throttle opening TVO belongs in steps S107–S109. When the throttle opening TVO belongs to the high load area Z1 (TOV>KTV1), the procedure goes to step S110 in which the number of a first lockup ON failure timer TLON1f is increased one by one. When the throttle opening TVO belongs to the middle load area Z2 (TOV≧KTV2), the procedure goes to step S111 in which the number of a second lockup ON failure timer TLON2f is increased one by one. When the throttle opening TVO belongs to the fully closed area Z3 (TOV=0), the procedure goes to step S112 in which the number of a third lockup ON failure timer TLON3f is increased one by one.

When the throttle opening TVO belongs to the area Z0 including the no-load-line, none of the numbers of the ON failure timers are not increased, and the following failure determination is not carried out.

When it is determined that the absolute value of the slip rotation number SLP is equal to or greater than the predetermined roation number KSP3 in step S105, it is considered that the lockup clutch 26 has been engaged corresponding to the OFF instruction. Then, the procedure goes to step S113 in which the 1st to 3rd lockup ON failure timers TLON1f–TLON3f are reset, and goes to step S114 in which the number of the lockup ON normality timer TLONs is increased one by one.

Thereafter, the procedure goes to steps S115–S117 in which the controller 300 determines whether the numbers of the 1st to 3rd lockup ON failure timers TLON1f–TLON3f are respectively greater than a first predetermined value TLN1, a second predetermined value TLN2 and a third predetermined value TLN3. When the number of the first lockup ON timer TLON1f is greater than the first predetermined value TLN1, the number of the second lockup ON timer TLON2f is greater than the second predetermined value TLN2 and the number of the third lockup ON timer TLON3f is greater than the third predetermined value TLN3, the procedure goes to step S118 in which the lockup ON failure flag XLONf is set while the lockup ON normality flag XLONs is reset.

Here, the "lockup ON normality" means the condition in which there is certainly an OFF condition without an ON failure at the lockup OFF instruction.

When it is determined that at least one of the numbers of the 1st to 3rd lockup ON failure timers TLON1f–TLON3f is not greater than the corresponding one among the first to third predetermined values TLN1–TLN3 in steps S115–S117, the procedure goes to step S119 in which it is determined whether the number of the lockup ON normality timer TLONs is greater than a predetermined value TLN4. If YES in step S120, the procedure goes to step S120 in which the lockup ON normality flag XLONs is set.

According to the embodiment of the present invention, when it is determined that the absolute value of the slip rotation number SLP of the lockup clutch 26 is less than the predetermined rotation number KSP3 at the lockup OFF instruction, it is not immediately determined that the lockup ON failure has occurred. Instead, the respective lockup ON failure timers TLON1f–TLON3 calculate the time periods during which the absolute value of the slip rotation number SLP of the lockup clutch 26 is less than the predetermined rotation number KSP3 in the respective areas Z1–Z3 of the throttle valve opening TVO. Thereafter, only when the predetermined time periods, during which the slip rotation numbers SLP are small in all areas, have passed, it is determined that lockup ON failure has occurred. Therefore, even if the throttle valve opening TVO changes frequently, the lockup ON failure determination can be accurately carried out.

Further, even if the numbers of the timers TLON1f–TLON3f are increased, when the slip rotation number SLP becomes equal to or greater than the predetermined value KSP3, the procedure goes to step S113 in which the timers TLON1f–TLON3f are immediately reset so that the lockup ON failure determination is stopped. Thus, the lockup ON failure determination can be more accurately carried out.

Further, when determining the lockup ON failure, the area Z0 is deleted from the throttle valve opening TVO, the lockup ON failure determination can be much more accurately carried out.

The area Z0 including the no-load-line is a transition area in which the transmission is driven by the engine and the engine is driven by the transmission. In such area, there is little difference of the rotation number between the input side and the output side even when the lockup clutch 26 is disengaged. Therefore, if the absolute value of the slip rotation number SLP is less than the predetermined value KSP3 in the area Z0, this does not necessarily mean that the lockup ON failure has occurred.

Thus, the numbers of the lockup ON failure timers are not increased in the area Z0 even when the absolute value of the slip rotation number SLP is less than the predetermined value KSP3. Therefore, the wrong determination that the lockup ON failure has occurred when the lockup clutch 26 is disengaged can be avoided. As a result, the lockup ON failure determination can be much more accurately carried out.

According to the embodiment of the present invention, the predetermined values TLN1–TLN3 for the timers TLON1f–TLON3f are respectively provided such that the predetermined value TLN1 for the high load area Z1 is shortest and the predetermined value TLN3 for the fully closed area Z3 is longest. Since the high load area Z1 has a low frequency in a driving and the fully closed area Z3 has a high frequency in driving, the time period for the determination in the area Z1 is provided to be short and the time period in the area Z3 is provided to be long. The total time period for the determination can be shorten while the high accuracy for the determination can be maintained. In other word, if the time period for the determination is provided to be short in the area in which the driving frequency is low, the long time period is necessary to obtain the determination.

Figure 26:
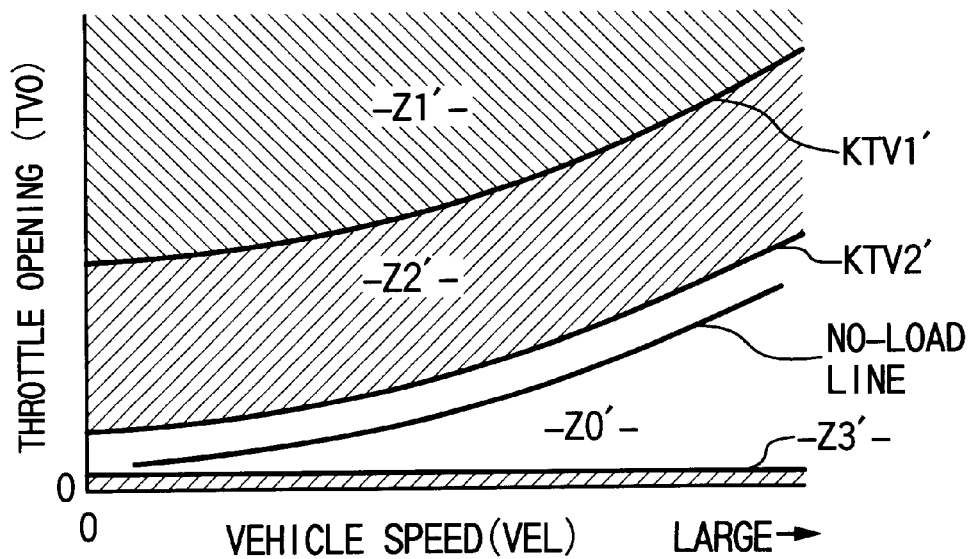
FIG. 26 is a graphical representation showing another example of the throttle opening.

The example in FIG. 25, the first and second predetermined throttle valve openings KTV1 and KTV2 for defining the high load area Z1, the middle load are Z2 and the area Z0 including the no-load-line are provided to be constant along the vehicle speed VEL. FIG. 26 shows another example. As shown in FIG. 26, the second predetermined throttle valve opening KTV2' is provided to locate in the higher load area than the no-load-line and increase as the vehicle speed becomes high. The first predetermined throttle valve opening KTV1' has the same characteristic as that of the second predetermined throttle valve opening KTV2'. The other area Z0' and Z3' are provided as shown in FIG. 26.

According to the example shown in FIG. 26, the area, in which it might be wrongly determined that the lockup ON failure has occurred, is limited to be as small as possible. As a result, the lockup ON failure determination can be carried out in the larger area in the example in FIG. 26 than the example in FIG. 25. Thus, the accuracy of the determination is further improved.

In both examples in FIGS. 25 and 26, since the unnecessary determination can be avoided in the areas Z0 and Z0' including the no-load-line, the determination can be obtained sooner.

Next, the engagement failure and normality determination control in step S17 in FIG. 14 will be explained in accordance with FIGS. 27–28.

Figure 27:
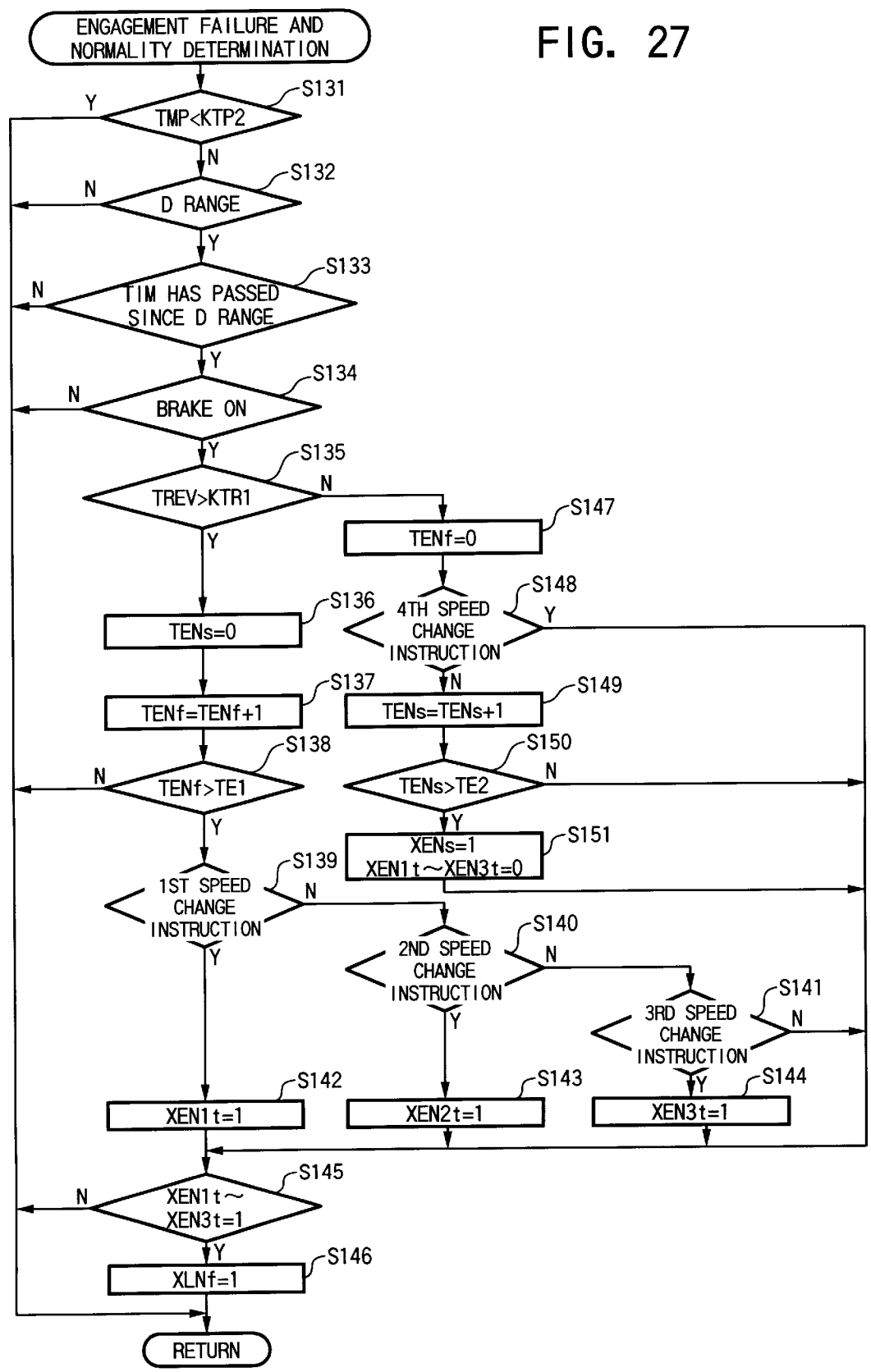
FIG. 27 is a flowchart showing a program for an engagement failure and normality determination.
Figure 28:
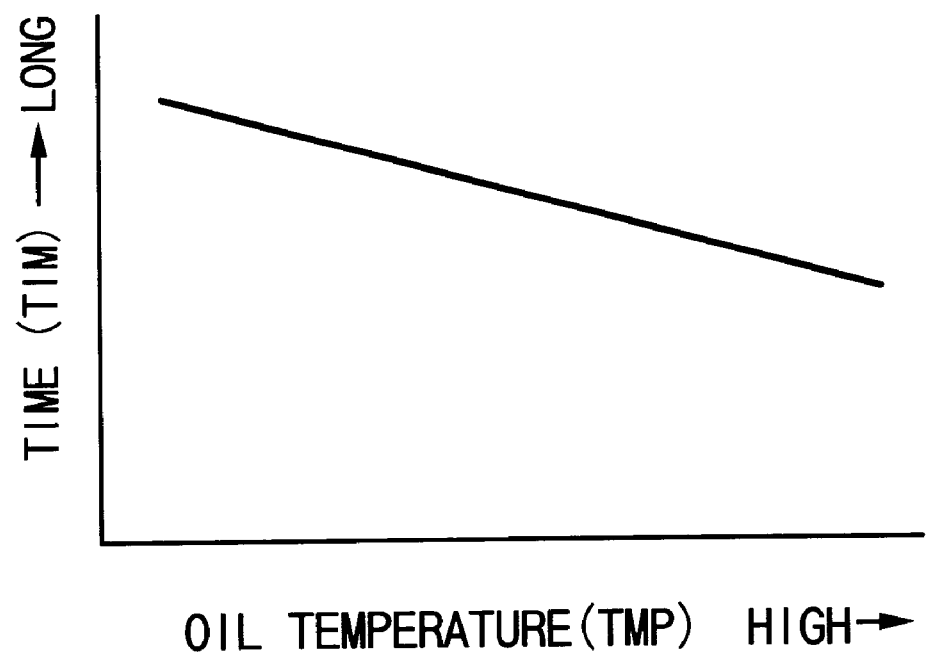
FIG. 28 is a graphical representation showing a relationship between a time and an oil temperature.

Referring to FIG. 27, the controller 300 determines in step S131 in which whether the oil temperature TMP is lower than a predetermined temperature KTP2 at which the frictional element is not favorably engaged. If YES in step S131, the engagement failure and normality determination control is stopped.

If NO in step S131, the procedure goes to step S132 in which it is determined whether the selected range by the driver is the D range where the 1st to 4th speed changes are carried out automatically. If YES in step S132, the procedure goes to step S133 in which it is determined whether a predetermined time period TIM has passed since the D range is selected.

The predetermined time period TIM is provided to be a time period until which the transitional condition generated by the selection of the range has finished. As shown in FIG. 28, the predetermined time period is provided to be long as the oil temperature TMP is low. This is because the viscosity of the oil becomes high and the oil is introduced into the frictional element with a long time period after the engagement operation is carried out, as the oil temperature TMP is low.

After the predetermined time period TIM has passed, the procedure goes to step S134 in which it is determined whether the brake has been operated or the vehicle has been stopped. If the vehicle has been stopped, the procedure goes to step S135 in which it is determined whether the turbine rotation number TREV is greater than a predetermined rotation number KTR1.

The predetermined rotation number KTR1 is close to zero. When the turbine rotation number TREV is greater than the predetermined rotation number KTR1 under the condition of the vehicle being stopping at the D range, it is determined that the engagement operation of the forward clutch 41 is wrongly carried out under the condition of the speed change gears 30 being in a neutral condition. Thereafter, the procedure goes to steps S136 and S137 in which an engagement normality timer TENs is reset while the number of an engagement failure timer TENf is increased one by one.

When the number of the failure timer TENf is greater than a predetermined value TE1, namely when the predetermined time period has passed since the wrong engagement operation of the forward clutch 41 is detected, the procedure goes to steps S139–S141 in which it is determined which of the 1st, 2nd or 3rd speed are instructed at the present time. When the 1st speed is instructed, the 1st speed engagement failure temporary flag XEN1t is set in step S142. When the 2nd speed is instructed, the 2nd speed engagement failure temporary flag XEN2t is set in step S143. When the 3rd speed is instructed, the 3rd speed engagement failure temporary flag XEN3t is set in step S144.

The engagement failure is detected at the vehicle being stopped. Therefore, the engagement failure is first detected at the 1st speed instruction. At this time, as explained above, the 1st speed engagement failure temporary flag XEN1t is set. Then, the 4th speed obtained without the engagement of the forward clutch 41 is selected by a gear stage selection control, explained hereinafter, as a fail-safe control carried out during the engagement failure. When the vehicle starts at the 4th speed and then has stopped, the 2nd speed instruction is output by the gear stage selection control. When the engagement failure, in which the turbine rotation number TREV is greater than the predetermined rotation number KTR1 at the 2nd speed instruction, the 2nd speed engagement failure temporary flag XEN2t is set and the vehicle is started with the selected 4th speed. The 3rd speed instruction is output at the next vehicle' stop. When the engagement failure at 3rd speed instruction is detected at the start of the vehicle, the 3rd speed engagement failure temporary flag XEN3t is set and the 4th speed is selected and the vehicle starts.

Thus, when the 1st to 3rd speed engagement failure temporary flags XEN1t–XEN3t are set, the procedure goes from step S145 to step S146 in which the engagement failure flag XENf for defining the engagement failure is set. At this time, the outputs of the 1st to 3rd speed instructions are prohibited by the gear stage selection control and the 4th speed starting is defined.

On the other hand, if it is determined in step S135 that the turbine rotation number TREV is equal to or less than the predetermined rotation number KTR1 during the engagement failure determination operation under the condition of the vehicle is stopped, the procedure goes to step S147 in which the controller 300 resets the engagement failure timer TENf and goes to step S148 in which the controller 300 determines whether the instruction of the speed change is the 4th speed.

If NO in step S148, namely any of the 1st to 3rd speeds in which the forward clutch is engaged is instructed and the turbine rotation number TREV is equal to or less than the predetermined rotation number KTR1, it is determined that the engagement of the forward clutch 41 is normally operated. Then the procedure goes to step S149 in which the number of an engagement normality timer TENs is increased one by one. When it is determined in step S150 that the number of the timer TENs is greater than a predetermined value TE2, namely the predetermined time period has passed since the normal engagement is detected, the procedure goes from step S150 to step S151 in which the engagement normality flag XENs is set while the 1st to 3rd speed engagement failure temporary flags XEN1t–XEN3t are reset.

As explained above, when the engagement failure is detected at the 1st speed instruction, the 4th speed instruction is provided and the vehicle can start running at the 4th speed instruction without determining the engagement failure at the 2nd and 3rd speed instructions. This is because it takes a long time to start the vehicle and give a bad feeling to the driver if the vehicle is started at the 4th speed instruction after determining the engagement failure at the 2nd and 3rd speed instructions.

If the engagement failure determination does not need a long time period at the respective speed change instructions, or such long time period is not a serious problem, the vehicle may be started at the 4th speed instruction after determining the engagement failure at the 2nd and 3rd speed instructions.

As explained above, while the controller 300 carries out the respective controls of the gear failure and normality determination, the lockup OFF failure and normality determination, the lockup ON failure and normality determination and the engagement failure and normality determination, the controller 300 carries out the solenoid mechanical failure determination control shown in step S18 in FIG. 14.

Figure 29:
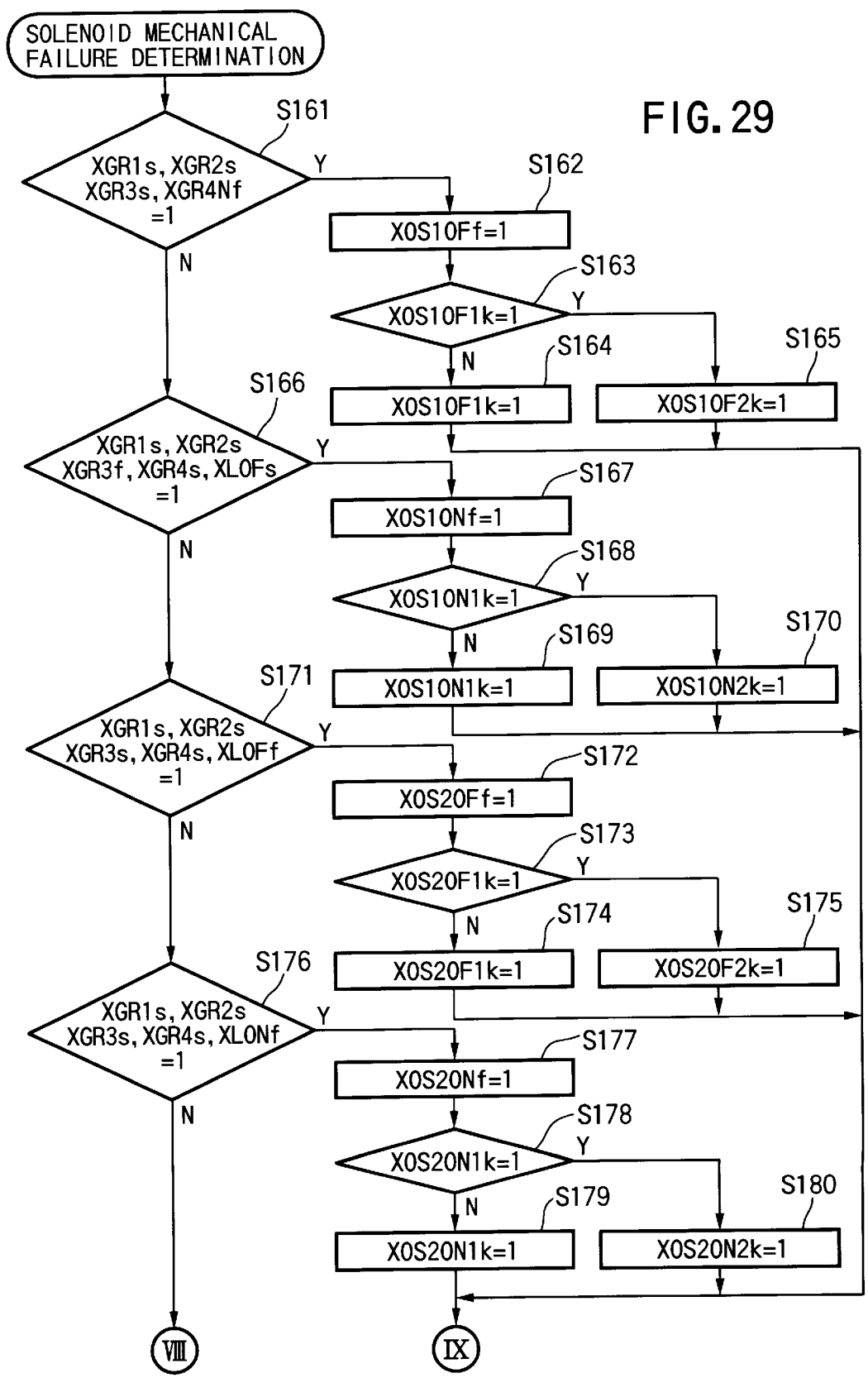
FIG. 29 is a flowchart showing a first part of a program for a solenoid mechanical failure determination control.
Figure 30:
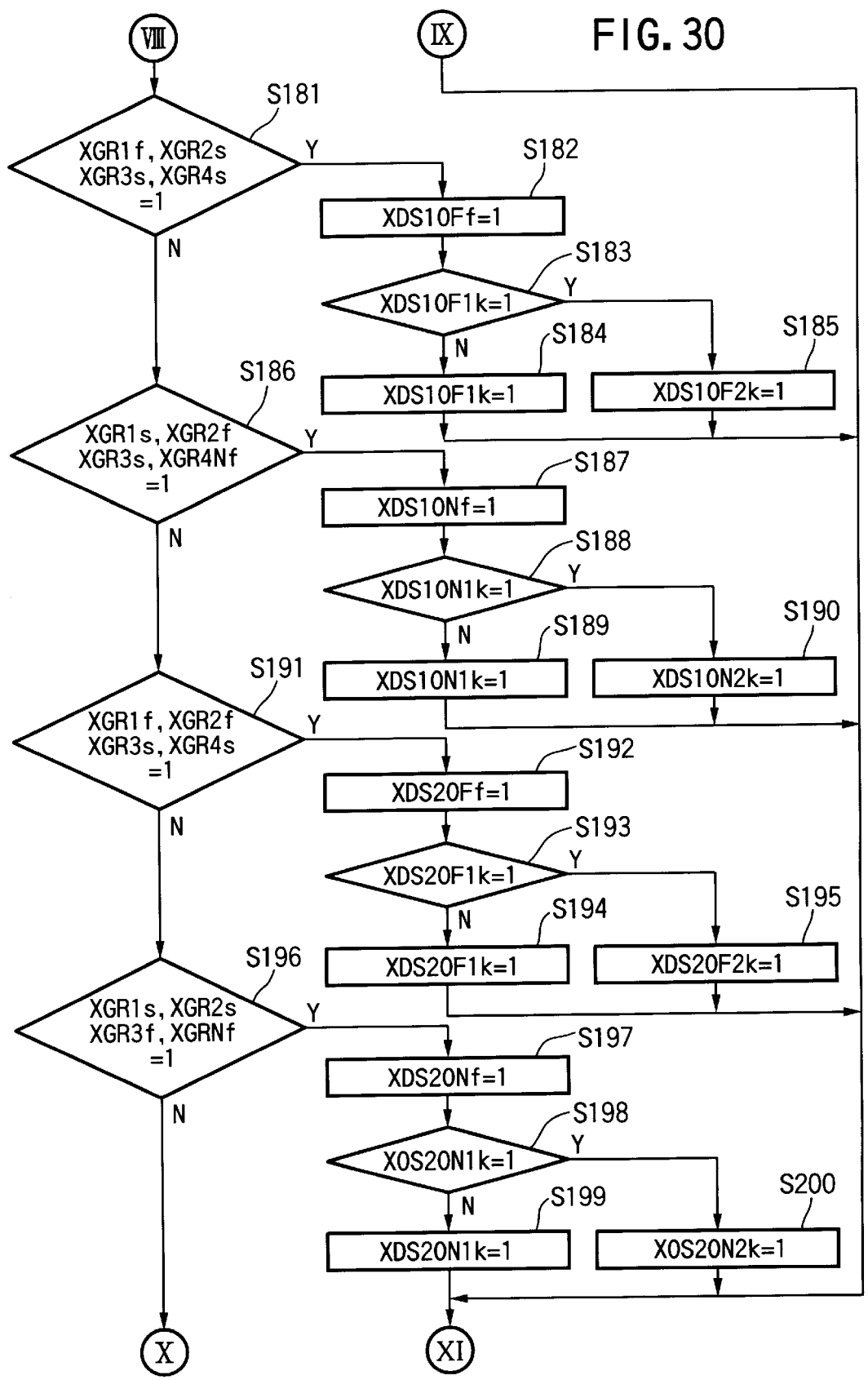
FIG. 30 is a flowchart showing an intermediate part of a solenoid mechanical failure of a solenoid valve determination control.
Figure 31:
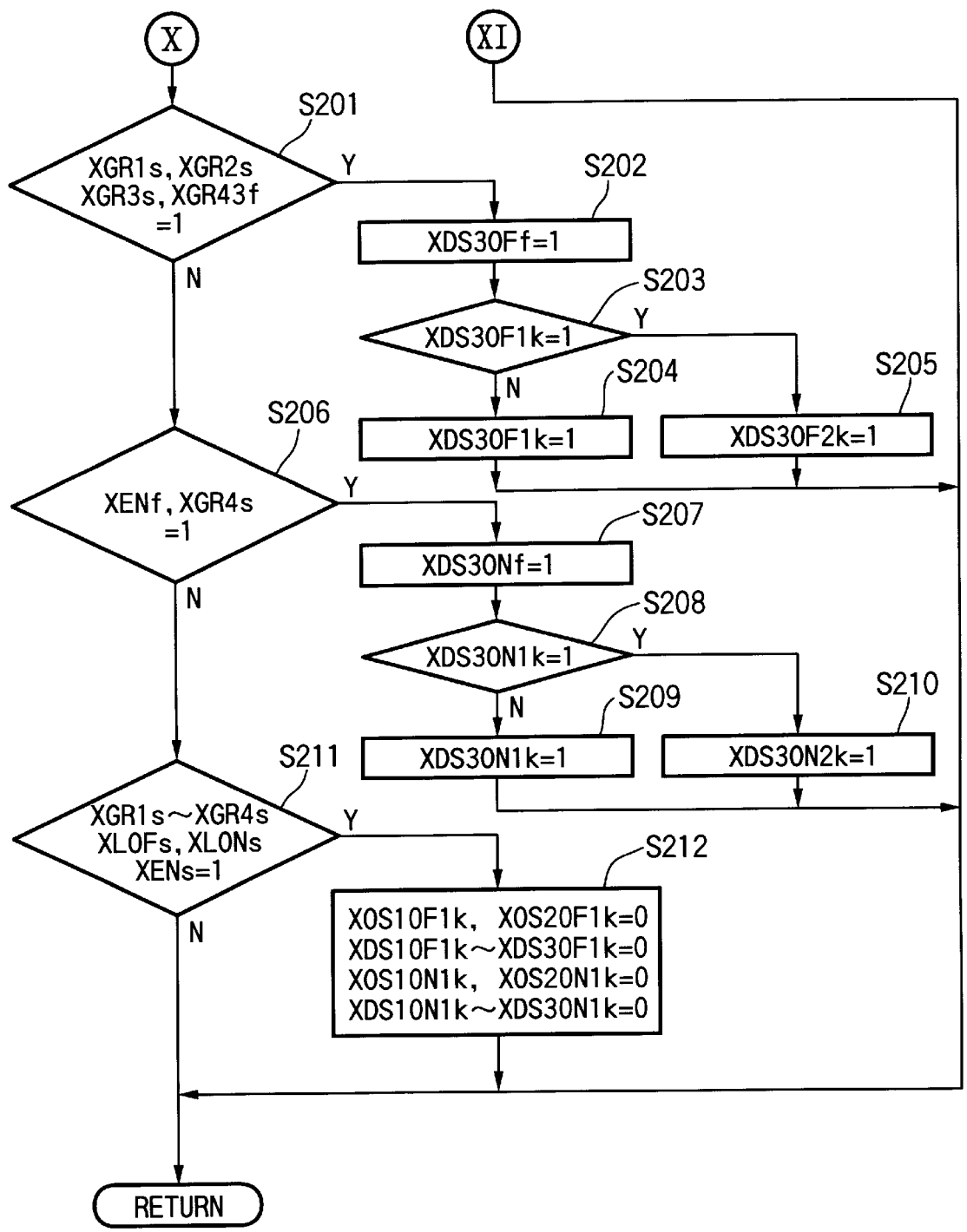
FIG. 31 is a flowchart showing a latter part of a program for a solenoid mechanical failure determination control.

Next, the solenoid mechanical failure determination control will be explained in accordance with FIGS. 29–31.

It is determined in step S161 whether the 1st speed normality flag XGR1s, the 2nd normality flag XGR2s, the 3rd speed normality flag XGR3s and the 4th speed neutral failure flag XGR4f are all set. This combination of the failure and the normality in the respective gear stages corresponds to the OFF failure of the 1st on-off SV 111 shown in Table 5. When this combination is established, the controller 300 determines that the OFF failure of the 1st on-off SV 111 has occurred. In step S162, the 1st on-off SV OFF failure flag XOS1OFf is set. At this time, since the 1st on-off SV OFF failure 1st DCKAM flag XOS1OF1k is not set, the procedure goes from step S163 to step S164 in which the 1st on-off SV OFF failure 1st DCKAM flag XOS1OF1k is not set is set.

The 1st DCKAM flag XOS1OF1k is maintained after the ignition is ON. Therefore, when it is again determined in step S161 that the above mentioned combination is established in the next driving cycle, the procedure this time goes from step S163 to step S165 in which the 1st on-off SV OFF failure 2nd DCKAM flag XOS1OF2k is set. Thus, when the OFF failure of the 1st on-off SV111 is determined consecutively in the first and second driving cycles and the 1st DCKAM flag XOS1OF1k and the 2nd DCKAM flag XOS1OF2k are both set, the OFF failure of the 1st on-off SV 111 is defined.

Next, it is determined in step S166 whether the 1st speed normality flag XGR1s, the 2nd normality flag XGR2s, the 3rd speed failure flag XGR3f, the 4th speed normality flag XGR4s and the lockup OFF normality flag XLOFs are all set. This combination of the failure and the normality in the respective gear stages and the lockup clutch 26 corresponds to the ON failure of the 1st on-off SV 111 shown in Table 5. When this combination is established, the controller 300 determines that the ON failure of the 1st on-off SV 111 has occurred. In step S167, the 1st on-off SV ON failure flag XOS1ONf is set. At this time, in the same way as the above case, the procedure goes from step S168 to step S169 in which the 1st on-off SV ON failure 1st DCKAM flag XOS1ON1k is set.

When it is determined in step S166 that the above mentioned combination is again established in the next driving cycle, the procedure this time goes from step S168 to step S170 in which the 1st on-off SV ON failure 2nd DCKAM flag XOS1ON2k is set. Thus, the ON failure of the 1st on-off SV 111 is defined.

Next, it is determined in step S171 whether the 1st speed normality flag XGR1s, the 2nd normality flag XGR2s, the 3rd speed normality flag XGR3s, the 4th speed normality flag XGR4s and the lockup OFF failure flag XLOFf are all set. This combination of the failure and the normality in the respective gear stages and the lockup clutch 26 corresponds to the OFF failure of the 2nd on-off SV 112 shown in Table 5. When this combination is established, the controller 300 determines that the OFF failure of the 2nd on-off SV 112 has occurred. In step S172, the 2nd on-off SV OFF failure flag XOS2OFf is set. At this time, in the same way as the above case, the procedure goes from step S173 to step S174 in which the 2nd on-off SV OFF failure 1st DCKAM flag XOS2OF1k is set.

When it is determined in step S171 that the above mentioned combination is again established in the next driving cycle, the procedure this time goes from step S173 to step S175 in which the 2nd on-off SV OFF failure 2nd DCKAM flag XOS2OF2k is set. Thus, the OFF failure of the 2nd on-off SV 112 is defined.

Next, it is determined in step S176 whether the 1st speed normality flag XGR1s, the 2nd normality flag XGR2s, the 3rd speed normality flag XGR3s, the 4th speed normality flag XGR4s and the lockup ON failure flag XLONf are all set. This combination of the failure and the normality in the respective gear stages and the lockup clutch 26 corresponds to the ON failure of the 2nd on-off SV 112 shown in Table 5. When this combination is established, the controller 300 determines that the ON failure of the 2nd on-off SV 112 has occurred. In step S177, the 2nd on-off SV ON failure flag XOS2ONf is set. At this time, in the same way as the above case, the procedure goes from step S178 to step S179 in which the 2nd on-off SV ON failure 1st DCKAM flag XOS2oN1k is set.

When it is determined in step S176 that the above mentioned combination is again established in the next driving cycle, the procedure this time goes from step S178 to step S180 in which the 2nd on-off SV ON failure 2nd DCKAM flag XOS2ON2k is set. Thus, the ON failure of the 2nd on-off SV 112 is defined.

Next, it is determined in step S181 whether the 1st speed failure flag XGR1f, the 2nd normality flag XGR2s, the 3rd speed normality flag XGR3s and the 4th speed normality flag XGR4s are all set. This combination of the failure and the normality in the respective gear stages corresponds to the OFF failure of the 1st duty SV 121 shown in Table 5. When this combination is established, the controller 300 determines that the OFF failure of the 1st duty SV 121 has occurred. In step S182, the 1st duty SV OFF failure flag XDS1OFf is set. At this time, in the same way as the above case, the procedure goes from step S183 to step S184 in which the 1st duty SV OFF failure 1st DCKAM flag XDS1OF1k is set.

When it is determined in step S181 that the above mentioned combination is again established in the next driving cycle, the procedure this time goes from step S183 to step S185 in which the 1st duty SV OFF failure 2nd DCKAM flag XDS1OF2k is set. Thus, the OFF failure of the 1st duty SV 121 is defined.

Next, it is determined in step S186 whether the 1st speed normality flag XGRis, the 2nd failure flag XGR2f, the 3rd speed normality flag XGR3s and the 4th speed neutral failure flag XGR4Nf are all set. This combination of the failure and the normality in the respective gear stages corresponds to the ON failure of the 1st duty SV 121 shown in Table 5. When this combination is established, the controller 300 determines that the ON failure of the 1st duty SV 121 has occurred. In step S187, the 1st duty SV ON failure flag XDS1ONf is set. At this time, in the same way as the above case, the procedure goes from step S188 to step S189 in which the 1st duty SV ON failure 1st DCKAM flag XDS1ON1k is set.

When it is determined in step S186 that the above mentioned combination is again established in the next driving cycle, the procedure this time goes from step S186 to step S190 in which the 1st duty SV ON failure 2nd DCKAM flag XDS1ON2k is set. Thus, the ON failure of the 1st duty SV 121 is defined.

Next, it is determined in step S191 whether the 1st speed failure flag XGR1f, the 2nd failure flag XGR2f, the 3rd speed normality flag XGR3s and the 4th speed normality flag XGR4s are all set. This combination of the failure and the normality in the respective gear stages corresponds to the OFF failure of the 2nd duty SV 122 shown in Table 5. When this combination is established, the controller 300 determines that the OFF failure of the 2nd duty SV 122 has occurred. In step S192, the 2nd duty SV OFF failure flag XDS2OFf is set. At this time, in the same way as the above case, the procedure goes from step S193 to step S174 in which the 2nd duty SV OFF failure 1st DCKAM flag XDS2OF1k is set.

When it is determined in step S191 that the above mentioned combination is again established in the next driving cycle, the procedure this time goes from step S193 to step S195 in which the 2nd duty SV OFF failure 2nd DCKAM flag XDS2OF2k is set. Thus, the OFF failure of the 2nd duty SV 122 is defined.

Next, it is determined in step S196 whether the 1st speed normality flag XGR1s, the 2nd normality flag XGR2s, the 3rd speed failure flag XGR3f and the 4th speed neutral failure flag XGR4Nf and are all set. This combination of the failure and the normality in the respective gear stages corresponds to the ON failure of the 2nd duty SV 122 shown in Table 5. When this combination is established, the controller 300 determines that the ON failure of the 2nd duty SV 122 has occurred. Instep S197, the 2nd duty SV ON failure flag XDS2ONf is set. At this time, in the same way as the above case, the procedure goes from step S198 to step S199 in which the 2nd duty SV ON failure 1st DCKAM flag XDS2ON1k is set.

When it is determined in step S196 that the above mentioned combination is again established in the next driving cycle, the procedure this time goes from step S198 to step S200 in which the 2nd duty SV ON failure 2nd DCKAM flag XDS2ON2k is set. Thus, the ON failure of the 2nd duty SV 122 is defined.

Next, it is determined in step S201 whether the 1st speed normality flag XGR1s, the 2nd normality flag XGR2s, the 3rd speed normality flag XGR3s and the 4th speed 3rd speed failure flag XGR43f are all set. This combination of the failure and the normality in the respective gear stages corresponds to the OFF failure of the 3rd duty SV 122 shown in Table 5. When this combination is established, the controller 300 determines that the OFF failure of the 3rd duty SV 123 has occurred. In step S202, the 3rd duty SV OFF failure flag XDS3OFf is set. At this time, in the same way as the above case, the procedure goes from step S203 to step S204 in which the 3rd duty SV OFF failure 1st DCKAM flag XDS3OF1k is set.

When it is determined in step S201 that the above mentioned combination is again established in the next driving cycle, the procedure this time goes from step S203 to step S205 in which the 3rd duty SV OFF failure 2nd DCKAM flag XDS3OF2k is set. Thus, the OFF failure of the 3rd duty SV 123 is defined.

Next, it is determined in step S206 whether the engagement failure flag XENf and the 4th speed normality flag XGR4s are all set. Since the engagement failure flag XENf is set when the engagement failure occurs at all of the 1st to 3rd speed instructions, this combination of the failure and the normality in the gear stage and the engagement operation corresponds to the ON failure of the 3rd duty SV 123 shown in Table 5. When this combination is established, the controller 300 determines that the ON failure of the 3rd duty SV 123 has occurred. In step S207, the 3rd duty SV ON failure flag XDS3ONf is set. At this time, in the same way as the above case, the procedure goes from step S208 to step S209 in which the 3rd duty SV ON failure 1st DCKAM flag XDS3ON1k is set.

When it is determined in step S206 that the above mentioned combination is again established in the next driving cycle, the procedure this time goes from step S208 to step S210 in which the 3rd duty SV ON failure 2nd DCKAM flag XDS3ON2k is set. Thus, the ON failure of the 3rd duty SV 123 is defined.

The controller 300 determines in step S211 whether the respective normality flags XGR1s–XGR4s, XLOFs, XLONs and XENs of the gear, the lockup OFF, the lockup ON and the engagement are all set. If the normality flags are all set, the procedure goes to step S212 in which the above mentioned respective 1st DCKAM flag XOS1OF1k, XOS2OF1k, XDOS1OF1k–XDOS3OF1k, XOS1ON1k, XOS2ON1k and XDS1ON–XDS3ON1k are reset.

Thus, even if the failure of any of the solenoid valve in the first driving cycle is determined and the correspond 1st DCKAM flag is set, the 1st DCKAM flag is reset when the failure is not determined in the next driving cycle.

Accordingly, even if the failure of the same solenoid valve is again determined in the further next driving cycle, the 1st DCKAM flag is newly set and the 2nd DCKAM is not set so that the failure determination of the solenoid valve is not defined at that time. Namely, only when the failure of the same solenoid valve is determined consecutively in the two driving cycles, the failure determination is defined. As a result, the failure determination can be carried out with a good liability.

Figure 32:
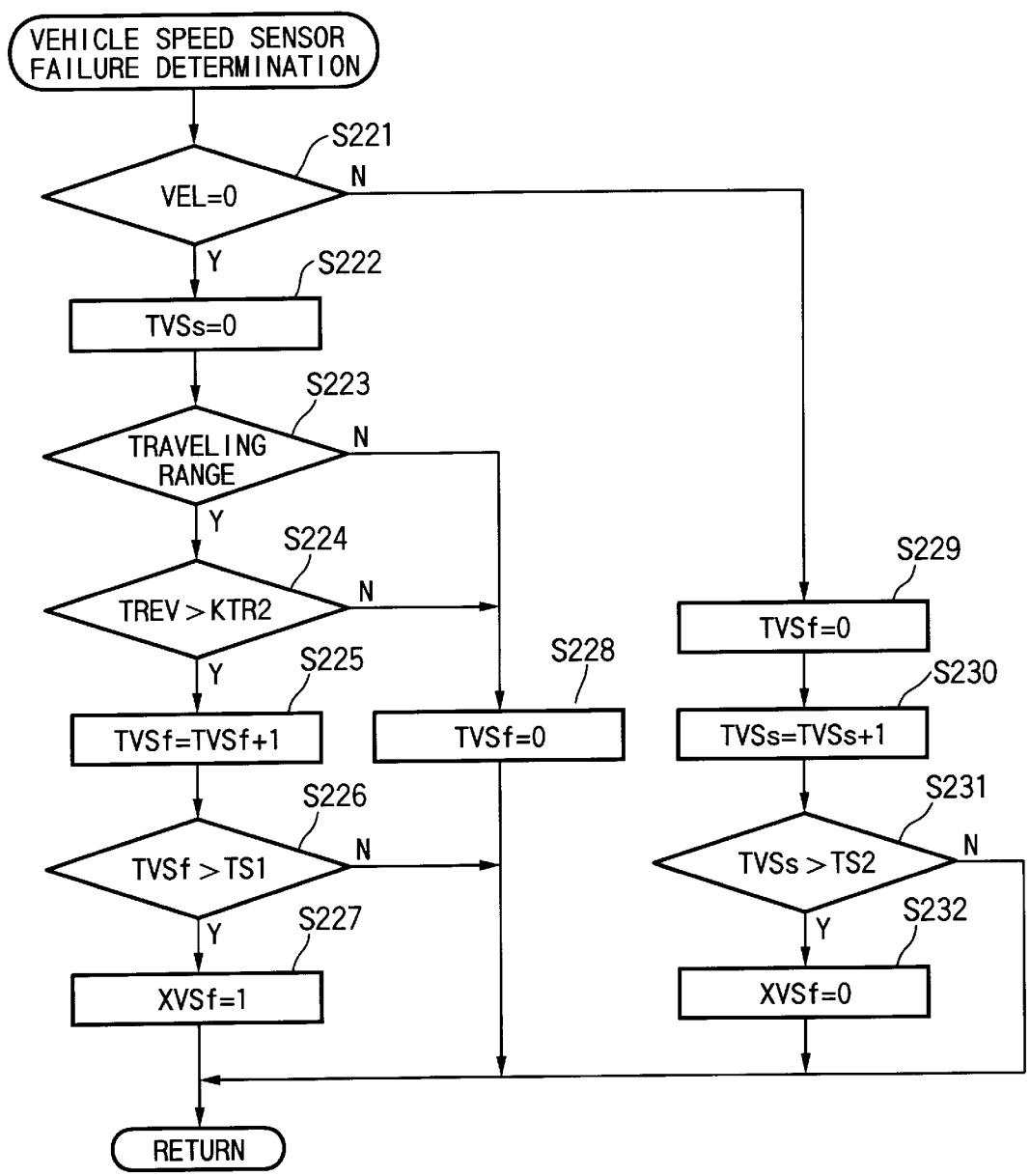
FIG. 32 is a flowchart showing a program for a vehicle speed sensor failure determination control.

Next, the vehicle speed sensor failure determination control in step S20 in FIG. 14 will be explained in accordance with FIG. 32.

The controller 300 determines in step S221 whether the vehicle speed VEL shown by the output signal of the vehicle speed sensor 301 is zero. If the speed is zero, the procedure goes to step S222 in which a vehicle speed sensor normality timer TVSs is reset. It is determined in step S223 whether the range selected by the driver is a traveling range such as D range. If the selected range is the traveling range, the procedure goes to step S224 in which the turbine rotation number TREV is greater than a predetermined rotation number KTR2.

Thus, when the traveling range is selected and the turbine rotation number TREV is greater than the predetermined rotation number KTR2 under the condition that the output signal of the vehicle speed sensor 301 shows zero, it is considered that the vehicle is traveling and it is therefore determined that the vehicle speed sensor 301 has a failure. In step S225, a vehicle speed sensor failure timer TVSf is counted up one by one. When the number of the timer is greater than a predetermined value TS1, namely the failure of the vehicle speed sensor 301 has continued for the predetermined time period, the procedure goes from step S226 to step S227 in which the vehicle sensor failure flag XVSf is set.

On the other hand, when the traveling range is not selected and the turbine rotation number TREV is not greater than the predetermined rotation number KTR2 under the condition that the output signal of the vehicle speed sensor 301 shows zero, it is considered that the vehicle has stopped and it is therefore determined that the vehicle speed sensor 301 works well. The procedure goes from step S223 or S224 to step S228 in which the vehicle speed sensor failure timer TVSf is reset.

When the vehicle speed VEL shown by the output signal of the vehicle speed sensor 301 is not zero, it is considered that the vehicle speed sensor 301 is normal. The procedure goes from step S221 to step S229 in which the vehicle speed sensor failure timer TVSf is reset and goes to S230 in which the vehicle speed sensor normality timer TVSs is counted up one by one. Thereafter, when the number of the vehicle speed sensor normality timer TVSs becomes greater than a predetermined value TS2, namely the normality of the vehicle speed sensor 301 has continued for the predetermined time period, the procedure goes from step S231 to step S232 in which the vehicle sensor failure flag XVSf is reset.

Thus, the failure determination of the vehicle speed sensor 301 is carried out, and the speed change control and the lockup control are consequently carried out. The vehicle speed failure determination control is, as explained regarding FIG. 14, is carried out only when the normality of the engagement is determined (XENs=1) based on the engagement failure and normality determination control. As a result, the wrong determination, based on that the vehicle speed failure determination control is carried out under the condition of the engagement failure' occurrence, can be avoid.

Namely, when the engagement failure occurs, the vehicle has stopped even if the selected range is the traveling range and the turbine rotation number TREV is greater than the predetermined rotation number KTR2. Therefore, if it is determined whether the vehicle speed sensor 301 is in a failure condition or a normal condition based on the output signal of the sensor 301 showing a zero vehicle speed, the wrong determination might be carried out. Accordingly, when the engagement failure occurs, the failure determination of the vehicle speed sensor 301 is prohibited so that such wrong determination can be avoid.

Next, the fail-safe control in step S19 in FIG. 14 will be explained in accordance with FIGS. 33–43. The fail-safe control is carried out based on the results obtained by the respective failure determinations explained above.

Figure 33:
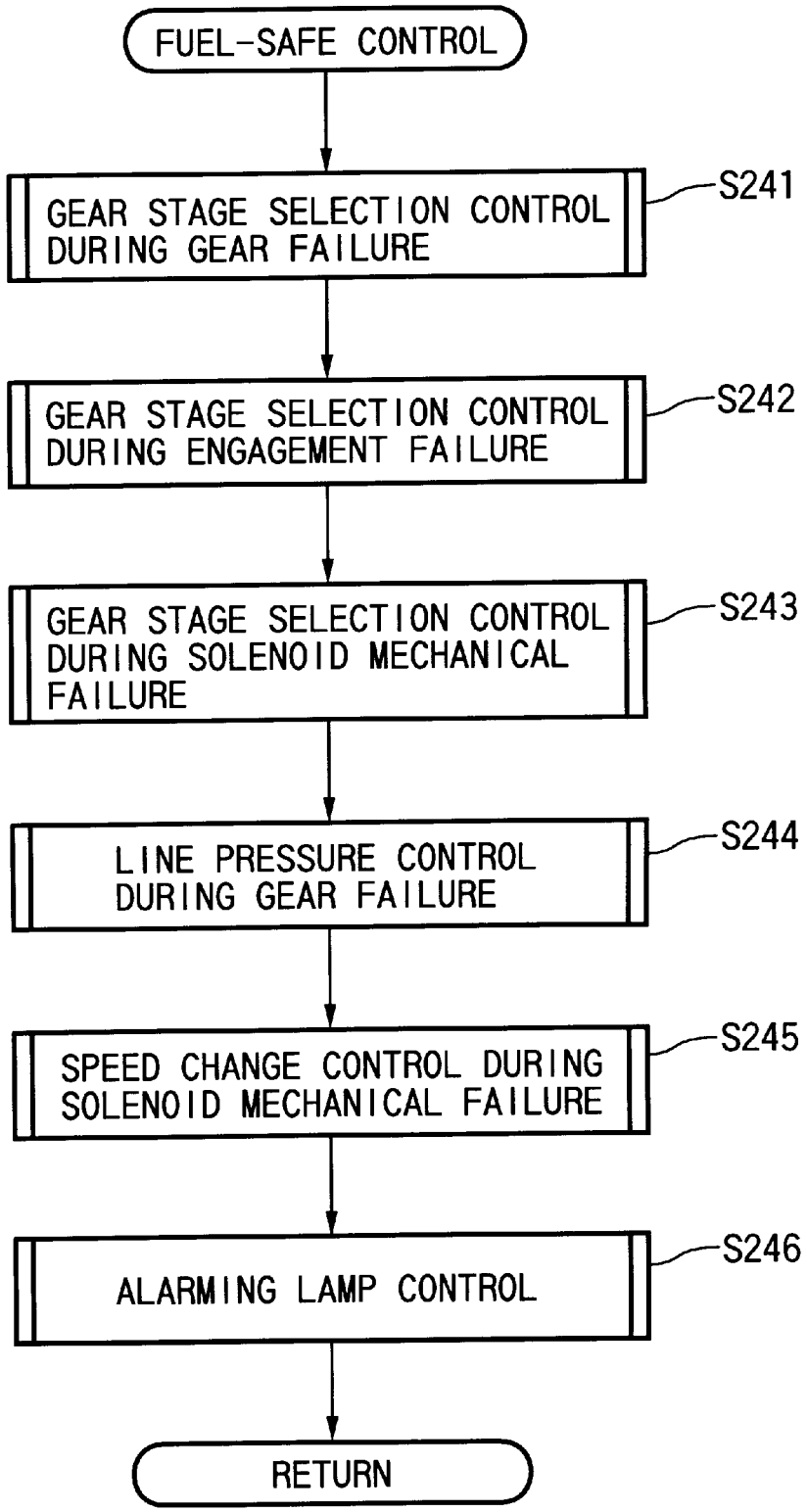
FIG. 33 is a flowchart showing a main program for a fail-safe control.

Referring to FIG. 33, in step S241, a gear stage selection control during the gear failure is carried out. In step S242, a gear stage selection control during the engagement failure is carried out. In step S243, a gear stage selection control during the mechanical failure of the solenoid valve is carried out. In step S244, a line pressure control during the gear failure is carried out. In step S245, a speed change control during the mechanical failure of the solenoid valve is carried out. In step S248, an alarming lamp control is finally carried out.

The respective steps S241–S246 shown in FIG. 33 will be hereinafter explained in detail in accordance with FIGS. 34–43.

Figure 34:
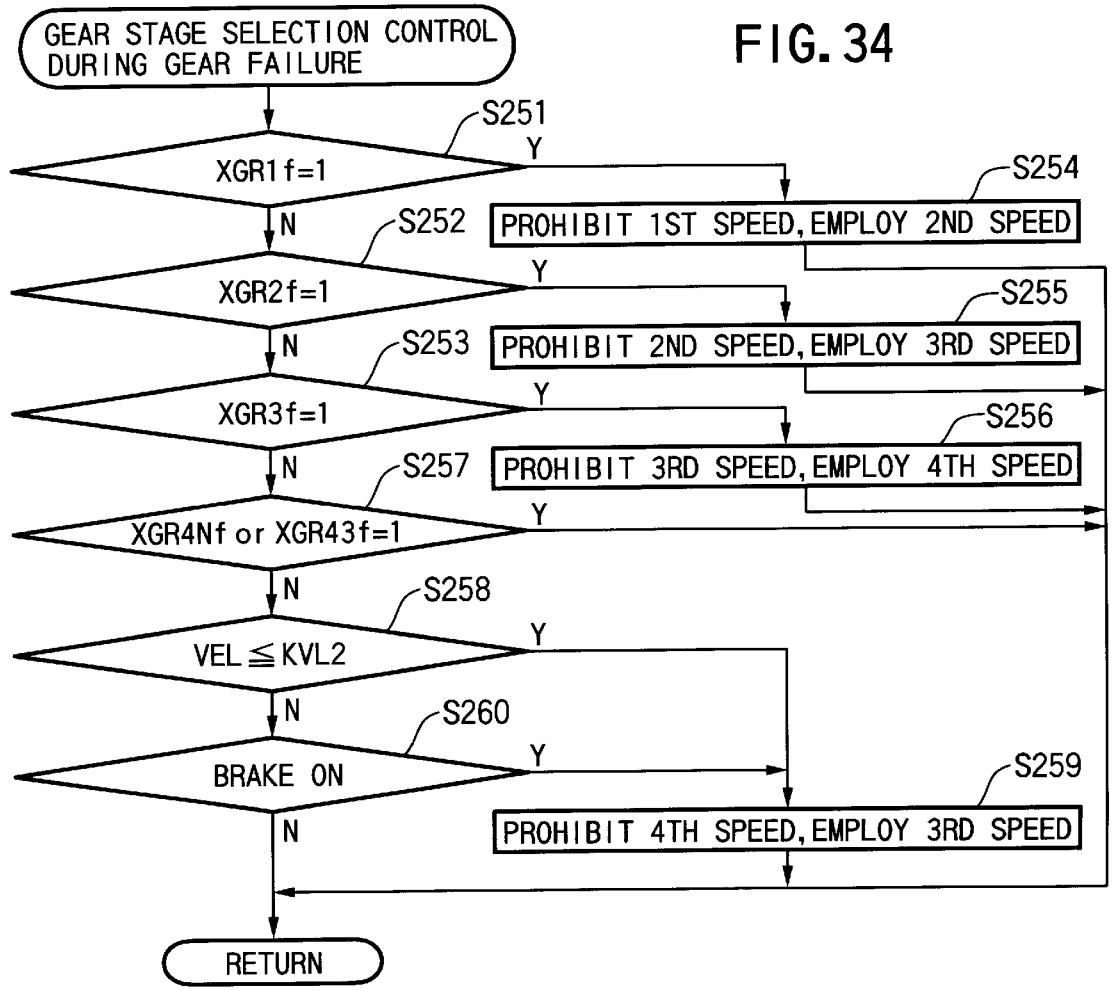
FIG. 34 is a flowchart showing a program for a gear stage selection control during a gear failure.

The gear stage selection control during the gear failure in step S241 in FIG. 33 will be explained in accordance with FIG. 34. Referring to FIG. 34, it is determined in steps S251, S252 and S253 whether the 1st speed failure flag XR1f, the 2nd speed failure flag XR21fand the 3rd speed failure flag XR3f are respectively set.

When the 1st speed failure flag XR1f is set, the procedure goes to step S254 in which the 1st speed instruction is prohibited and the gear stage of the 2nd speed is employed instead of the 1st speed so that the speed change control is carried out in the 2nd to 4th speeds. When the 2nd speed failure flag XR2f is set, the procedure goes to step S255 in which the 2nd speed instruction is prohibited and the gear stage of the 3rd speed is employed instead of the 2nd speed so that the speed change control is carried in the 1st, 3rd and 4th speeds. When the 3rd speed failure flag XR3f is set, the procedure goes to step S256 in which the 3rd speed instruction is prohibited and the gear stage of the 4th speed is employed instead of the 3rd speed so that the speed change control is carried out in the 1st, 2nd and 4th speeds.

In step S257, it is determined whether either one of the 4th speed neutral failure flag XGR4Nf or the 4th speed 3rd speed failure flag XGR43f is set. If either one of the two is set, the procedure goes to step S256 in which it is determined whether the vehicle speed VEL is equal to or less than the predetermined vehicle speed KVL2. If YES in step S258, the procedure goes to step S259 in which the 4th speed instruction is prohibited and the gear stage of the 3rd speed is employed instead of the 4th speed so that the speed change control is carried out in the 1st to 3rd speeds.

Figure 35:
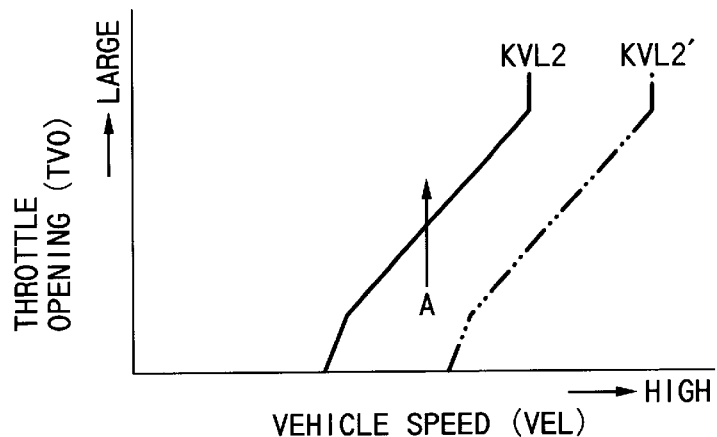
FIG. 35 is a graphical representation showing a characteristic of a predetermined vehicle speed.

As shown in FIG. 35, the predetermined vehicle speed KVL2 provided is high as the throttle valve opening TVO is large. The characteristic of the predetermined vehicle speed KVL2 corresponds to a speed change line between the 3rd speed and the 4th speed of the speed change map for the speed change control.

In the case where the 4th speed instruction is prohibited when the vehicle speed VEL is equal to or less than the predetermined vehicle speed KVL2, the gear stage of the 3rd speed is employed. However, this case where the vehicle speed VEL is equal to or less than the predetermined vehicle speed KVL2 is originally located in the area of the 3rd speed of the speed change map. Therefore, even if the 4th speed instruction is prohibited and the 3rd speed is employed, an abnormal increase of the engine rotation number ESPD, a rapid increase of the driving force and the like are not generated and the normal traveling of the vehicle in the 3rd speed can be obtained.

As explained above, the provided predetermined vehicle speed KVL2, which corresponds to the speed change line between the 3rd speed and the 4th speed, is high, as the throttle valve opening TVO is large. Therefore, even if the vehicle speed VEL is greater than the predetermined vehicle speed KVL2 in the case of the 4th speed instruction not being prohibited or the 3rd speed not being established, when the throttle valve opening TVO is increased by the accelerator pedal operation, the vehicle speed VEL becomes less than the predetermined vehicle speed KVL2 so that the 3rd speed is established as a symbol A in FIG. 35. As a result, the driver's demand for the acceleration can be satisfied.

On the other hand, when the 4th speed gear failure has occurred and either one of the 4th speed neutral failure flag XGR4Nf or the 4th speed 3rd speed failure flag XGR43f is set, if the vehicle speed VEL is greater than the predetermined speed KVL2, the 4th speed instruction is not immediately prohibited. The 4th speed instruction is prohibited in step S259 when the vehicle speed VEL has become equal to or less than the predetermined speed KVL2 or when the brake pedal operation is determined in step S260.

If the 4th speed instruction is immediately prohibited and the 3rd speed is established at a high traveling speed, an overrun of the engine and a slip of the wheel which is cased by the rapid increase of the driving force during the accelerating operation are generated. Therefore, after the vehicle speed VEL is fully decreased, the 4th speed instruction is prohibited and the 3rd speed is established.

Further, when it is expected that the vehicle speed and the driving force w111 be decreased by the brake operation, the 4th speed instruction is prohibited and the 3rd speed is established, even if the vehicle speed VEL is not actually equal to or less than the predetermined speed KVL2. Thus, when an overrun of the engine and the like might not be generated, the 3rd speed is quickly established without waiting the decrease of the vehicle speed. As a result, the driver's demand for the deceleration in the vehicle speed is satisfied by an engine brake at the gear stage of the 3rd speed.

Before the vehicle speed VEL is equal to or less than the predetermined speed KVL2 or before the brake pedal is operated, the gear stage is in the 3rd speed or in the neutral condition at the 4th speed instruction. When the gear stage is in the neutral condition, the 3rd speed is established if the vehicle speed VEL is equal to or less than the predetermined speed KVL2.

In this case, after the 3rd speed is established, when the vehicle speed VEL is increased up to the predetermined vehicle speed KVL2, the gear stage again becomes in the neutral condition if the 4th speed instruction is output again. As a result, the neutral condition and the 3rd speed condition are repeated. However, according to the embodiment of the present invention, once the 4th speed instruction is prohibited, even if the vehicle speed VEL is increased up to the predetermined vehicle speed KVL2, the prohibition of the 4th speed instruction is not cancelled so that the 4th speed instruction is not again output. As a result, the situation in which the neutral condition and the 3rd speed condition are repeated can be avoided.

According to the embodiment of the present invention, as shown in FIG. 35, a second predetermined vehicle speed KVL2' may be provided. The predetermined vehicle speed KVL2 is employed when the brake is not operated, and the second predetermined vehicle speed KVL2' is employed when the brake is operated.

When the brake pedal is operated and the vehicle speed is decreased to the second predetermined vehicle speed KVL2', the 4th speed instruction is prohibited and the 3rd speed is established. As a result, in the same way as in the above-explained example, the 3rd speed is quickly established to avoid an overrun and the like without waiting for a decrease in the vehicle speed. Further, the driver's demand for the deceleration of the vehicle speed is satisfied by an engine brake at the gear stage of the 3rd speed.

The prohibitions of the outputs of the respective speed change instructions in the gear stage selection control during the gear failures are reset together with the gear failure flags when the next driving cycle has begun. In the next driving cycle, the gear failure and normality determination control and the gear stage selection control are newly carried out. Thus, when determining the mechanical failure of the solenoid valve, it can be determined whether the gear failure or the like occur consecutively in the two driving cycles.

Further, when the respective gear stages are prohibited, the adjacent gear stages are employed instead of the prohibited gear stages so that the discomfort of the driver is minimized as much as possible. Especially when the 2nd and 3rd speeds are prohibited, the 3rd and 4th speeds located in a shift-up side are employed. If the gear stage located in a shift-down side is employed, an increase in the engine rotation number and an increase in the driving force, neither of which the driver expects, might occur. Such problems can be resolved by the present invention.

Figure 36:
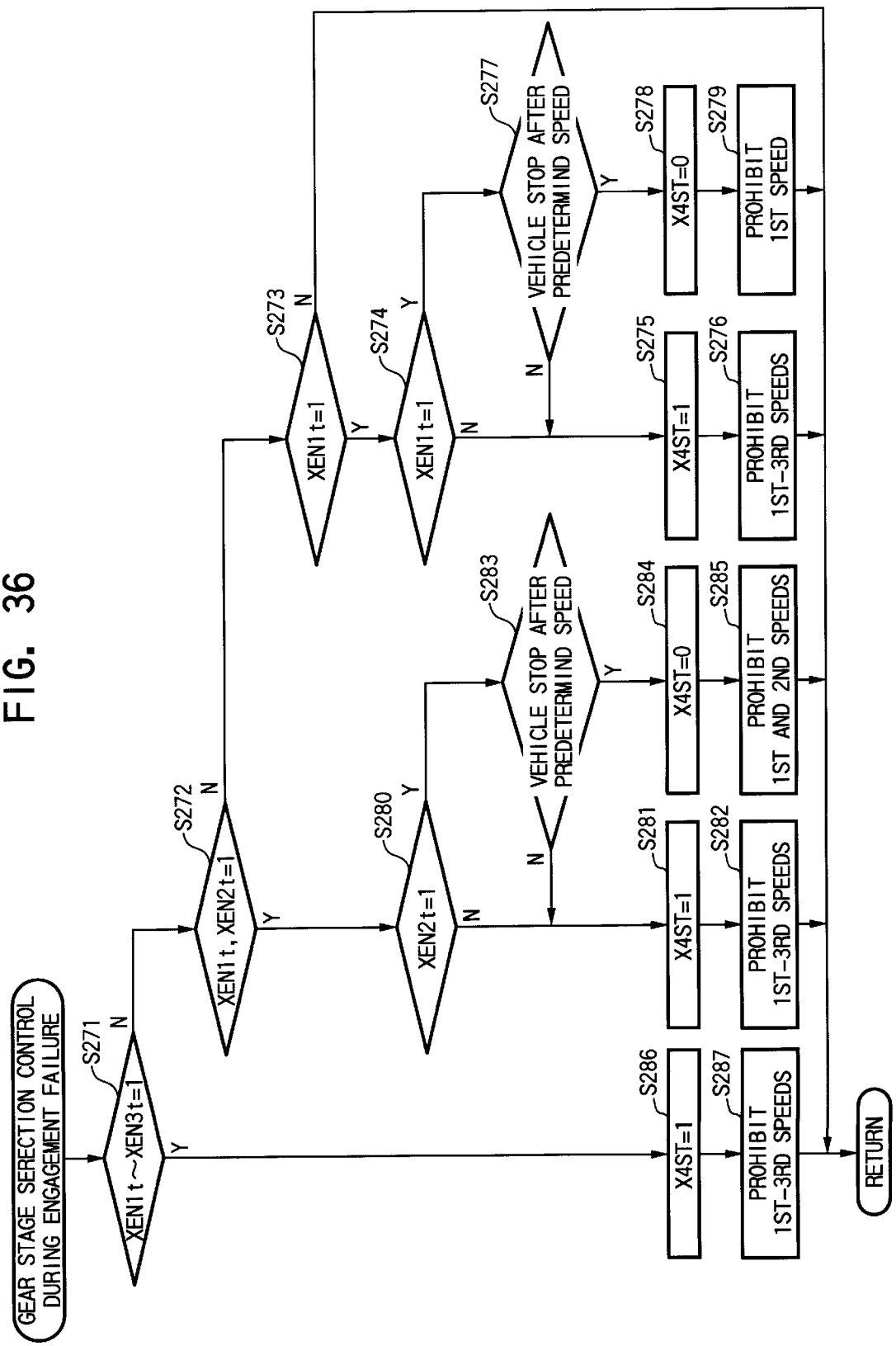
FIG. 36 is a flowchart showing a program for a gear stage selection control during an engagement failure.

Next, the gear stage selection control during the engagement failure in step S242 in FIG. 33 will be explained in accordance with FIG. 36. Referring to FIG. 36, it is determined in steps S271 whether the 1st to 3rd speeds engagement failure temporary flags XEN1t–XEN3t are all set. It is determined in step S272 whether the 1st speed engagement failure temporary flag XEN1t and the 2nd speed engagement failure temporary flag XEN2t are both set. It is determined in step S273 whether the 1st speed engagement failure temporary flag XEN1t is only set.

These temporary flags XEN1t–XEN3t are respectively set when the engagement failure of the forward clutch 41 has occurred at the respective 1st to 3rd speed instructions during the engagement failure and normality determination control shown in FIG. 27. At first, the 1st speed engagement failure temporary flag XEN1t is only set.

Therefore, the procedure first of all goes from steps S271–S273 to step S274 in which it is determined whether the 1st speed engagement failure temporary flag XEN1t was set in the previous control loop. Since the flag XEN1t was not previously set when the engagement failure is determined, the procedure goes to steps S275 and S276 in which a 4th speed starting flag X4ST is set and the outputs of the 1st to 3rd speed instructions are prohibited. As a result, the vehicle starts running in the 4th speed.

In the next control cycle, the procedure goes from step S274 to step S277 in which it is determined whether the vehicle has stopped after starting running in the 4th speed and then traveling at a speed grater than a predetermined vehicle speed such as 20 km/h. Namely, when it is determined that the vehicle definitely has started running in the 4th speed, the procedure goes to steps S278 and S279 in which the 4th speed starting flag X4ST is reset and the output of the 1st speed instruction is prohibited.

Thus, since the 2nd speed instruction is output just after the vehicle has stopped, the vehicle will start running in the 2nd speed at the next time the vehicle is started. In this case, when the engagement failure is determined, the 2nd engagement failure temporary flag XEN2t is set (see FIG. 27), and the procedure therefore goes from step S272 to S280.

In step S280, it is determined whether the 2n speed engagement failure temporary flag XEN2t was set in the previous control loop. Since the flag XEN2t was not previously set when the engagement failure was determined, the procedure goes to steps S281 and S282 in which the 4th speed starting flag X4ST is set and the outputs of the 1st to 3rd speed instructions are prohibited. As a result, the vehicle starts running in the 4th speed. In the next control cycle, the procedure goes from step S280 to step S283. When the vehicle has stopped after starting running in the 4th speed and then traveling at a speed greater than a predetermined vehicle speed, the procedure goes to steps S284 and S285 in which the 4th speed starting flag X4ST is reset and the outputs of the 1st and 2nd speed instructions are prohibited.

Further, if the engagement failure is determined when the vehicle starts running in the 3rd speed, the 3rd engagement failure temporary flag XEN3t is set (see FIG. 27). Therefore, the procedure goes from step S271 to steps S286 and S287 in which the 4th speed starting flag X4ST is set and the outputs of the 1st to 3rd speed instructions are prohibited. As a result, the vehicle starts running only in the 4th speed.

Thus, when the engagement failure has occurred at the normal 1st speed instruction, the vehicle starts running in the 4th speed which can be obtained even if the forward clutch 41 is not engaged. Thereafter, the vehicle starts running in the 2nd speed. At this time, if the engagement failure has occurred, the vehicle initially starts running in the 4th speed and thereafter the vehicle starts running in the 3rd speed. Similarly, if the engagement failure has occurred, only the 4th speed is output and thereafter the vehicle starts running in the 4th speed. Further, when the engagement failure has occurred at the 1st to 3rd speed instructions, the engagement failure is defined. These results will be utilized by other controls in the fail-safe control.

Figure 37:
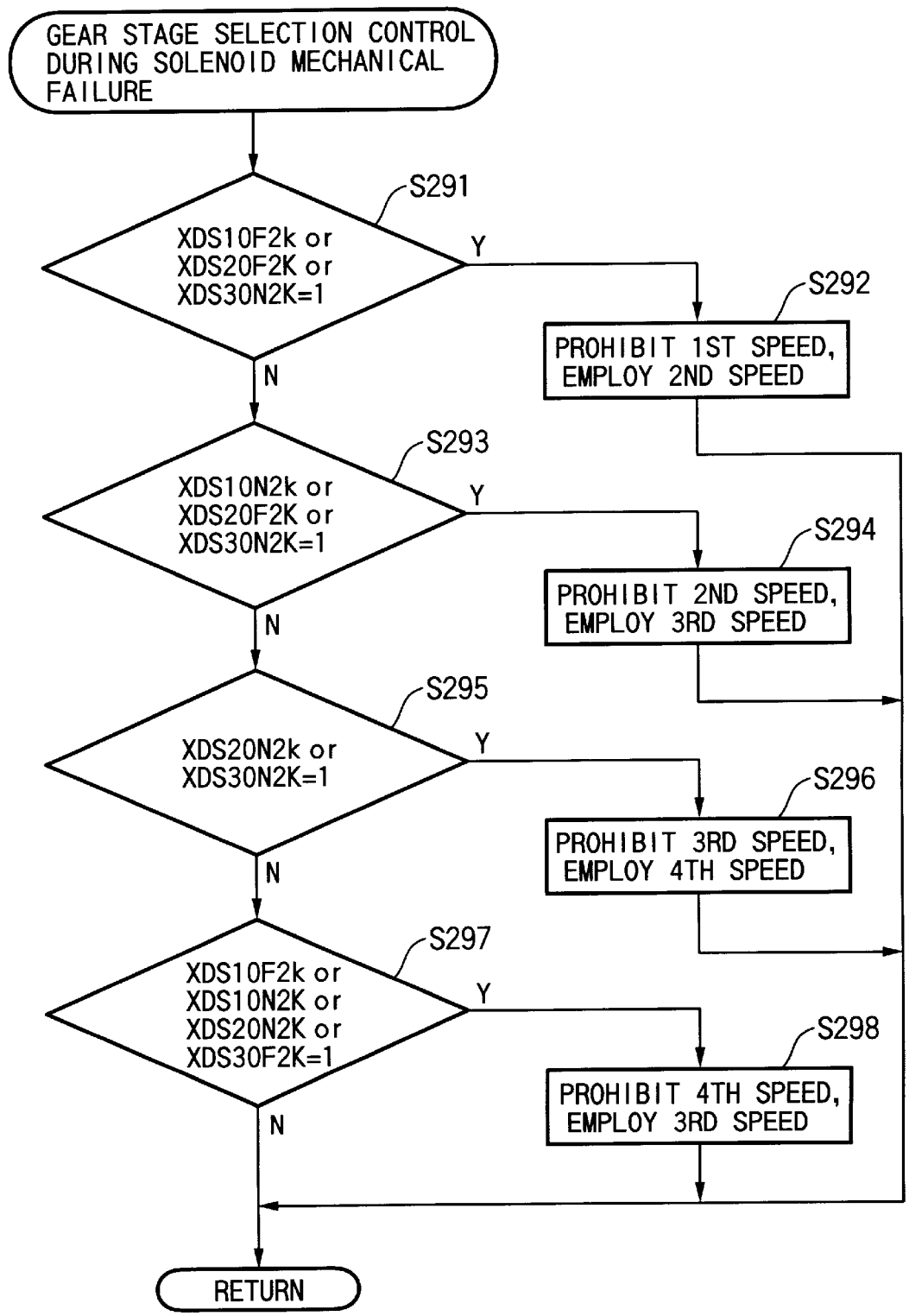
FIG. 37 is a flowchart showing a program for a gear stage selection control during a solenoid mechanical failure.

Next, the gear stage selection control during the mechanical failure of the solenoid valve in step S243 in FIG. 33 will be explained in accordance with FIG. 37. Referring to FIG. 37, it is determined in step S291 whether any one of the OFF failure of the 1st duty SV 121, the OFF failure of the 2nd duty SV 122 and the ON failure of the 3rd duty SV 123 (see Tables 3 and 4) is defined. These failures are the reasons why the 1st speed gear stage can not be obtained contrary to the 1st speed instruction. Namely, it is determined whether any one of the 1st duty SV OFF failure 2nd DCKAM flag XDS1OF2k, the 2nd duty SV OFF failure 2nd DCKAM flag XDS2OF2k and the 3rd duty SV ON failure 2nd DCKAM flag XDS3ON2k is set.

These KAM flags are maintained after the ignition is OFF. Therefore, when any one of the respective 2nd DCKAM flags is set, the procedure goes to step S292 in the next driving cycle. Accordingly, when the 1st speed can not be obtained, the output of the 1st speed instruction is prohibited at the beginning of the driving of the vehicle. At the same time, the 2nd speed is employed instead of the 1st speed, similar to the gear stage selection control during the gear failure explained above. It is determined in step S293 whether any one of the ON failure of theist duty SV 121, the OFF failure of the 2nd duty SV 122 and the ON failure of the 3rd duty SV 123 (see Tables 3 and 4) is defined. These failures are the reasons why the 2nd speed gear stage can not be obtained contrary to the 2nd speed instruction. Namely, it is determined whether any one of the 1st duty SV ON failure 2nd DCKAM flag XDS1ON2k, the 2nd duty SV OFF failure 2nd DCKAM flag XDS2OF2k and the 3rd duty SV ON failure 2nd DCKAM flag XDS3ON2k is set.

When any one of the respective 2nd DCKAM flags is set, the procedure goes to step S294 in the next driving cycle. In step S294, the output of the 2nd speed instruction is prohibited at the beginning of the driving of the vehicle. At the same time, the 3rd speed is employed instead of the 2nd speed.

Further, it is determined in step S295 whether either one of the ON failure of the 2nd duty SV 122 and the ON failure of the 3rd duty SV 123 (see Tables 3 and 4) is defined. These failures are the reasons why the 3rd speed gear stage can not be obtained contrary to the 3rd speed instruction. Namely, it is determined whether either one of the 2nd duty SV ON failure 2nd DCKAM flag XDS2ON2k and the 3rd duty SV ON failure 2nd DCKAM flag XDS3ON2k is set.

When any one of the respective 2nd DCKAM flags is set, the procedure goes to step S296 in the next driving cycle. In step S296, the output of the 3rd speed instruction is prohibited at the beginning of the driving of the vehicle. At the same time, the 4th speed is employed instead of the 3rd speed.

Further, it is determined in step S297 whether any one of the OFF failure of the 1st on-off SV 111, the ON failure of the 1st duty SV 121, the ON failure of the 2nd duty SV 122 and the OFF failure of the 3rd duty SV 123 (see Tables 3 and 4) is defined. These failures are the reasons why the 4th speed gear stage can not be obtained contrary to the 4th speed instruction. Namely, it is determined whether any one of the 1st on-off SV OFF failure 2nd DCKAM flag XOS1OF2k, the 1st duty SV ON failure 2nd DCKAM flag XDS1ON2k, the 2nd duty SV ON failure 2nd DCKAM flag XDS2ON2k and the 3rd duty SV OFF failure 2nd DCKAM flag XDS3OF2k is set.

When any one of the respective 2nd DCKAM flags is set, the procedure goes to step S298 in the next driving cycle. In step S298, the output of the 4th speed instruction is prohibited at the beginning of the driving of the vehicle. At the same time, the 3rd speed is employed instead of the 4th speed.

Thus, when any one of the 2nd DCKAM flags is set and the mechanical failure of the corresponding solenoid valve is defined, the failure determination is not carried out again in the next driving cycles, and the speed change control is carried out under the condition that the output of the instruction of the unobtainable gear stage is prohibited.

Accordingly, the useless determination, that the mechanical failure of the solenoid valve is determined at the beginning of every driving cycle, can be cancelled. Just after the starting of the vehicle, the fail-safe control is carried out so that a good traveling ability can be obtained. This failure condition is resolved when the failed solenoid valve is repaired or replaced and the battery is ON.

Figure 38:
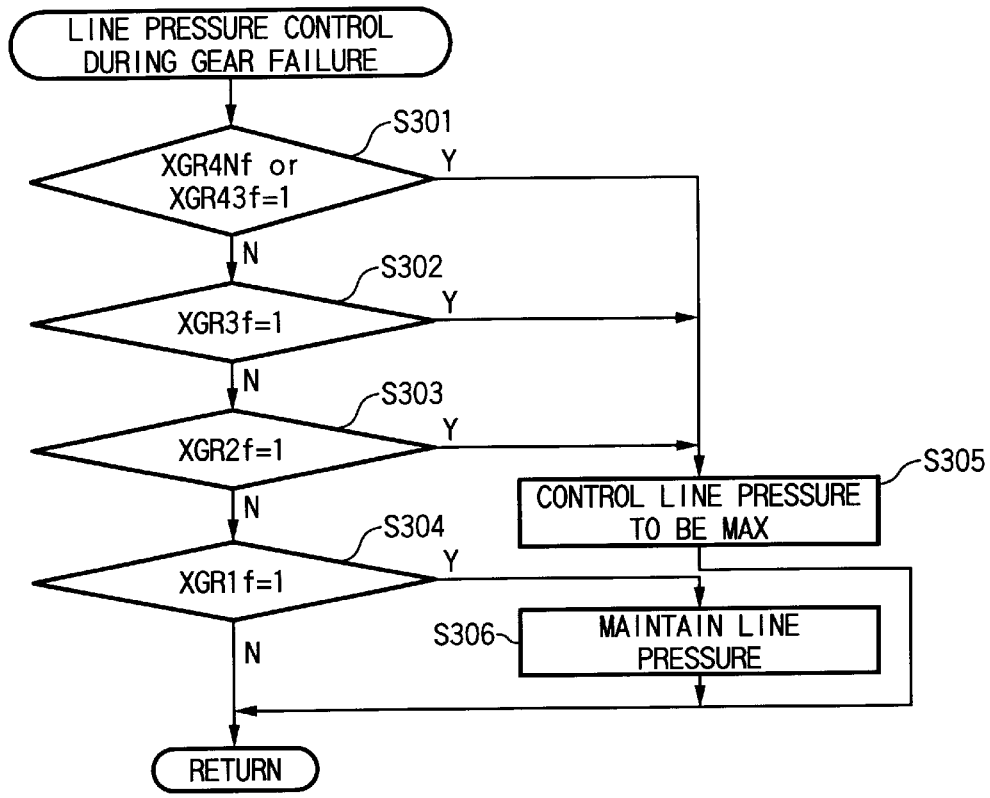
FIG. 38 is a flowchart showing a program for a line pressure control during a gear failure.

Next, the line pressure control during the gear failure in step S244 in FIG. 33 w111 be explained in accordance with FIG. 38. Referring to FIG. 38, it is determined in step S301 whether either of the 4th speed neutral failure flag XGR4Nf or the 4th speed 3rd speed failure flag XGR43f is set. It is determined in step S302 whether the 3rd speed failure flag XGR3f is set. It is determined in step S303 whether the 2nd speed failure flag XGR2f is set. It is determined in step S304 whether the 1st speed failure flag XGR1f is set.

When YES in step S301, S302 or S303, the procedure goes to step S305 in which the line pressure is controlled so as to be a maximum. Specifically, the control pressure, which is supplied to the pressure regulating port 101a of the regulator valve 101 by the linear SV 131 (see FIG. 2), is controlled so as to obtain the maximum line pressure.

Such control for obtaining the maximum line pressure is carried out so as to obtain a sufficient transmitting torque amount of the frictional element at the vehicle starting under the condition of the gear failure.

Namely, when the vehicle starts running in the 4th speed based on the engagement failure (see steps S276, S282 and S287 in FIG. 36), or when the vehicle starts running with the 3rd speed based on the 4th gear failure, the forward clutch 41 and the 3-4 clutch 43 transmit the torque. In this case, the 3-4 clutch 43 does not transmit a large torque amount since such clutch 43 is not generally used at the vehicle starting.

Therefore, when the vehicle starts running in the 3rd speed, the transmitting torque amount is insufficient. Therefore, the line pressure is controlled to be maximum so that enough transmitting torque amount of the 3-4 clutch 43 can be obtained when the vehicle starts running in the 3rd speed based on the 4th speed gear failure.

Similarly, when the vehicle starts running in the 4th speed based on the 3rd gear failure contrary to the 3rd speed instruction, the 2-4 brake 44 and the 3-4 clutch 43 transmit the torque. In this case, the transmitting torque amount of the 3-4 clutch 43 is also insufficient. Therefore, the line pressure is controlled to be a maximum.

Similarly, when the vehicle starts running in the 3rd speed based on the 2nd gear failure contrary to the 2nd speed instruction, the transmitting torque amount of the 3-4 clutch 43 is also insufficient. Therefore, the line pressure is controlled to be a maximum.

On the contrary, if the 1st speed failure flag XGR1f is set, the normal line pressure is maintained without controlling the line pressure to be a maximum.

Namely, the vehicle starts running in the 2nd speed during the 1st gear failure. Such starting running in the 2nd speed is a usual one. The forward clutch 41 and the 2-4 brake, both of which transmit torque when the vehicle starts running in the 2nd speed, are already provided with enough torque transmitting capacity. Therefore, the usual line pressure is maintained without controlling the line pressure to be a maximum. As a result, an increase of the pump driving loss generated by the unnecessary increase of the line pressure can be avoided. Further, the fuel consumption efficiency is improved.

Next, the speed change control during the mechanical failure of the solenoid valve in step S245 in FIG. 33 w111 be explained in accordance with FIGS. 39–42. This control is a speed change control during the OFF failure of the 1st duty SV 121.

Figure 39:
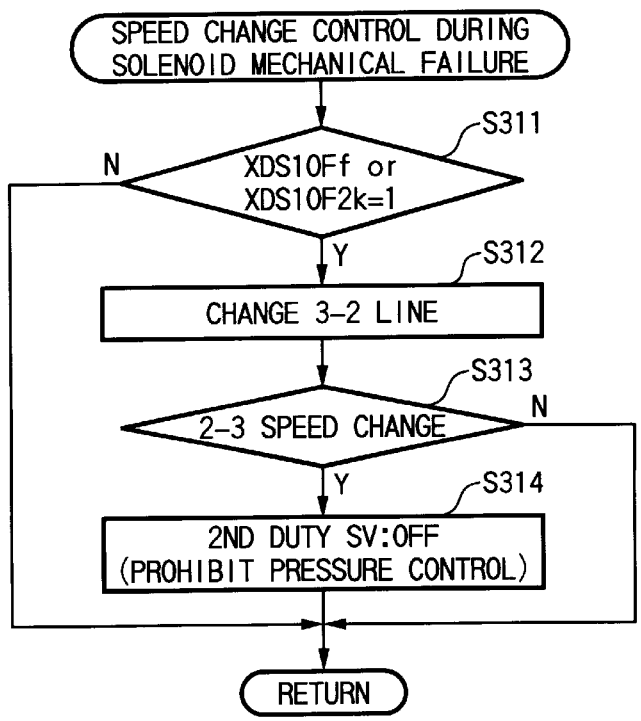
FIG. 39 is a flowchart showing a program for a speed change control during a solenoid mechanical failure.
Figure 40:
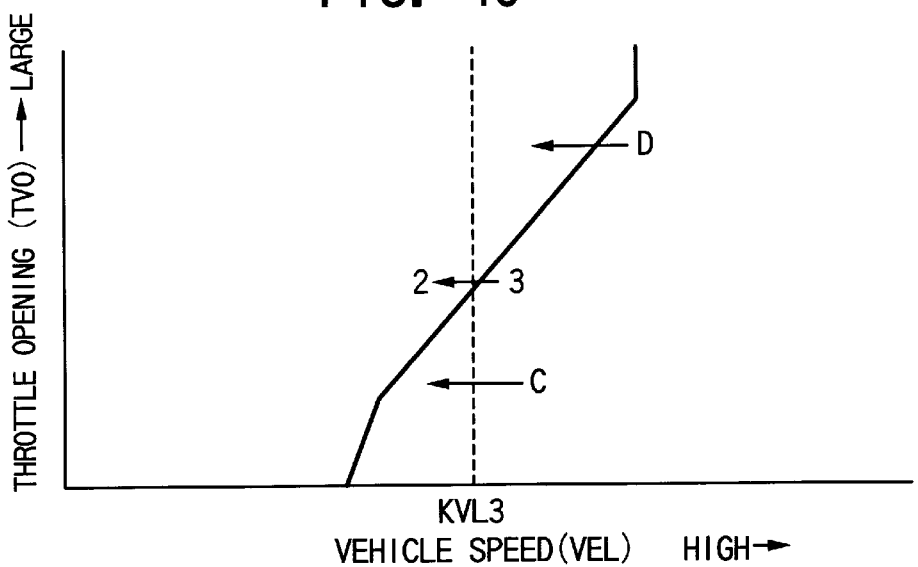
FIG. 40 is a graphical representation showing a characteristic of a 3-2 speed change line.
Figure 41:
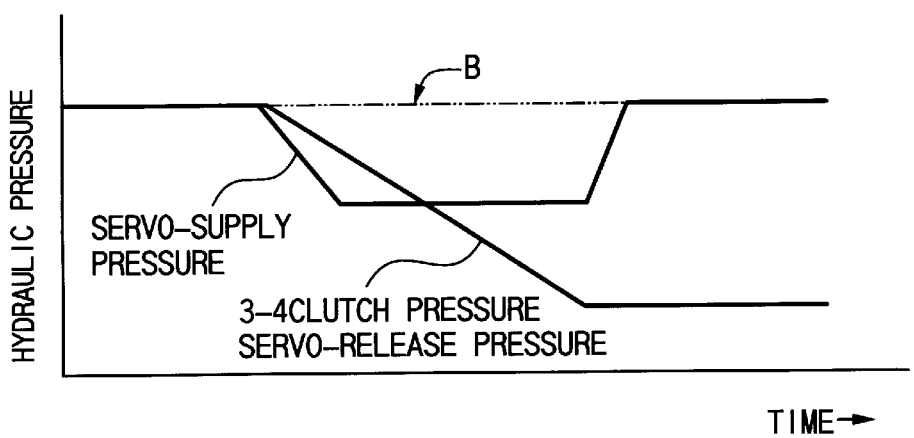
FIG. 41 is a graphical representation showing a characteristic of a hydraulic pressure during a 3-2 speed change operation.

Referring to FIG. 39, it is determined in step S311 whether either one of the 1st duty SV OFF failure flag XDS1OFf or 1st duty SV OFF failure 2nd DCKAM flag XDS1OF2k is set. If YES in step S311, the procedure goes to step S312 in which the 3-2 shift-down speed change line of the speed change map is changed. As shown in FIG. 40, the normal speed-change line of a solid line is changed into the speed line of a chain line. In the normal speed change line, the speed change point is located in a high-speed side as the throttle valve opening TVO is large. In the speed change line of the chain line, the speed change point is constantly equal to the predetermined vehicle speed KVL3 regardless of the throttle valve opening TVO.

This is provided to solve the problem of the speed change shock which is generated when the shift-down speed change is operated in the 3-2 torque-demand during the OFF failure of the 1st duty SV 121.

Namely, in the 3-2 speed change operation, the 2nd duty SV 122 is switched from OFF to ON, and the 3-4 clutch pressure and the servo-release pressure are discharged so that the 3-4 clutch 43 is disengaged, and the 2-4 brake 44 is applied (see Tables 5 and 6). When the 3-2 shift-down speed change in the torque-demand by the accelerator pedal operation is carried out, as a solid line shown in FIG. 41, the servo-apply pressure is controlled to be temporarily decreased by the duty control of the 1st duty SV 121.

The servo-apply pressure is temporarily decreased to decrease the applying force of the 2-4 brake so that the 3-4 clutch 43 is disengaged and accordingly the turbine rotation number smoothly increases. Thereafter, when the 3-4 clutch 43 is fully disengaged, the servo-apply pressure is. again increased so that the 2-4 brake 44 is fully applied.

However, if the OFF failure of the 1st duty SV 121 has occurred, the above-mentioned control of temporarily decreasing the servo-apply pressure can not be carried out. At this time, while the servo-apply pressure is maintained at a high-pressure condition as shown by a chain line B in FIG. 41, the 3-4 clutch pressure and the servo-release pressure are discharged. Therefore, since the servo-release pressure starts to be discharged, the 2-4 brake 44 is applied before the 3-4 clutch 43 is disengaged. As a result, the interlock condition, in which both the 3-4 clutch 43 and the 2-4 brake 44 are engaged, occurs, and a large speed change shock occurs.

Accordingly, when the OFF failure of the 1st duty SV 121 occurs, the 3-4 shift-down speed change line of the map is changed into the speed change line in which the speed change point is constantly equal to the predetermined vehicle speed KVL3 regardless of the throttle valve opening TVO. As a result, the shift-down shock in the 3-4 torque demand generated by the accelerator pedal operation (the throttle valve opening becomes large) does not occur. Thus, the above-mention problem can be solved.

As shown in FIG. 40, when the 3-4 shift-down speed change line is changed into the speed change line with the speed KVL3, the speed change point moves to a high speed side at a small throttle opening side and to a low speed side at a large throttle opening side.

Therefore, when the vehicle begins to ascend, the vehicle speed VEL is decreased. At this time, the 3-2 shift-down speed change at the small throttle opening side is effected as shown by a symbol C in FIG. 40 so that the speed change can be effected earlier. As a result, when the vehicle begins to ascend, decreasing of the vehicle speed is inhibited.

On the other hand, at the large throttle opening side, when the vehicle begins to ascend and the vehicle speed is decreased, the 3-2 shift-down speed change is effected as shown by a symbol D in FIG. 40 so that the speed change is delayed and the 3rd speed is maintained longer. As a result, increasing of the engine rotation number is inhibited and the problem of the engine noise can be reduced.

Referring back to FIG. 39, when the OFF failure of the 1st duty SV 121 occurs, the procedure goes to step S313 in which it is determined whether the 2-3 speed change has now been effected. If the speed change has been operated, the procedure goes to step S314 in which the 2nd duty SV 122 is turned OFF and the hydraulic pressure control of the 2nd duty SV 122 is prohibited.

Figure 42:
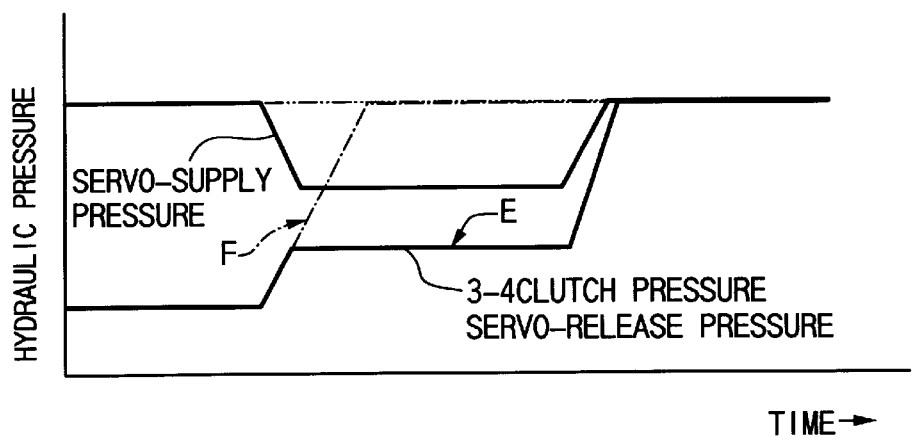
FIG. 42 is a graphical representation showing a characteristic of a hydraulic pressure during a 2-3 speed change operation.

In the 2-3 speed change operation, by the 2nd duty SV 122 being switched from ON to OFF, the 3-4 clutch pressure and the servo-release pressure are supplied so that the 3-4 clutch 43 is engaged and the 2-4 brake 44 is released (see FIGS. 5 and 6). At this time, as shown in FIG. 42, the servo-apply pressure (shown as a solid line) is temporarily deceased by the duty control of the 1st duty SV 121 so that the applying force of the 2-4 brake 44 is deceased. Further, the 3-4 clutch pressure and the servo-release pressure are controlled stepwise as shown by a symbol E in FIG. 42.

Such controls are carried out so as to avoid the speed change shock, which is generated by the 2-4 brake 44 and the 3-4 clutch 43 being simultaneously applied or engaged, and so as to smoothly engage the 3-4 clutch 43. In this case, if the servo-apply pressure is not decreased by the OFF failure of the 1st duty SV 121, the 3-4 clutch pressure is controlled stepwise under the condition that the 2-4 brake 44 is fully applied. At this time, the 3-4 clutch 43 slips hard in a so-called half-clutch condition and friction is therefore increased. Further, since the turbine rotation number does not decrease for a long time period, the finishing of the shift change operation is finally effected by a backup timer. Thus, the speed change has been effected for a long time period.

According to the embodiment, when the OFF failure of the 1st duty SV 121 has occurred, as shown by a symbol F in FIG. 42, the stepwise control of the 3-4 clutch pressure by the SV 122 during the 2-3 speed change operation 4 is prohibited. Instead, the 2nd duty SV 122 is switched from ON to OFF, and the 3-4 clutch 43 is quickly engaged so that the problem explained above can be solved.

Figure 43:
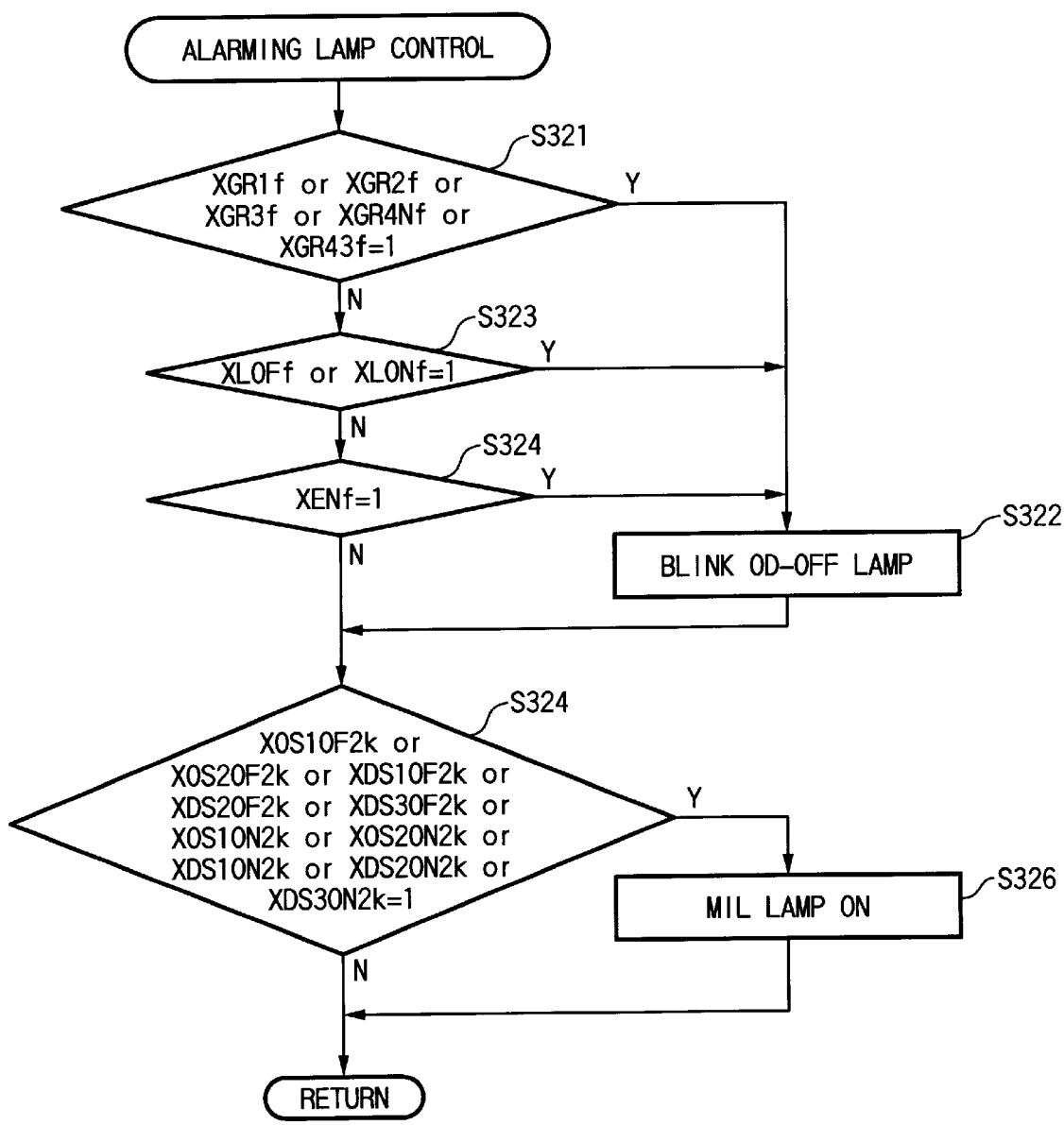
FIG. 43 is a flowchart showing a program for an alarming lamp control.

Finally, the alarming lamp control in step S246 in FIG. 33 w1ll be explained in accordance with FIG. 43.

Referring to FIG. 43, it is determined in step S321 whether any one of the 1st speed failure flag XGR1f, the 2nd speed failure flag XGR2f, the 3rd speed failure flag XGR3f, the 4th speed neutral failure flag XGR4Nf or the 4th 3rd failure flag XGR43f is set. When the gear failure occurs and any one of the above-mentioned failure flags is set, the procedure goes to step S322 in which an OD-OFF lamp disposed on an instrument panel is blinked.

It is determined in step S323 whether either one of the lockup OFF failure flag XLOFf or the lockup ON failure flag XLONf is set. When either flag is set, the procedure goes to step S322 in which the OD-OFF lamp is blinked.

It is further determined in step S324 whether the engagement failure flag XENf is set. When the flag is set, the procedure also goes to step S322 in which the OD-OFF lamp is blinked.

The OD-OFF lamp is turned ON when the driver operates an OD-OFF switch so as to prohibit the over-drive gear (4th speed) in the D range. When the gear failure, the lockup OFF failure, the lockup ON failure or the engagement failure has occurred, the driver is informed by the blinking OD-OFF lamp that such failures have occurred.

Instead of the OD-OFF switch and the OD-OFF lamp, there may be provided a hold switch and a hold lamp having the same functions. In this example, when such failures have occurred, the hold lamp is blinked.

Further, it is determined in step S325 whether any one of the respective solenoid OFF failure 2nd DCKAM flag XOS1OF2k, XOS2OF2k, XDS1OF2k–XDS3OF2k, and the respective solenoid ON failure 2nd DCKAM flag XOS1ON2k, XOS2ON2k, XDS1ON2k–XDS3ON2k is set. When any one of the flags is set, the procedure goes to step S326 in which a MIL lamp is turned ON.

The MIL lamp is turned ON when an abnormal condition of a purification system of the engine exhaust gas has occurred. The MIL lamp is disposed on the instrument panel. When either of the solenoid valves has failed and any one of the 2nd DCKAM flags is set, the MIL lamp is operated to be ON to give an alarm signaling that the condition of the purification system of the engine exhaust gas is abnormal. The driver is thus made aware that the condition of the purification system of the engine exhaust is abnormal.

Further, in the line pressure control during the gear failure shown in FIG. 38, when the line pressure is controlled to be a maximum, the hydraulic pressure for engaging the friction element during the shift change operation is increased. At this time, the speed change shock might be easily generated, thus making the driver might feel uncomfortable. Therefore, when the line pressure is controlled to be a maximum in step 305 in FIG. 38, the driver is informed of this gear failure by the lamp being turned ON or blinked.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

What is claimed is:

1. An apparatus for controlling an automatic transmission, comprising:
   a torque converter;
   speed change gears to which a power is input from an engine through the torque converter;
   a plurality of frictional elements for switching power transmitting paths provided in the speed change gears;
   a hydraulic pressure control circuit provided with a plurality of solenoid valves for controlling a hydraulic pressure supplied to the frictional elements;

speed change control means for controlling the solenoid valves so as to establish a target gear stage based on a value related to an engine load and a value related to a vehicle speed;

said frictional elements including a first frictional element and a second frictional element, the first frictional element having an engaging hydraulic pressure chamber and a disengaging hydraulic chamber and being engaged when the hydraulic pressure is supplied only into the engaging hydraulic chamber, the second frictional element having a single hydraulic chamber and being engaged when the hydraulic pressure is supplied into the hydraulic chamber, the hydraulic chamber of the second frictional element being communicated with the disengaging hydraulic chamber;

said solenoid valves including a first solenoid valve for controlling the hydraulic pressure supplied into the engaging hydraulic chamber of the first frictional element and a second solenoid valve for controlling the hydraulic pressure supplied into both the disengaging hydraulic chamber of the first frictional element and the hydraulic chamber of the second frictional element;

said hydraulic pressure control circuit establishing a first gear stage which is located in a low speed side and in which the hydraulic pressure is supplied into the engaging hydraulic chamber of the first frictional element by the first solenoid valve and the hydraulic pressure is not supplied into the disengaging hydraulic chamber of the first frictional element and the hydraulic chamber of the second frictional element by the second solenoid valve, the circuit further establishing a second gear stage which is located in a high speed side and in which the hydraulic pressure is supplied into the engaging hydraulic chamber of the first frictional element by the first solenoid valve and the hydraulic pressure is supplied into the disengaging hydraulic chamber of the first frictional element and the hydraulic chamber of the second frictional element by the second solenoid valve;

failure detection means for detecting a failure of the first solenoid valve in which the first solenoid valve is fixed under a condition that the first solenoid valve supplies the hydraulic pressure into the engaging hydraulic chamber; and means for increasing more the hydraulic pressure supplied into both the disengaging hydraulic chamber of the first frictional element and the hydraulic chamber of the second frictional element by the second solenoid valve in a case where the failure detection means has detected the failure than in a case where the failure detection means has not detected the failure, when the first gear stage is changed into the second gear stage.

2. An apparatus according to claim 1, wherein said hydraulic pressure increasing means prohibits the second solenoid valve from controlling the hydraulic pressure so that a line pressure in the hydraulic pressure control circuit is directly supplied into both the disengaging hydraulic chamber of the first frictional element and the hydraulic chamber of the second frictional element, when the first gear stage is changed into the second gear stage.

3. An apparatus according to claim 1, wherein said apparatus further comprises means for changing a speed change point on a speed change line used for a speed change operation from the second gear stage to the first gear stage so as to move a lower speed side as the value related to the engine load becomes large and so as to move a higher speed side as the value related to the engine load becomes small in a case where the failure detection means has detected the failure than in a case where the failure detection means has not detected the failure.

4. An apparatus according to claim 3, wherein said speed change point changing means changes the speed change point so as to be constantly equal to a predetermined vehicle speed regardless of the value related to the engine load.

* * * * *